United States Patent
Shrestha et al.

(10) Patent No.: US 11,849,362 B2
(45) Date of Patent: Dec. 19, 2023

(54) RETRANSMISSION AFTER BANDWIDTH PART SWITCHING

(71) Applicant: QUALCOMM Incorporated, San Diego, CA (US)

(72) Inventors: Bharat Shrestha, San Diego, CA (US); Liangping Ma, San Diego, CA (US); Ayan Sengupta, San Diego, CA (US); Umesh Phuyal, San Diego, CA (US); Alberto Rico Alvarino, San Diego, CA (US); Xiao Feng Wang, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/324,982

(22) Filed: May 19, 2021

(65) Prior Publication Data
US 2022/0007248 A1 Jan. 6, 2022

Related U.S. Application Data
(60) Provisional application No. 63/047,397, filed on Jul. 2, 2020.

(51) Int. Cl.
*H04W 4/00* (2018.01)
*H04W 36/08* (2009.01)
(Continued)

(52) U.S. Cl.
CPC ............ *H04W 36/08* (2013.01); *H04L 1/189* (2013.01); *H04L 1/1819* (2013.01);
(Continued)

(58) Field of Classification Search
CPC . H04W 36/08; H04W 24/08; H04W 36/0072; H04W 72/02; H04W 72/0453;
(Continued)

(56) References Cited

U.S. PATENT DOCUMENTS

| | | | |
|---|---|---|---|
| 2018/0034611 A1* | 2/2018 | Nagaraja | H04W 24/02 |
| 2019/0052344 A1* | 2/2019 | Kundargi | H04B 17/24 |

(Continued)

FOREIGN PATENT DOCUMENTS

| | | | | |
|---|---|---|---|---|
| EP | 3432484 A1 * | 1/2019 | ........... | H04B 7/0695 |
| EP | 3513505 B1 * | 3/2021 | ........... | H04B 7/0617 |

OTHER PUBLICATIONS

Co-pending U.S. Appl. No. 17/304,528, inventor Ma; Liangping, filed Jun. 22, 2021.

(Continued)

*Primary Examiner* — Thai D Hoang
(74) *Attorney, Agent, or Firm* — QUALCOMM Incorporated

(57) ABSTRACT

Methods, systems, and devices for wireless communications are described. A user equipment (UE) receives one or more downlink signals using a first beam associated with a first set of frequency resources, switches from the first beam to a second beam associated with a second set of frequency resources, selects a set of frequency resources for transmitting feedback information associated with the one or more downlink signals, and transmits the feedback information to the base station using the selected set of frequency resources. In some examples, the UE transmits one or more uplink signals to a base station using a first beam associated with a first set of frequency resources, switches from the first beam to a second beam associated with a second set of frequency resources, and determines whether to send a retransmission of the one or more uplink signals based at least in part on switching.

20 Claims, 24 Drawing Sheets

(51) Int. Cl.
  *H04W 36/00*   (2009.01)
  *H04W 24/08*   (2009.01)
  *H04L 1/1867*  (2023.01)
  *H04W 72/044*  (2023.01)
  *H04W 72/0453* (2023.01)
  *H04L 1/1812*  (2023.01)
  *H04W 72/02*   (2009.01)

(52) U.S. Cl.
  CPC ....... *H04W 24/08* (2013.01); *H04W 36/0072* (2013.01); *H04W 72/02* (2013.01); *H04W 72/046* (2013.01); *H04W 72/0453* (2013.01)

(58) Field of Classification Search
  CPC .... H04W 72/046; H04L 1/1819; H04L 1/189; H04L 1/1635; H04L 1/1848; H04L 1/1854; H04L 1/1822
  See application file for complete search history.

(56) References Cited

U.S. PATENT DOCUMENTS

| | | | |
|---|---|---|---|
| 2019/0116012 A1* | 4/2019 | Nam | H04W 72/046 |
| 2021/0307063 A1* | 9/2021 | Yerramalli | H04W 52/42 |
| 2023/0224725 A1 | 7/2023 | Ma et al. | |
| 2023/0232384 A1 | 7/2023 | Ma et al. | |

OTHER PUBLICATIONS

Co-pending U.S. Appl. No. 17/304,955, inventor Ma; Liangping, filed Jun. 29, 2021.

Co-pending U.S. Appl. No. 17/359,291, inventor Ma; Liangping, filed Jun. 25, 2021.

Co-pending U.S. Appl. No. 17/359,377, inventor Ma; Liangping, filed Jun. 25, 2021.

* cited by examiner

RETRANSMISSION AFTER BANDWIDTH PART SWITCHING

CROSS REFERENCE

The present application for patent claims the benefit of U.S. Provisional Patent Application No. 63/047,397 by SHRESTHA et al., entitled "RETRANSMISSION AFTER BANDWIDTH PART SWITCHING," filed Jul. 2, 2020, assigned to the assignee hereof, and expressly incorporated by reference herein.

INTRODUCTION

The following relates to wireless communications and more specifically to managing retransmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform (DFT) spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support managing retransmissions after bandwidth part (BWP) switching. The described techniques provide for receiving, at a user equipment (UE), one or more downlink signals from a base station using a first beam associated with a first set of frequency resources, and switching from the first beam to a second beam associated with a second set of frequency resources. Techniques may further provide for selecting a set of frequency resources for transmitting, to the base station, feedback information associated with the one or more downlink signals and transmitting the feedback information to the base station using the selected set of frequency resources. Described techniques also provide for transmitting one or more uplink signals to a base station using a first beam associated with a first set of frequency resources, and switching from the first beam to a second beam associated with a second set of frequency resources. The techniques further provide for determining whether to send a retransmission of the one or more uplink signals based at least in part on switching from the first beam to the second beam.

A method for wireless communications at a UE is described. The method may include receiving, from a base station, one or more downlink signals using a first beam associated with a first set of frequency resources, switching from the first beam to a second beam associated with a second set of frequency resources, selecting a set of frequency resources for transmitting, to the base station, feedback information associated with the one or more downlink signals, and transmitting the feedback information to the base station using the selected set of frequency resources.

An apparatus for wireless communications at a UE is described. The apparatus may include a processor and memory coupled to the processor. The processor and memory may be configured to cause the apparatus to receive, from a base station, one or more downlink signals using a first beam associated with a first set of frequency resources, switch from the first beam to a second beam associated with a second set of frequency resources, select a set of frequency resources for transmitting, to the base station, feedback information associated with the one or more downlink signals, and transmit the feedback information to the base station using the selected set of frequency resources.

Another apparatus for wireless communications at a UE is described. The apparatus may include means for receiving, from a base station, one or more downlink signals using a first beam associated with a first set of frequency resources, means for switching from the first beam to a second beam associated with a second set of frequency resources, means for selecting a set of frequency resources for transmitting, to the base station, feedback information associated with the one or more downlink signals, and means for transmitting the feedback information to the base station using the selected set of frequency resources.

A non-transitory computer-readable medium storing code for wireless communications at a UE is described. The code may include instructions executable by a processor to receive, from a base station, one or more downlink signals using a first beam associated with a first set of frequency resources, switch from the first beam to a second beam associated with a second set of frequency resources, select a set of frequency resources for transmitting, to the base station, feedback information associated with the one or more downlink signals, and transmit the feedback information to the base station using the selected set of frequency resources.

Some aspects of the method, apparatuses, and non-transitory computer-readable medium described herein may further include operations, features, means, or instructions for transmitting the feedback information to the base station using the first set of frequency resources, the selected set of frequency resources including the first set of frequency resources.

Some aspects of the method, apparatuses, and non-transitory computer-readable medium described herein may further include operations, features, means, or instructions for determining to switch from the first beam to the second beam, where transmitting the feedback information using the first set of frequency resources may be based on determining to switch from the first beam to the second beam; and where switching from the first beam to the second beam includes switching from the first beam to the second beam after transmitting the feedback information to the base station.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, where switching from the first beam to the second beam may be based on receiving the handover command.

Some aspects of the method, apparatuses, and non-transitory computer-readable medium described herein may further include operations, features, means, or instructions for transmitting, to the base station based on receiving the handover command, a packet data convergence protocol (PDCP) status report or a radio link control (RLC) status report including the feedback information.

Some aspects of the method, apparatuses, and non-transitory computer-readable medium described herein may further include operations, features, means, or instructions for transmitting a media access control (MAC) control element (MAC CE) including the feedback information, the feedback information including a single feedback message associated with a set of multiple hybrid automatic repeat processes, transport blocks (TBs), RLC status reports, or a combination thereof.

Some aspects of the method, apparatuses, and non-transitory computer-readable medium described herein may further include operations, features, means, or instructions for identifying, based on the handover command, an indication of one or more uplink shared channel resources on the first set of frequency resources, the transmitting the feedback information including transmitting the feedback information over the one or more uplink shared channel resources on the first set of frequency resources.

Some aspects of the method, apparatuses, and non-transitory computer-readable medium described herein may further include operations, features, means, or instructions for transmitting the feedback information to the base station using the second set of frequency resources, the selected set of frequency resources including the second set of frequency resources.

Some aspects of the method, apparatuses, and non-transitory computer-readable medium described herein may further include operations, features, means, or instructions for determining to switch from the first beam to the second beam, the switching from the first beam to the second beam including switching from the first beam to the second beam before transmitting the feedback information to the base station, where transmitting the feedback information using the second set of frequency resources may be based on determining to switch from the first beam to the second beam.

Some aspects of the method, apparatuses, and non-transitory computer-readable medium described herein may further include operations, features, means, or instructions for identifying, subsequent to switching from the first beam to the second beam, a first uplink control channel opportunity on the second set of frequency resources, the transmitting the feedback information including transmitting the feedback information over the identified first uplink control channel opportunity.

Some aspects of the method, apparatuses, and non-transitory computer-readable medium described herein may further include operations, features, means, or instructions for identifying a time duration between receiving the one or more downlink signals and transmitting the feedback information, where the time duration may be greater than a minimum amount of time for switching from the first beam to the second beam, and where transmitting the feedback information may be based on an expiration of the time duration after receiving the one or more downlink signals, receiving, from the base station, downlink control information (DCI) including an indication of the time duration, where the indication of the time duration may be associated with the first set of frequency resources, and determining, based on the indication of the time duration, a timing for transmitting the feedback information on the second set of frequency resources, where transmitting the feedback information may be based on determining the timing for transmitting the feedback information on the second set of frequency resources.

Some aspects of the method, apparatuses, and non-transitory computer-readable medium described herein may further include operations, features, means, or instructions for initiating, based on receiving the one or more downlink signals, one or more hybrid automatic repeat request (HARQ) timers associated with the feedback information and applying, based on switching from the first beam to the second beam, an offset that may be equal to or greater than a minimum amount of time for switching from the first beam to the second beam to the one or more HARQ timers, where transmitting the feedback information may be based on expiration of the one or more HARQ timers and the applied offset.

Some aspects of the method, apparatuses, and non-transitory computer-readable medium described herein may further include operations, features, means, or instructions for transmitting a single feedback message associated with a set of multiple hybrid automatic repeat processes, TBs, RLC status reports, or a combination thereof.

Some aspects of the method, apparatuses, and non-transitory computer-readable medium described herein may further include operations, features, means, or instructions for receiving, from the base station, DCI including an indication of a transmission time interval (TTI) associated with the second set of frequency resources, the transmitting the feedback information including transmitting the feedback information during the TTI.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, determining a switching window for switching from the first beam to the second beam, and determining that one or more TTIs allocated for transmitting the feedback information do not overlap in time with the switching window.

Some aspects of the method, apparatuses, and non-transitory computer-readable medium described herein may further include operations, features, means, or instructions for determining that the one or more TTIs may be located prior to the switching window, the selected set of frequency resources including the first set of frequency resources, and the transmitting the feedback information including transmitting the feedback information to the base station prior to switching from the first beam to the second beam based on determining that the one or more TTIs may be located prior to the switching window.

Some aspects of the method, apparatuses, and non-transitory computer-readable medium described herein may further include operations, features, means, or instructions for determining that the one or more TTIs may be located after the switching window, the selected set of frequency resources including the second set of frequency resources, and the transmitting the feedback information including transmitting the feedback information to the base station after switching from the first beam to the second beam based on determining that the one or more TTIs may be located after the switching window.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, determining a switching window for switching from the first beam to the second beam, determining that one or more TTIs allocated for transmitting the feedback information at least partially overlap in time with the switching window, identifying a time duration between receiving the one or more downlink signals and transmitting the feedback information, where the time duration may be greater than a minimum amount of time for switching from the first beam to the second beam, the selected set of frequency resources including the second set of frequency resources, and the transmitting the feedback information including transmitting the feedback information to the base station after switching from the first beam to the second beam and upon expiration of the time duration, and receiving, from the base station, DCI including an indication of the time duration.

A method for wireless communications at a UE is described. The method may include transmitting, to a base station, one or more uplink signals using a first beam associated with a first set of frequency resources, switching from the first beam to a second beam associated with a second set of frequency resources, and determining, based on switching from the first beam to the second beam, whether to send a retransmission of the one or more uplink signals.

An apparatus for wireless communications at a UE is described. The apparatus may include a processor and memory coupled to the processor. The processor and memory may be configured to cause the apparatus to transmit, to a base station, one or more uplink signals using a first beam associated with a first set of frequency resources, switch from the first beam to a second beam associated with a second set of frequency resources, and determine, based on switching from the first beam to the second beam, whether to send a retransmission of the one or more uplink signals.

Another apparatus for wireless communications at a UE is described. The apparatus may include means for transmitting, to a base station, one or more uplink signals using a first beam associated with a first set of frequency resources, means for switching from the first beam to a second beam associated with a second set of frequency resources, and means for determining, based on switching from the first beam to the second beam, whether to send a retransmission of the one or more uplink signals.

A non-transitory computer-readable medium storing code for wireless communications at a UE is described. The code may include instructions executable by a processor to transmit, to a base station, one or more uplink signals using a first beam associated with a first set of frequency resources, switch from the first beam to a second beam associated with a second set of frequency resources, and determine, based on switching from the first beam to the second beam, whether to send a retransmission of the one or more uplink signals.

In some aspects of the method, apparatuses, and non-transitory computer-readable medium described herein, the first set of frequency resources may be allocated for downlink transmissions and the second set of frequency resources may be allocated for downlink transmissions.

Some aspects of the method, apparatuses, and non-transitory computer-readable medium described herein may further include operations, features, means, or instructions for monitoring, based on switching from the first beam to the second beam, the second set of frequency resources for a grant of resources for the retransmission of the one or more uplink signals, failing to receive the grant of resources based on the monitoring, and refraining from sending the retransmission of the one or more uplink signals based on failing to receive the grant of resources, the determining whether to send the retransmission of the one or more uplink signals including determining to refrain from sending the retransmission of the one or more uplink signals.

Some aspects of the method, apparatuses, and non-transitory computer-readable medium described herein may further include operations, features, means, or instructions for monitoring, based on switching from the first beam to the second beam, the second set of frequency resources for a PDCP status report or an RLC status report, where determining whether to send the retransmission may be based on monitoring for the RLC status report.

Some aspects of the method, apparatuses, and non-transitory computer-readable medium described herein may further include operations, features, means, or instructions for receiving, from the base station based on transmitting the one or more uplink signals, a random access response (RAR) message including a status report, the status report including a last sequence number (SEQN) associated with the one or more uplink signals, where determining whether to send the retransmission of the one or more uplink signals may be based on receiving the RAR message.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, where switching from the first beam to the second beam may be based on receiving the handover command, receiving, from the base station, an RLC status report or PDCP status report associated with the handover command, the handover command optionally including an indication of one or more uplink shared channel resources on the second set of frequency resources, the determining whether to send the retransmission including determining to send the retransmission, where determining to send the retransmission may be based on receiving the RLC status report, and transmitting the retransmission on the one or more uplink shared channel resources on the second set of frequency resources based on determining to send the retransmission.

In some aspects of the method, apparatuses, and non-transitory computer-readable medium described herein, the first set of frequency resources may be allocated for uplink transmissions and the second set of frequency resources may be allocated for uplink transmissions.

A method for wireless communications at a base station is described. The method may include transmitting, to a UE, one or more downlink signals using a first beam associated with a first set of frequency resources, switching from the first beam to a second beam associated with a second set of frequency resources, and receiving, from the UE, feedback information associated with the one or more downlink signals using a set of frequency resources.

An apparatus for wireless communications at a base station is described. The apparatus may include a processor and memory coupled to the processor. The processor and memory may be configured to cause the apparatus to transmit, to a UE, one or more downlink signals using a first beam associated with a first set of frequency resources, switch from the first beam to a second beam associated with a second set of frequency resources, and receive, from the UE, feedback information associated with the one or more downlink signals using a set of frequency resources.

Another apparatus for wireless communications at a base station is described. The apparatus may include means for transmitting, to a UE, one or more downlink signals using a first beam associated with a first set of frequency resources, means for switching from the first beam to a second beam associated with a second set of frequency resources, and means for receiving, from the UE, feedback information associated with the one or more downlink signals using a set of frequency resources.

A non-transitory computer-readable medium storing code for wireless communications at a base station is described. The code may include instructions executable by a processor to transmit, to a UE, one or more downlink signals using a first beam associated with a first set of frequency resources, switch from the first beam to a second beam associated with a second set of frequency resources, and receive, from the UE, feedback information associated with the one or more downlink signals using a set of frequency resources.

Some aspects of the method, apparatuses, and non-transitory computer-readable medium described herein may further include operations, features, means, or instructions for determining to switch from the first beam to the second beam, where switching from the first beam to the second beam may be based on the determining, transmitting, to the UE, a handover command instructing the UE to perform a handover procedure from a first cell associated with the first beam to a second cell associated with the second beam, where switching from the first beam to the second beam may be based on transmitting the handover command, monitoring, based on the determining, one or more uplink control channel resources in the first set of frequency resources for the feedback information, the set of frequency resources including the first set of frequency resources, and receiving the feedback information from the UE over the uplink control channel resources in the first set of frequency resources based on the monitoring, the switching from the first beam to the second beam including switching from the first beam to the second beam after receiving the feedback information.

Some aspects of the method, apparatuses, and non-transitory computer-readable medium described herein may further include operations, features, means, or instructions for receiving the feedback information from the UE using the second set of frequency resources based on switching from the first beam to the second beam, the set of frequency resources including the second set of frequency resources.

Some aspects of the method, apparatuses, and non-transitory computer-readable medium described herein may further include operations, features, means, or instructions for transmitting, to the UE, a handover command instructing the UE to perform a handover procedure from a first cell associated with the first beam to a second cell associated with the second beam, determining a switching window for switching from the first beam to the second beam, and determining that one or more TTIs allocated for receiving the feedback information do not overlap in time with the switching window.

A method for wireless communications at a base station is described. The method may include receiving one or more uplink signals from a UE using a first beam associated with a first set of frequency resources, switching from the first beam to a second beam associated with a second set of frequency resources, and determining whether to request a retransmission of the one or more uplink signals from the UE based on a time duration between receiving the one or more uplink signals and transmitting the request for the retransmission, where the time duration is greater than a minimum amount of time for switching from the first beam to the second beam.

An apparatus for wireless communications at a base station is described. The apparatus may include a processor and memory coupled to the processor. The processor and memory may be configured to cause the apparatus to receive one or more uplink signals from a UE using a first beam associated with a first set of frequency resources, switch from the first beam to a second beam associated with a second set of frequency resources, and determine whether to request a retransmission of the one or more uplink signals from the UE based on a time duration between receiving the one or more uplink signals and transmitting the request for the retransmission, where the time duration is greater than a minimum amount of time for switching from the first beam to the second beam.

Another apparatus for wireless communications at a base station is described. The apparatus may include means for receiving one or more uplink signals from a UE using a first beam associated with a first set of frequency resources, means for switching from the first beam to a second beam associated with a second set of frequency resources, and means for determining whether to request a retransmission of the one or more uplink signals from the UE based on a time duration between receiving the one or more uplink signals and transmitting the request for the retransmission, where the time duration is greater than a minimum amount of time for switching from the first beam to the second beam.

A non-transitory computer-readable medium storing code for wireless communications at a base station is described. The code may include instructions executable by a processor to receive one or more uplink signals from a UE using a first beam associated with a first set of frequency resources, switch from the first beam to a second beam associated with a second set of frequency resources, and determine whether to request a retransmission of the one or more uplink signals from the UE based on a time duration between receiving the one or more uplink signals and transmitting the request for the retransmission, where the time duration is greater than a minimum amount of time for switching from the first beam to the second beam.

The described techniques relate to improved methods, systems, devices, and apparatuses that support managing retransmissions after BWP switching. The described techniques provide for receiving, at a UE, one or more downlink signals from a base station using a first beam associated with a first set of frequency resources, and switching from the first beam to a second beam associated with a second set of frequency resources. Techniques may further provide for selecting a set of frequency resources for transmitting, to the base station, feedback information associated with the one or more downlink signals and transmitting the feedback information to the base station using the selected set of frequency resources. Described techniques also provide for transmitting one or more uplink signals to a base station using a first beam associated with a first set of frequency resources, and switching from the first beam to a second beam associated with a second set of frequency resources. The techniques further provide for determining whether to send a retransmission of the one or more uplink signals based at least in part on switching from the first beam to the second beam.

A method of wireless communications at a UE is described. The method may include receiving, from a base station, one or more downlink signals using a first beam associated with a first set of frequency resources, switching from the first beam to a second beam associated with a second set of frequency resources, selecting a set of frequency resources for transmitting, to the base station, feedback information associated with the one or more downlink signals, and transmitting the feedback information to the base station using the selected set of frequency resources.

An apparatus for wireless communications at a UE is described. The apparatus may include a processor and memory coupled to the processor. The processor and memory may be configured to cause the apparatus to receive, from a base station, one or more downlink signals using a first beam associated with a first set of frequency resources, switch from the first beam to a second beam associated with a second set of frequency resources, select a set of frequency resources for transmitting, to the base station, feedback information associated with the one or more downlink signals, and transmit the feedback information to the base station using the selected set of frequency resources.

Another apparatus for wireless communications at a UE is described. The apparatus may include means for receiving, from a base station, one or more downlink signals using a first beam associated with a first set of frequency resources, switching from the first beam to a second beam associated with a second set of frequency resources, selecting a set of frequency resources for transmitting, to the base station, feedback information associated with the one or more downlink signals, and transmitting the feedback information to the base station using the selected set of frequency resources.

A non-transitory computer-readable medium storing code for wireless communications at a UE is described. The code may include instructions executable by a processor to receive, from a base station, one or more downlink signals using a first beam associated with a first set of frequency resources, switch from the first beam to a second beam associated with a second set of frequency resources, select a set of frequency resources for transmitting, to the base station, feedback information associated with the one or more downlink signals, and transmit the feedback information to the base station using the selected set of frequency resources.

Some aspects of the method, apparatuses, and non-transitory computer-readable medium described herein may further include operations, features, means, or instructions for transmitting the feedback information to the base station using the first set of frequency resources, the selected set of frequency resources including the first set of frequency resources.

Some aspects of the method, apparatuses, and non-transitory computer-readable medium described herein may further include operations, features, means, or instructions for determining to switch from the first beam to the second beam, where transmitting the feedback information using the first set of frequency resources may be based on determining to switch from the first beam to the second beam; and where switching from the first beam to the second beam includes switching from the first beam to the second beam after transmitting the feedback information to the base station.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, where switching from the first beam to the second beam may be based on receiving the handover command.

Some aspects of the method, apparatuses, and non-transitory computer-readable medium described herein may further include operations, features, means, or instructions for transmitting, to the base station based on receiving the handover command, a PDCP status report or an RLC status report including the feedback information.

Some aspects of the method, apparatuses, and non-transitory computer-readable medium described herein may further include operations, features, means, or instructions for transmitting a MAC CE including the feedback information, the feedback information including a single feedback message associated with a set of hybrid automatic repeat processes, TBs, or a combination thereof.

Some aspects of the method, apparatuses, and non-transitory computer-readable medium described herein may further include operations, features, means, or instructions for identifying, based on the handover command, an indication of one or more uplink shared channel resources on the first set of frequency resources, the transmitting the feedback information including transmitting the feedback information over the one or more uplink shared channel resources on the first set of frequency resources.

Some aspects of the method, apparatuses, and non-transitory computer-readable medium described herein may further include operations, features, means, or instructions for transmitting the feedback information to the base station using the second set of frequency resources, the selected set of frequency resources including the second set of frequency resources.

Some aspects of the method, apparatuses, and non-transitory computer-readable medium described herein may further include operations, features, means, or instructions for determining to switch from the first beam to the second beam, the switching from the first beam to the second beam including switching from the first beam to the second beam before transmitting the feedback information to the base station, where transmitting the feedback information using the second set of frequency resources may be based on determining to switch from the first beam to the second beam.

Some aspects of the method, apparatuses, and non-transitory computer-readable medium described herein may further include operations, features, means, or instructions for identifying, subsequent to switching from the first beam to the second beam, a first uplink control channel opportunity on the second set of frequency resources, the transmitting the feedback information including transmitting the feedback information over the identified first uplink control channel opportunity.

Some aspects of the method, apparatuses, and non-transitory computer-readable medium described herein may further include operations, features, means, or instructions for identifying a time duration between receiving the one or more downlink signals and transmitting the feedback information, where the time duration may be greater than a minimum amount of time for switching from the first beam to the second beam, and where transmitting the feedback information may be based on an expiration of the time duration after receiving the one or more downlink signals.

Some aspects of the method, apparatuses, and non-transitory computer-readable medium described herein may further include operations, features, means, or instructions for receiving, from the base station, DCI including an indication of the time duration.

Some aspects of the method, apparatuses, and non-transitory computer-readable medium described herein may further include operations, features, means, or instructions for determining, based on the indication of the time duration, a timing for transmitting the feedback information on the second set of frequency resources, where transmitting the feedback information may be based on determining the timing for transmitting the feedback information on the second set of frequency resources.

Some aspects of the method, apparatuses, and non-transitory computer-readable medium described herein may further include operations, features, means, or instructions for initiating, based on receiving the one or more downlink signals, one or more HARQ timers associated with the feedback information, and applying, based on switching from the first beam to the second beam, an offset that may be equal to or greater than a minimum amount of time for switching from the first beam to the second beam to the one or more HARQ timers, where transmitting the feedback information may be based on expiration of the one or more HARQ timers and the applied offset.

Some aspects of the method, apparatuses, and non-transitory computer-readable medium described herein may further include operations, features, means, or instructions for transmitting a single feedback message associated with a set of hybrid automatic repeat processes, TBs, or a combination thereof.

Some aspects of the method, apparatuses, and non-transitory computer-readable medium described herein may further include operations, features, means, or instructions for receiving, from the base station, DCI including an indication of a TTI associated with the second set of frequency resources, the transmitting the feedback information including transmitting the feedback information during the TTI.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, determining a switching window for switching from the first beam to the second beam, and determining that one or more TTIs allocated for transmitting the feedback information do not overlap in time with the switching window.

Some aspects of the method, apparatuses, and non-transitory computer-readable medium described herein may further include operations, features, means, or instructions for determining that the one or more TTIs may be located prior to the switching window, the selected set of frequency resources including the first set of frequency resources, and the transmitting the feedback information including transmitting the feedback information to the base station prior to switching from the first beam to the second beam based on determining that the one or more TTIs may be located prior to the switching window.

Some aspects of the method, apparatuses, and non-transitory computer-readable medium described herein may further include operations, features, means, or instructions for determining that the one or more TTIs may be located after the switching window, the selected set of frequency resources including the second set of frequency resources, and the transmitting the feedback information including transmitting the feedback information to the base station after switching from the first beam to the second beam based on determining that the one or more TTIs may be located after the switching window.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, determining a switching window for switching from the first beam to the second beam, and determining that one or more TTIs allocated for transmitting the feedback information at least partially overlap in time with the switching window.

Some aspects of the method, apparatuses, and non-transitory computer-readable medium described herein may further include operations, features, means, or instructions for identifying a time duration between receiving the one or more downlink signals and transmitting the feedback information, where the time duration may be greater than a minimum amount of time for switching from the first beam to the second beam, the selected set of frequency resources including the second set of frequency resources, and the transmitting the feedback information including transmitting the feedback information to the base station after switching from the first beam to the second beam and upon expiration of the time duration.

Some aspects of the method, apparatuses, and non-transitory computer-readable medium described herein may further include operations, features, means, or instructions for receiving, from the base station, DCI including an indication of the time duration.

In some aspects of the method, apparatuses, and non-transitory computer-readable medium described herein, the base station may be a network device in a non-terrestrial network (NTN).

A method of wireless communications at a UE is described. The method may include transmitting, to a base station, one or more uplink signals using a first beam associated with a first set of frequency resources, switching from the first beam to a second beam associated with a second set of frequency resources, and determining, based on switching from the first beam to the second beam, whether to send a retransmission of the one or more uplink signals.

An apparatus for wireless communications at a UE is described. The apparatus may include a processor and memory coupled to the processor. The processor and memory may be configured to cause the apparatus to transmit, to a base station, one or more uplink signals using a first beam associated with a first set of frequency resources, switch from the first beam to a second beam associated with a second set of frequency resources, and determine, based on switching from the first beam to the second beam, whether to send a retransmission of the one or more uplink signals.

Another apparatus for wireless communications at a UE is described. The apparatus may include means for transmitting, to a base station, one or more uplink signals using a first beam associated with a first set of frequency resources, switching from the first beam to a second beam associated with a second set of frequency resources, and determining, based on switching from the first beam to the second beam, whether to send a retransmission of the one or more uplink signals.

A non-transitory computer-readable medium storing code for wireless communications at a UE is described. The code may include instructions executable by a processor to transmit, to a base station, one or more uplink signals using a first beam associated with a first set of frequency resources, switch from the first beam to a second beam associated with a second set of frequency resources, and determine, based on switching from the first beam to the second beam, whether to send a retransmission of the one or more uplink signals.

In some aspects of the method, apparatuses, and non-transitory computer-readable medium described herein, the first set of frequency resources may be allocated for downlink transmissions and the second set of frequency resources may be allocated for downlink transmissions.

Some aspects of the method, apparatuses, and non-transitory computer-readable medium described herein may further include operations, features, means, or instructions for monitoring, based on switching from the first beam to the second beam, the second set of frequency resources for a grant of resources for the retransmission of the one or more uplink signals, failing to receive the grant of resources based on the monitoring, and refraining from sending the retransmission of the one or more uplink signals based on failing to receive the grant of resources, the determining whether to send the retransmission of the one or more uplink signals including determining to refrain from sending the retransmission of the one or more uplink signals.

Some aspects of the method, apparatuses, and non-transitory computer-readable medium described herein may further include operations, features, means, or instructions for identifying a time duration for the monitoring, where the time duration may be greater than a minimum amount of time for switching from the first beam to the second beam, the monitoring the second set of frequency resources for the grant of resources including monitoring over the time duration.

Some aspects of the method, apparatuses, and non-transitory computer-readable medium described herein may further include operations, features, means, or instructions for monitoring, based on switching from the first beam to the second beam, the second set of frequency resources for a PDCP status report or an RLC status report, where determining whether to send the retransmission may be based on monitoring for the RLC status report.

Some aspects of the method, apparatuses, and non-transitory computer-readable medium described herein may further include operations, features, means, or instructions for receiving, from the base station based on transmitting the one or more uplink signals, a RAR message including a status report, the status report including a last SEQN associated with the one or more uplink signals, where determining whether to send a retransmission of the one or more uplink signals may be based on receiving the RAR message.

Some aspects of the method, apparatuses, and non-transitory computer-readable medium described herein may further include operations, features, means, or instructions for receiving, from the base station, a handover command instructing the UE to perform a handover procedure from a first cell associated with the first beam to a second cell associated with the second beam, where switching from the first beam to the second beam may be based on receiving the handover command, receiving, from the base station, a RLC status report or PDCP status report associated with the handover command, the handover command optionally including an indication of one or more uplink shared channel resources on the second set of frequency resources, the determining whether to send the retransmission including determining to send the retransmission, where determining to send the retransmission may be based on receiving the RLC status report, and transmitting the retransmission on the one or more uplink shared channel resources on the second set of frequency resources based on determining to send the retransmission.

In some aspects of the method, apparatuses, and non-transitory computer-readable medium described herein, the first set of frequency resources may be allocated for uplink transmissions and the second set of frequency resources may be allocated for uplink transmissions.

Some aspects of the method, apparatuses, and non-transitory computer-readable medium described herein may further include operations, features, means, or instructions for identifying a time duration for the monitoring for feedback information associated with the one or more uplink signals, where the time duration may be greater than a minimum amount of time for switching from the first beam to the second beam, and monitoring for feedback information over the time duration, where determining whether to send the retransmission may be based on the monitoring.

A method of wireless communications at a base station is described. The method may include transmitting, to a UE, one or more downlink signals using a first beam associated with a first set of frequency resources, switching from the first beam to a second beam associated with a second set of frequency resources, and receiving, from the UE, feedback information associated with the one or more downlink signals using a set of frequency resources.

An apparatus for wireless communications at a base station is described. The apparatus may include a processor and memory coupled to the processor. The processor and memory may be configured to cause the apparatus to transmit, to a UE, one or more downlink signals using a first beam associated with a first set of frequency resources, switch from the first beam to a second beam associated with a second set of frequency resources, and receive, from the UE, feedback information associated with the one or more downlink signals using a set of frequency resources.

Another apparatus for wireless communications at a base station is described. The apparatus may include means for transmitting, to a UE, one or more downlink signals using a first beam associated with a first set of frequency resources, switching from the first beam to a second beam associated with a second set of frequency resources, and receiving, from the UE, feedback information associated with the one or more downlink signals using a set of frequency resources.

A non-transitory computer-readable medium storing code for wireless communications at a base station is described. The code may include instructions executable by a processor to transmit, to a UE, one or more downlink signals using a first beam associated with a first set of frequency resources, switch from the first beam to a second beam associated with a second set of frequency resources, and receive, from the UE, feedback information associated with the one or more downlink signals using a set of frequency resources.

Some aspects of the method, apparatuses, and non-transitory computer-readable medium described herein may further include operations, features, means, or instructions for determining to switch from the first beam to the second beam, where switching from the first beam to the second beam may be based on the determining, monitoring, based on the determining, one or more uplink control channel resources in the first set of frequency resources for the feedback information, the set of frequency resources including the first set of frequency resources, and receiving the feedback information from the UE over the uplink control channel resources in the first set of frequency resources based on the monitoring, the switching from the first beam to the second beam including switching from the first beam to the second beam after receiving the feedback information.

Some aspects of the method, apparatuses, and non-transitory computer-readable medium described herein may further include operations, features, means, or instructions for transmitting, to the UE, a handover command instructing the UE to perform a handover procedure from a first cell associated with the first beam to a second cell associated with the second beam, where switching from the first beam to the second beam may be based on transmitting the handover command.

Some aspects of the method, apparatuses, and non-transitory computer-readable medium described herein may further include operations, features, means, or instructions for receiving, from the UE based on transmitting the handover command, a PDCP status report or an RLC status report including the feedback information.

Some aspects of the method, apparatuses, and non-transitory computer-readable medium described herein may further include operations, features, means, or instructions for receiving, from the UE, a MAC CE including the feedback information, the feedback information including a single feedback message associated with a set of hybrid automatic repeat processes, TBs, or a combination thereof.

Some aspects of the method, apparatuses, and non-transitory computer-readable medium described herein may further include operations, features, means, or instructions for transmitting, to the UE, an indication of one or more uplink shared channel resources on the first set of frequency resources, the receiving the feedback information including receiving the feedback information over the one or more uplink shared channel resources on the first set of frequency resources.

Some aspects of the method, apparatuses, and non-transitory computer-readable medium described herein may further include operations, features, means, or instructions for receiving the feedback information from the UE using the second set of frequency resources based on switching from the first beam to the second beam, the set of frequency resources including the second set of frequency resources.

Some aspects of the method, apparatuses, and non-transitory computer-readable medium described herein may further include operations, features, means, or instructions for identifying, subsequent to switching from the first beam to the second beam, a first uplink control channel opportunity on the second set of frequency resources, the receiving the feedback information including receiving the feedback information over the identified first uplink control channel opportunity.

Some aspects of the method, apparatuses, and non-transitory computer-readable medium described herein may further include operations, features, means, or instructions for identifying a time duration between transmitting the one or more downlink signals and monitoring for the feedback information, where the time duration may be greater than a minimum amount of time for switching from the first beam to the second beam, and where receiving the feedback information may be based on an expiration of the time duration after transmitting the one or more downlink signals.

Some aspects of the method, apparatuses, and non-transitory computer-readable medium described herein may further include operations, features, means, or instructions for transmitting, to the UE, DCI including an indication of the time duration.

Some aspects of the method, apparatuses, and non-transitory computer-readable medium described herein may further include operations, features, means, or instructions for receiving a single feedback message associated with a set of hybrid automatic repeat processes, TBs, or a combination thereof.

Some aspects of the method, apparatuses, and non-transitory computer-readable medium described herein may further include operations, features, means, or instructions for transmitting, to the UE, a handover command instructing the UE to perform a handover procedure from a first cell associated with the first beam to a second cell associated with the second beam, where switching from the first beam to the second beam may be based on transmitting the handover command, receiving, from the UE based on the handover command, uplink signaling using the second set of frequency resources, and interpreting the uplink signaling on the second set of frequency resources as an acknowledgement (ACK) message associated with the handover command.

Some aspects of the method, apparatuses, and non-transitory computer-readable medium described herein may further include operations, features, means, or instructions for transmitting, to the UE, DCI including an indication of a TTI associated with the second set of frequency resources, the receiving the feedback information including receiving the feedback information during the TTI.

Some aspects of the method, apparatuses, and non-transitory computer-readable medium described herein may further include operations, features, means, or instructions for transmitting, to the UE, a handover command instructing the UE to perform a handover procedure from a first cell associated with the first beam to a second cell associated with the second beam, determining a switching window for switching from the first beam to the second beam, and determining that one or more TTIs allocated for receiving the feedback information do not overlap in time with the switching window.

Some aspects of the method, apparatuses, and non-transitory computer-readable medium described herein may further include operations, features, means, or instructions for determining that the one or more TTIs may be located prior to the switching window, the set of frequency resources including the first set of frequency resources, the receiving the feedback information including receiving the feedback information from the UE prior to switching from the first beam to the second beam based on determining that the one or more TTIs may be located prior to the switching window.

Some aspects of the method, apparatuses, and non-transitory computer-readable medium described herein may further include operations, features, means, or instructions for determining that the one or more TTIs may be located after the switching window, the set of frequency resources including the second set of frequency resources, and the receiving the feedback information including receiving the feedback information from the UE after switching from the first beam to the second beam based on determining that the one or more TTIs may be located after the switching window.

Some aspects of the method, apparatuses, and non-transitory computer-readable medium described herein may further include operations, features, means, or instructions for transmitting, to the UE, a handover command instructing the UE to perform a handover procedure from a first cell associated with the first beam to a second cell associated with the second beam, determining a switching window for switching from the first beam to the second beam, and determining that one or more TTIs allocated for receiving the feedback information at least partially overlap in time with the switching window.

Some aspects of the method, apparatuses, and non-transitory computer-readable medium described herein may further include operations, features, means, or instructions for identifying a time duration between transmitting the one or more downlink signals and receiving the feedback information, where the time duration may be greater than a minimum amount of time for switching from the first beam to the second beam, the set of frequency resources including the second set of frequency resources, and the receiving the feedback information including receiving the feedback information from the UE after switching from the first beam to the second beam and upon expatriation of the time duration.

A method of wireless communications at a base station is described. The method may include monitoring for one or more uplink signals from a UE using a first beam associated with a first set of frequency resources, performing a switch from the first beam to a second beam associated with a second set of frequency resources, and determining whether to request a retransmission of the one or more uplink signals from the UE.

An apparatus for wireless communications at a base station is described. The apparatus may include a processor and memory coupled to the processor. The processor and memory may be configured to cause the apparatus to monitor for one or more uplink signals from a UE using a first beam associated with a first set of frequency resources, perform a switch from the first beam to a second beam associated with a second set of frequency resources, and determine whether to request a retransmission of the one or more uplink signals from the UE.

Another apparatus for wireless communications at a base station is described. The apparatus may include means for monitoring for one or more uplink signals from a UE using a first beam associated with a first set of frequency resources, performing a switch from the first beam to a second beam associated with a second set of frequency resources, and determining whether to request a retransmission of the one or more uplink signals from the UE.

A non-transitory computer-readable medium storing code for wireless communications at a base station is described. The code may include instructions executable by a processor to monitor for one or more uplink signals from a UE using a first beam associated with a first set of frequency resources, perform a switch from the first beam to a second beam associated with a second set of frequency resources, and determine whether to request a retransmission of the one or more uplink signals from the UE.

Some aspects of the method, apparatuses, and non-transitory computer-readable medium described herein may further include operations, features, means, or instructions for receiving, based on the monitoring, the one or more uplink signals prior to performing the switch from the first beam to the second beam, the determining whether to request the retransmission including determining to refrain from requesting the retransmission.

Some aspects of the method, apparatuses, and non-transitory computer-readable medium described herein may further include operations, features, means, or instructions for failing, based on switching from the first beam to the second beam from the first beam to the second beam, to receive the one or more uplink signals, the determining whether to request the retransmission including determining to request the retransmission, transmitting, to the UE based on determining to request the retransmission, an RLC status report using the second set of frequency resources, the handover command optionally including an indication of one or more uplink shared channel resources on the second set of frequency resources, and receiving the retransmission over the one or more uplink shared channel resources on the second set of frequency resources.

Some aspects of the method, apparatuses, and non-transitory computer-readable medium described herein may further include operations, features, means, or instructions for transmitting, to the UE, a handover command instructing the UE to perform a handover procedure from a first cell associated with the first beam to a second cell associated with the second beam, where switching from the first beam to the second beam may be based on receiving the handover command, transmitting, to the UE based on determining whether to request the retransmission of the one or more uplink signals, an RLC status report associated with the handover command, the handover command optionally including an indication of one or more uplink shared channel resources on the second set of frequency resources, and receiving the retransmission on the one or more uplink shared channel resources on the second set of frequency resources.

In some aspects of the method, apparatuses, and non-transitory computer-readable medium described herein, the first set of frequency resources may be allocated for uplink transmissions and the second set of frequency resources may be allocated for uplink transmissions.

Some aspects of the method, apparatuses, and non-transitory computer-readable medium described herein may further include operations, features, means, or instructions for identifying a time duration between receiving the one or more uplink signals and transmitting the request for the retransmission, where the time duration may be greater than a minimum amount of time for switching from the first beam to the second beam, and transmitting, within the time duration, the request for the retransmission based on determining whether to request the retransmission.

DETAILED DESCRIPTION

Figure 1:
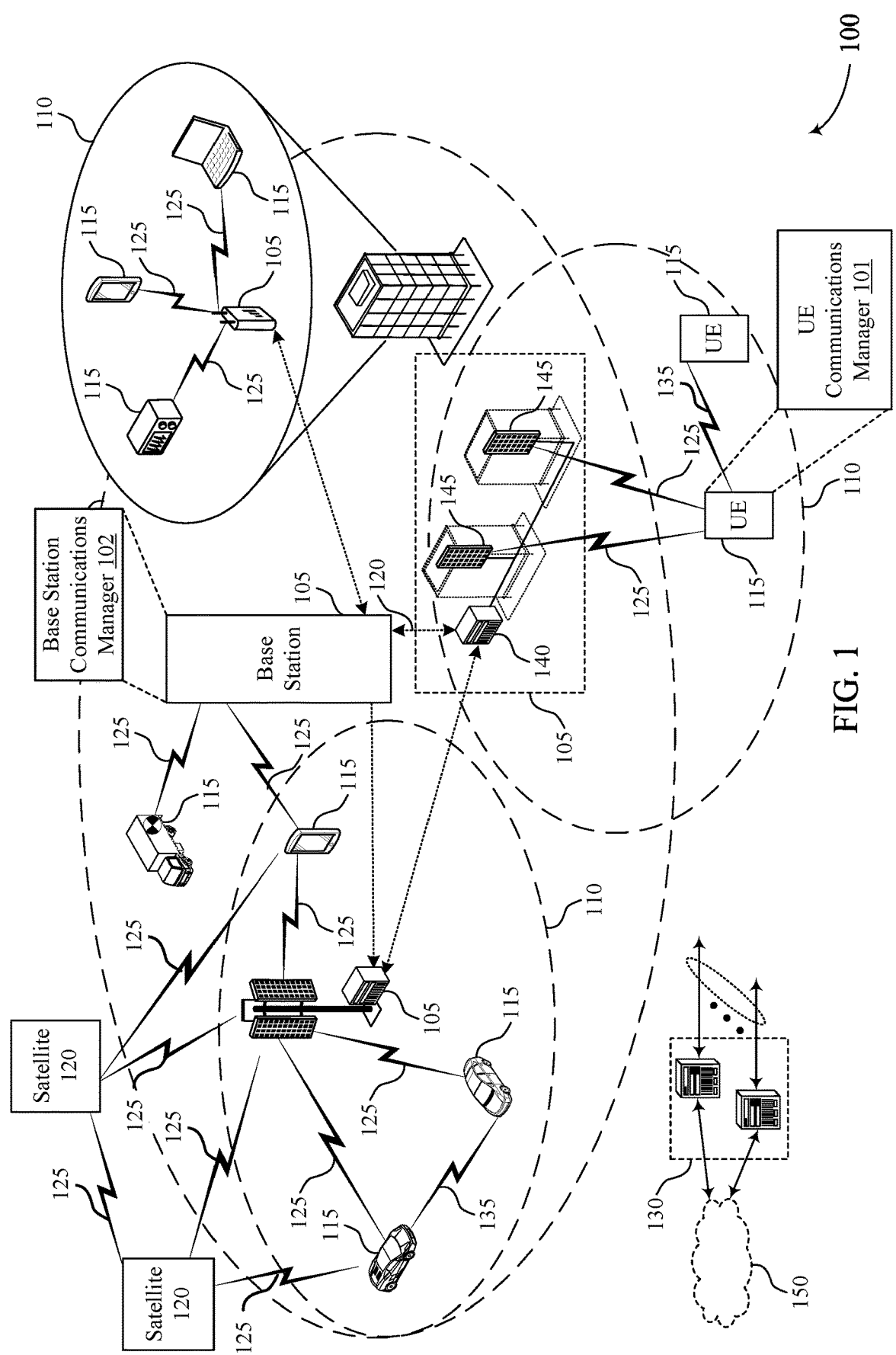
FIG. 1 illustrates an example of a system for wireless communications that supports managing retransmissions after BWP switching in accordance with one or more aspects of the present disclosure.

In some cases, a UE and a satellite may transmit control information or data messages using one or more beams associated with one or more BWPs. The satellite and the UE may be thousands of kilometers apart and it may take some time for electromagnetic waves to propagate over the distance between the satellite and the UE. Thus, any unnecessary delays in communications in the system may result in system latency and degradation of quality of service and user experience.

In some examples, a UE may switch from a first beam (e.g., a source beam) to a second beam (e.g., a target beam). The UE may change its geographic position, the satellite may change its position in orbit, necessitating a beam change or a cell change, or signal conditions may change. In some cases, the satellite may initiate a beam switch by transmitting a beam switch command, or a handover command initiating a handover procedure for the UE between a first beam and a second beam. The UE may switch from the source beam to the target beam, according to the command. Upon switching from a source beam to a target beam, the UE may also switch from a first BWP associated with the source beam to a second BWP associated with the target beam. The UE may be communicating with the satellite prior to the BWP switch. In some cases, due to the BWP switch, the UE may transmit or receive unnecessary retransmissions, resulting in decreased throughput and increased delays.

For instance, the UE may receive one or more downlink signals from a base station (e.g., from the satellite via a gateway) prior to the BWP switch. The UE may take some time to receive and process the downlink signals, and prepare feedback information associated with the downlink signals (e.g., an ACK message or negative ACK (NACK) message) for transmission to the base station. During this time, the base station may initiate a beam switch resulting in switching from the source BWP to the target BWP. If the base station switches from the source BWP to the target BWP (e.g., changes an uplink BWP) before receiving the feedback information, then the base station may fail to receive the feedback information. In such cases, the base station may erroneously determine that the UE has not received the downlink signals, and may configure a retransmission of the downlink signals. Or, the base station may initiate the BWP switch before the UE is able to transmit the feedback information. In such examples, the UE may switch from the source BWP, which may have a first resource configuration (e.g., subcarrier spacing (SCS), TTI duration, timing or periodicity of channels), to the target BWP, which may have a second resource configuration. Given the change in the resource configuration, the UE may not be able to successfully identify a timing or set of uplink resources on which to transmit the feedback information. In such examples, the base station may fail to receive feedback information, and may erroneously determine that the UE has not received the downlink signals. The base station may then configure a retransmission of the downlink signals. Such retransmissions may result in delays, system latency, decreased throughput, and decreased user experience.

In some examples, the UE may transmit one or more uplink signals on the source BWP prior to the BWP switch. If the satellite switches from the source BWP to the target BWP (e.g., changes a downlink BWP) before transmitting acknowledgement information to the UE, then the UE may erroneously determine that the satellite did not receive the uplink signals. In such cases, the UE may send a retransmission of the uplink signals after switching to the target BWP. Or, the base station may receive the uplink signals, and may transmit feedback information to the UE. However, if the UE has already switched from the source BWP to the target BWP (e.g., changed a downlink BWP), then the UE may not receive the feedback information, and may erroneously assume that the base station has not received the uplink signals. In such cases, the UE may send a retransmission of the uplink signals after switching to the target BWP. Such retransmissions may result in delays, system latency, decreased throughput, and decreased user experience.

To avoid unnecessary downlink retransmissions and system delays, a UE may transmit feedback information on a source BWP (e.g., an uplink BWP) before switching from the source BWP to the target BWP, and may complete the BWP switch after transmitting the feedback information. In such examples, the base station may monitor the source BWP for an extended period of time prior to switching to the target BWP. In some examples, the UE may wait until after switching from the source BWP to the target BWP, and may then transmit feedback information on the target BWP. In such examples, the UE may determine a timing or a set of resources for transmitting the feedback information on the target BWP (e.g., based on an indication from the base station or one or more rules). In some examples, a UE may dynamically determine (e.g., based on a timing of a BWP switch and a timing of any pending feedback information transmissions) whether to transmit feedback information on the source BWP prior to the BWP switch or on the target BWP subsequent to the BWP switch.

In some examples, to avoid unnecessary uplink retransmissions and system delays, a UE may determine whether to transmit an uplink retransmission based on a number of factors. For instance, the UE may monitor for an extended period of time for a grant of resources for an uplink transmission on the target BWP, and may determine, based on an absence of such a grant, that the first transmission was success and that a retransmission is unnecessary. In some examples, the UE may monitor for an RLC status report, or a PDCP status report, which may be triggered by a BWP switch. The RLC status report may indicate RLC packet data units (PDUs) that were not received by the base station for retransmission. In some examples, the base station may transmit a RAR message including a status report (e.g., a PDCP status report) indicating a last SEQN received correctly, or in correct order, or both. The UE may use this information to determine which, if any, uplink transmissions are to be send in a retransmission. In the case of an uplink BWP switch, the UE may wait for an extended duration to generate or perform an uplink retransmission to accommodate the time taken for an uplink BWP switch.

Particular aspects of the subject matter described herein may be implemented to realize one or more results. The described techniques may support improvements in system efficiency such that a device may avoid inefficiently receiving duplicate downlink transmissions, or sending duplicate retransmissions. It may also allow a device to reduce delays, increase system efficiency, reduce system latency, increase throughput, and improve user experience, among other improvements.

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to retransmission after BWP switching.

FIG. 1 illustrates an example of a wireless communications system 100 that supports default satellite beam for communication networks in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies. One or more UEs 115 may include a wireless communications manager 101, which may be an example of communications managers described with reference to FIGS. 9-12. One or more base stations 105 (e.g., or satellites 120 acting as base stations 105) may include a wireless communications manager 102, which may be an example of communications managers described with reference to FIGS. 13-16.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 (also referred to as gateways in NTNs) and UEs 115 (or other high altitude or terrestrial communications devices). Satellite 120 may be any suitable type of communication satellite configured to relay communications between different end nodes in a wireless communications system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth. In some examples, as described herein, a base station may refer to a stationary base station 105 (e.g., a stationary base station), a satellite 120 (e.g., a terrestrial moving ship or vehicle), or any combination thereof.

In some cases, a cell may be provided or established by a satellite 120 as part of an NTN. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa. In accordance with one or more aspects of the present disclosure, a UE 115 may communicate with a cell provided or established by a satellite 120 (e.g., via a base station 105 or a satellite 120 performing the functions of a base station 105) according to an identified default set of one or more beams based on an inactivity timer expiring, which may enhance communications reliability.

In some cases, a UE 115 and a satellite 120 may transmit control information or data messages using one or more beams associated with one or more BWPs. The satellite 120 and the UE 115 may be thousands of kilometers apart and it may take some time for electromagnetic waves to propagate over the distance between the satellite 120 and the UE 115. The distance that a transmission travels may result in substantial signal degradation due to, for example, atmospheric effects, interference from other radio frequency sources, signal attenuation due to vegetation or structures, and the like. Further, due to the relatively large real time difference (RTD) associated with propagation delays between the satellite 120 and the UE 115, an inactivity timer associated with a beam may expire. The UE 115 may use an inactivity timer to determine if one or more BWPs have expired (i.e., are no longer active). In some examples, such as when the satellite 120 is in low earth orbit, the inactivity timer may expire prior to the UE 115 leaving the coverage of the beam. However, when the inactivity timer expires, the UE 115 may revert back to one or more default BWPs associated with an outdated beam. Additionally, or alternatively, due to the high mobility of the UE 115 relative to the satellite 120, the UE 115 may frequently switch beams. In some cases, the beam switching operation may fail (e.g., due to loss of control messages), and the UE 115 may revert back to using an outdated beam, which may cause high signaling volume and inefficient resource allocation at the UE 115 (e.g., due to cell search operations).

In some examples, a UE 115 may determine a default satellite beam while considering the mobility of the satellite 120, which may improve the efficiency of beam switching operations in NTNs among other improvements. For example, the UE 115 may determine an inactivity timer associated with a beam has expired. In some cases, the UE 115 may identify location information corresponding to the location of the UE 115 with respect to the satellite 120 and may transmit the location information to the satellite 120. The satellite 120 may determine beam geometry information for one or more beams (e.g., based on the location information or a current beam). In some cases, the satellite 120 may transmit the beam geometry information to the UE 115. Additionally, or alternatively, the UE 115 may identify the beam geometry information, for example, by using a beam identifier, a satellite identifier, the location information, or the like to infer the beam geometry information, which may be a function of time.

In some cases, the UE 115 may process the beam geometry information and the location information to determine one or more default beams (e.g., a default beam or a default beam tuple) that accounts for the mobility of the satellite 120 relative to the UE 115. In some examples, the UE 115 may report the one or more default beams to the satellite 120 or to the network, and the satellite 120 or the network may transmit a feedback message confirming the reception of the one or more default beams. In some examples, the UE 115 may use the one or more default beams to perform a beam switching operation. For example, the UE 115 may switch to one or more default BWPs associated with a default beam. Otherwise (e.g., if the default beam is a beam tuple or if there are multiple default beams), the UE 115 may transmit a scheduling request to the satellite 120, may perform a contention-free random access (CFRA) procedure with the satellite 120, or may perform a contention-based random access (CBRA) procedure with the satellite 120. The satellite 120 may be in communication with a UE 115 via one or more beams associated with one or more BWPs. In some cases, the satellite 120 and the UE 115 may change beams, which may result in a BWP switch. In such cases, the UE 115 may determine on which BWP to transmit feedback information. In some examples, the UE 115 may determine whether to send a retransmission of uplink signals based on the BWP switch.

Figure 2:
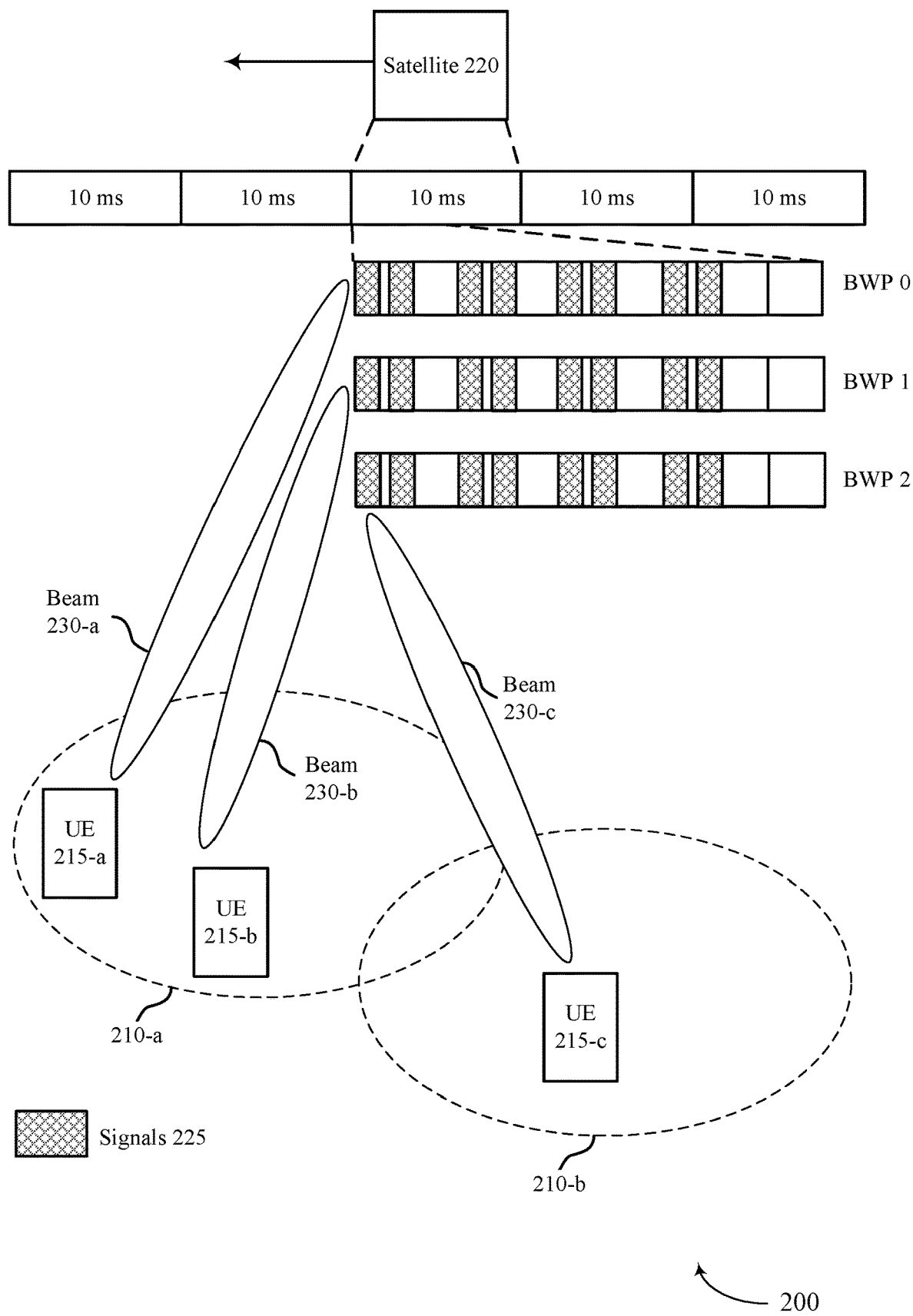
FIG. 2 illustrates an example of a wireless communications system that supports managing retransmissions after BWP switching in accordance with one or more aspects of the present disclosure.

FIG. 2 illustrates an example of a wireless communications system 200 that supports managing retransmissions after BWP switching in accordance with one or more aspects of the present disclosure. In some examples, wireless communications system 200 may implement aspects of wireless communications system 100. Wireless communications system 200 may include one or more UEs 215, and a satellite 220, which may be examples of a UE 115, and a satellite 120, as described with reference to FIG. 1. In some cases, the satellite 220 may receive a signal from a base station 105 and may relay the signal to a UE 115 or may perform the functions of a base station 105 as described with reference to FIG. 1. In some examples, the UEs 215 may communicate directly with satellite 220 via a gateway. The satellite 220 may serve one or more coverage areas 210 of an NTN.

In some cases, the coverage areas 210 may be beam footprints or may include multiple beam footprints corresponding to one or more beams 230 configured at the satellite 220 for communicating with one or more UEs 215. For example, the satellite 220 may use multiple antennas to form one or more beams 230 (e.g., narrow beams) for communication with one or more UEs 215. Each beam may serve one or more UEs 215 within a beam footprint. Each beam footprint may correspond to a particular beam 230, that is identified within the footprint and transmitted by a network entity. The footprints may be associated with a variety of shapes, such as circular, elliptical, hexagonal, or the like. The shape and size of the footprint may depend on the distance of the transmitting device (e.g., network entity) from the surface of the earth, the transmitting angle, and the like. Further, footprints that are adjacent may have different shapes and sizes dependent on the transmission angle and distance of the transmitting device. In some cases, footprints 220 may overlap.

In some examples, the beam footprint may be equal to or the same as a coverage area 210. For instance, satellite 220 may serve UE 215-c via beam 230-c, and the beam footprint of beam 230-c may be equal to coverage area 210-b. In some examples, multiple beam footprints for various beams 230 may be located within a geographic coverage area 210. Because each beam 230 provides service within a beam footprint, if a UE 215 change its location from a first coverage area 210-a associated with a first beam 230-b to a second coverage area 210-b associated with a second beam 230-c, the UE 215 may also change from the beam 230-b to beam 230-c. That is, a change in beam footprint may result in a change in beam 230. Thus, a beam change may also be referred to as a footprint change, and vice versa.

In some examples, a beam footprint may be equal to a coverage area 210 or may be located within a coverage area 210. For instance, satellite 220 may serve UE 215-a and UE 215-b within coverage area 210-a. Beam 230-a may have a beam footprint within coverage area 210-a, and beam 230-b may have a different beam footprint within coverage area 210-a. The beams 230 may operate on different frequency intervals (e.g., different BWPs) to reduce interference among the beams 230. That is, beam 230-a may operate using BWP 0, beam 230-b may operate using BWP 1, and beam 230-c may operate using BWP 2. Thus, satellite 220 may send one or more signals 225 or receive one or more signals 225 over beams 230 on the BWP corresponding to a beam 230. In some examples, the satellite 220 may configure the one or more beams 230 as a single cell. In some other examples, the satellite 220 may configure the one or more beams as separate cells.

In some examples, the UE 215 may determine a beam 230 to use for communication based on monitoring for a broadcast message from the satellite 220. For example, the satellite 220 may broadcast one or more synchronization signal blocks (SSBs) to one or more UEs 215. The UE 215 may detect an SSB, which may include a master information block (MIB), a system information block (SIB) (e.g., a first type of SIB (SIB1)), or both. The UE 215 may decode the MIB to identify one or more parameters which may be used to detect and decode the SIB1. For example, the one or more parameters may include a bandwidth, a control resource set (CORESET), a search space, other parameters related to resource allocation, or a combination associated with the SIB1. In some examples, the SIB1 may include location information (e.g., a pointer) corresponding to a second type of SIB (SIB2). The SIB2 may include one or more configurations for BWPs associated with a beam 230 used for communication with the satellite 220. Additionally, or alternatively, the UE 215 may receive radio resource control (RRC) signaling indicating the one or more configurations for the BWPs associated with the beam 230.

In some examples, the satellite 220 may communicate with the UE 215 via one or more communication links using the beam 230. For example, the satellite 220 may transmit a message to the UE 215 via a communication link that may be used for downlink communications, while the UE 215 may transmit a message to the satellite 220 via a communication link that may be used for uplink communications. The satellite 220 and the UE 215 may use beams 230 for both uplink and downlink communications.

The satellite 220 and the UE 215 may be thousands of kilometers apart and it may take some time for electromagnetic waves to propagate over the distance between the satellite 220 and the UE 215. The propagation delay for NTNs may be many orders of magnitude larger than the propagation delay for terrestrial networks. By way of example, the satellite 220 may be in an orbit, such as low earth orbit, medium earth orbit, other non-geostationary earth orbit, or geostationary earth orbit. In any of these examples, the satellite 220 may be many thousands of kilometers from earth, and therefore may be thousands of kilometers from the UE 215. Each transmission via a communication link between the satellite 220 and the UE 215 may therefore travel from earth the distance to the satellite 220 and back to earth.

Due to movement of satellite 220, a UE may experience a change of serving cell, and an accompanying physical cell identifier (PCID), or serving beam and associated BWP, or both. Such rapid changes may occur even if the UE is stationary. For example, each coverage area 210 may have a 100 km cell diameter. Satellite 220 may move at a rate of speed of, for instance, 7.65 km per hour. In such an example, even a stationary UE 215 may experience a handover procedure every 13.2 seconds. A network may be aware of what time such handovers are to be performed (e.g., based on a predicable path of satellite 220, UE 215, or both). In some examples, multiple UEs 215 may perform handovers to the same target satellite 220. Each time a UE 215 changes beams, it may also switch BWPs.

A UE 215 may switch beams within a coverage area 210 or when moving from a first coverage area 210 to a second coverage area 210. For example, UE 215-c may move from coverage area 210-b to coverage area 210-a. In such examples, UE 215-c may be communicating with satellite 220 on BWP 2, and may switch from beam 230-c to beam 230-b upon crossing into coverage area 210-a. Because of the beam switch, UE 215-c may also switch from BWP 2 to BWP 1. Similarly, UE 215-b may switch from beam 230-b to beam 230-a within coverage area 210-a. The beam switch may be a result of movement by UE 215-b, movement or handover by a satellite 220, or a combination thereof. In some examples, a UE 215-b may switch from beam 230-b to beam 230-a based on a beam selection or beam refinement procedure, or based on detected interference or degraded signal quality on beam 230-b. Because of a beam switch from beam 230-b to beam 230-a, UE 215-b may also switch from BWP 1 to BWP 0.

A UE 215 may perform a beam switch within a cell. For example, UE 215-b may switch from beam 230-b, which may be associated with a first SSB index and a PCID associated with coverage area 210-a, to beam 230-a, which may be associated with a second SSB index and the same PCID. UE 215-b may also switch from BWP 1 to BWP 0. In some wireless communications systems (e.g., a terrestrial network), switching between beams may not result in a BWP switch. However, in other examples (e.g., in an NTN), BWP 0 may have a different numerology (e.g., a different SCS, TTI, or the like) than BWP 1. Thus, if UE 215-b were receiving downlink signals on BWP 1 prior to the BWP switch, UE 215-b may not be able to identify resources on which to transmit feedback information (e.g., a HARQ ACK message) on BWP 0. The lack of a HARQ ACK message may result in satellite 220 sending an unnecessary retransmission on BWP 0 of one or more downlink signals previously transmitted on BWP 1. This may result in increased delays.

A UE 215 may perform a beam switch across cells. For example, UE 215-c may switch from beam 230-c, which may be associated with a first SSB index and a first PCID associated with coverage area 210-b, to beam 230-b, which may be associated with a second SSB index and a second PCID. UE 215-c may also switch from BWP 1 to BWP 0. In some examples (e.g., in an NTN), BWP 1 may have a different numerology (e.g., a different SCS, TTI, or the like) than BWP 2. Thus, if UE 215-c were receiving downlink signals on BWP 2 prior to the BWP switch, UE 215-c may not be able to identify resources on which to transmit feedback information (e.g., a HARQ ACK message) on BWP 1. The lack of a HARQ ACK message may result in satellite 220 sending an unnecessary retransmission on BWP 1 of one or more downlink signals previously transmitted on BWP 2. This may result in increased delays.

Satellite 220 or a UE 215 may initiate a beam switch and corresponding BWP switch. For instance, a satellite 220 may initiate a handover procedure (e.g., by transmitting a handover command to a UE 215-c). Satellite 220 may initiate the handover command based on movement of satellite 220, movement of a UE 215-c (e.g., from coverage area 210-b into coverage area 210-a), handover from one satellite 220 to another satellite 220, or a combination thereof. In the case of a handover procedure, satellite 220 may have already transmitted one or more large TBs to UE 215-c (e.g., via beam 230-c on BWP 2). UE 215-c may transmit feedback information (e.g., one or more HARQ ACK messages) to satellite 220 prior to performing a BWP switch, but satellite 220 may not receive some or all of the transmitted feedback information. Or, a UE 215-c may receive al TBs but may not be able to send one or more feedback information to satellite 220 prior to a BWP switch. In some examples, satellite 220 may receive all transmitted feedback information and then receive the handover command. However, satellite 220 may receive the feedback information after sending the handover command. In such examples, satellite 220, or a UE 215-c, or both, may initiate the BWP switch before transmitting, or receiving, or both, an indication that the feedback information has been received. In some examples, a UE 215 may initiate a beam switch and accompanying BWP switch based on beam conditions, or a beam refinement or beam selection procedure.

Beam switches and accompanying BWP switches may result in unnecessary retransmissions that increase delays, system congestion, and system latency, and decrease quality of service and user experience. For instance, a UE 215 may be receiving downlink signals prior to a BWP switch, as described in greater detail with reference to FIG. 3. Techniques for improving system efficiency in such cases are described with reference to FIGS. 4-6. A UE 215 may be transmitting uplink signals prior to a BWP switch, as described with reference to FIG. 7. Techniques for improving system efficiency in such cases are described with reference to FIG. 8.

Figure 3:
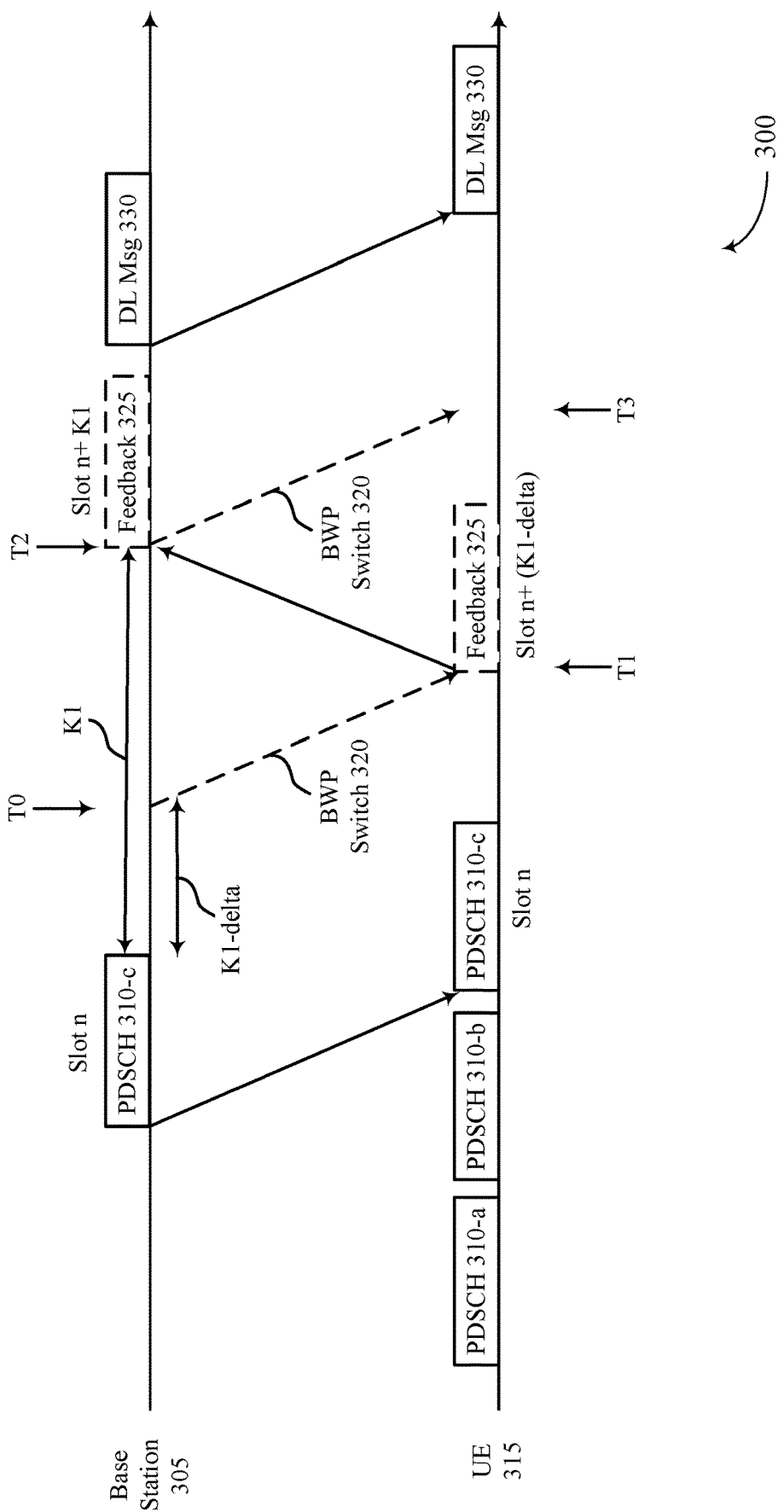
FIG. 3 illustrates an example of a timeline that supports managing retransmissions after BWP switching in accordance with one or more aspects of the present disclosure.

FIG. 3 illustrates an example of a timeline 300 that supports managing retransmissions after BWP switching in accordance with one or more aspects of the present disclosure. In some examples, timeline 300 may implement aspects of wireless communications system 100. Timeline 300 may be implemented by a UE 315 and a base station 305 (e.g., a satellite acting as a base station 105, or a gateway in communication with a satellite 120, or the like), which may be examples of corresponding devices as described with reference to FIGS. 1 and 2. As described in greater detail with reference to FIG. 2, performing a beam switch may result in a BWP switch. BWP switches may result in failure to communicate feedback information, which may in turn result in unnecessary retransmissions and increased delays in an NTN.

In some examples, base station 205 may be in communication with UE 315. Base station 305 may communicate with UE 315 via one or more physical downlink shared channels (PDSCHs) 310 (e.g., PDSCH 310-a, PDSCH 310-b, and PDSCH 310-c). UE 315 may monitor for and receive downlink signals on the PDSCHs 310. Base station 305 may transmit, in slot n, downlink signals on PDSCH 310-c, and may monitor for feedback 325 (e.g., a HARQ ACK message or a HARQ NACK message) associated with PDSCH 310-c. Base station 305 may monitor for feedback 325 for a time duration (e.g., K1). K1 may be greater than or equal to a round trip time (RTT) between base station 305 and UE 315, such that UE 315 has time to receive the downlink signals on PDSCH 310-c, process them, and prepare and transmit feedback 325. In some examples, base station 305 may initiate a timer (e.g., a drx-RetransmssionTimerDL) upon transmitting PDSCH 310-c. The timer may have a duration that is greater than or equal to K1. At slot n+K1 (e.g., upon expiration of the timer or in a next slot after K1), if base station 305 has not received feedback 325, then base station may transmit a downlink message 330, which may be a retransmission of the downlink signals transmitted at PDSCH 310-c. If base station 305 does receive feedback 325 at slot n+K1, then base station 305 may transmit new data in downlink message 330, or an acknowledgment message of the feedback 325, or a combination thereof.

In some examples, base station 305 and UE 315 may perform a BWP switch 320. For instance, at time T0 (e.g., at a time that is an amount of time $\Delta$ less than K1 (K1−$\Delta$)) base station 305 may initiate a BWP switch 320 (e.g., from a source BWP to a new BWP). Base station 305 may transmit a handover command at time T0, or may autonomously initiate a BWP switch procedure. The BWP switch may be for an uplink BWP. At time T1 (e.g., upon receiving a handover command), UE 315 may initiate BWP switch 320. In such examples, UE 315 may switch uplink BWPs before transmitting the feedback 325 on a physical uplink control channel (PUCCH) on the source BWP. On the target BWP, UE 315 may not know on which resources (e.g., a location of PUCCH resources) on which to transmit the feedback 325. Even if UE 315 does identify resources and transmit feedback 325 after completing a BWP switch 320 (e.g., at time T3), the drx-RetransmissionTimerDL may have expired at base station 305, and base station 305 may have already determined to send a retransmission in the downlink message 330. Thus, having failed to receive feedback 325, base station 305 may initiate an unnecessary retransmission.

In some examples, base station 305 may initiate a BWP switch after UE 315 transmits feedback 325. For instance, base station 35 may initiate a BWP switch 320 at time T2. Although UE 315 may have previously transmitted feedback 325 at time T1, base station may begin to perform BWP switch 320 at time T2, and may not receive feedback 325. In such examples, base station 305 may schedule downlink message 330, which may include a retransmission. This may result in increased delays and system latency.

On technique for avoiding such unnecessary retransmissions or duplicate transmissions and increased delays may be to avoid scheduling any downlink data for a threshold amount of time prior to BWP switching. For instance, base station 305 may refrain from scheduling any downlink data transmissions during one or more PDSCHs 310 prior to BWP switch 320. Base station 305 (e.g., a satellite 120) may be able to predict handover procedures, beam changes, and the like, and may therefore be able to predict BWP switch 320 and refrain from scheduling any downlink signaling on PDSCHs 310 during a threshold number of slots or amount of time prior to BWP switch 320. However, as a result of the high number of handover procedures and beam switches that may be experienced in an NTN (e.g., due to the high speed of travel and large RTT for a satellite 120), such techniques may result in poor quality of service (e.g., a large time interval where there is no downlink data transmissions). Such time intervals may not be acceptable for delay sensitive applications.

Instead, a UE 315 may transmit feedback information before performing a BWP switch 320 on a source BWP, or may transmit feedback information after performing a BWP on a target BWP, or may dynamically determine whether to transmit the feedback information before or after a BWP switch 320 based on one or more rules, as described in greater detail with reference to FIGS. 4-6.

Figure 4:
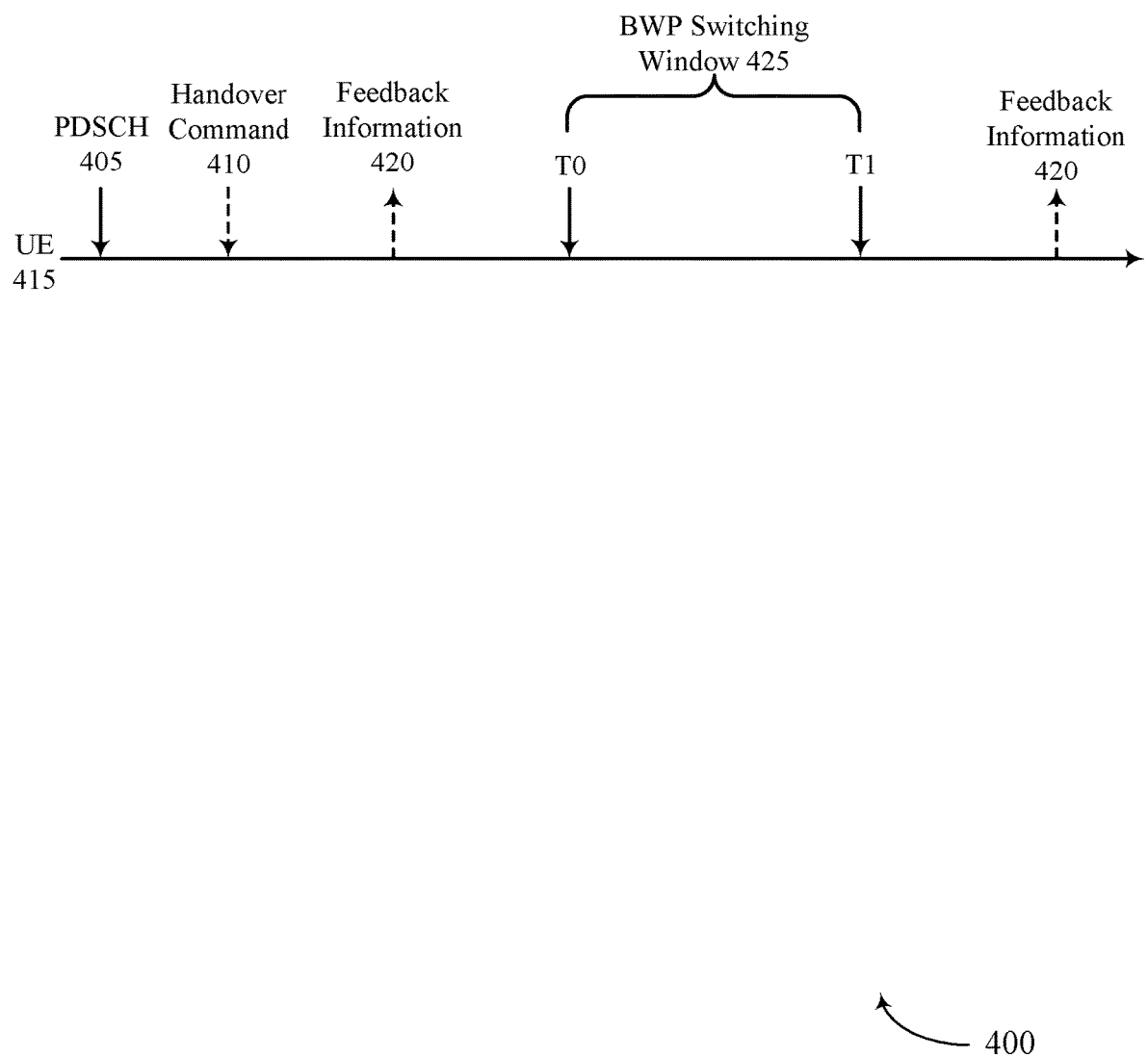
FIG. 4 illustrates an example of a timeline that supports managing retransmissions after BWP switching in accordance with one or more aspects of the present disclosure.

FIG. 4 illustrates an example of a timeline 400 that supports managing retransmissions after BWP switching in accordance with one or more aspects of the present disclosure. In some examples, timeline 400 may implement aspects of wireless communications system 100. Timeline 400 may be implemented by a base station 105 (e.g., a satellite 120 operating as a base station, or a gateway in communication with a satellite 120) and a UE 415, which may be examples of corresponding devices described with reference to FIGS. 1-3.

In some examples, UE 415 may decrease duplicate transmissions by transmitting feedback information 420 prior to a BWP switch (e.g., an uplink BWP switch). A base station may transmit, and UE 415 may receive, one or more downlink signals on PDSCH 405. UE 415 may prepare feedback information 420 (e.g., an ACK message or a NACK message) associated with the downlink signals received on PDSCH 405 for transmission to the base station. At T0, UE 415 may initiate a BWP switch. Performing the BWP switch may take some amount of time, (e., BWP switching window, and UE 415 may complete the BWP switch at time T1. In some examples, UE 415 may autonomously initiate the BWP switch. In some examples, the base station may initiate the BWP switch (e.g., by transmitting a handover command 410).

UE 415 may transmit feedback information 420 before initiating the BWP switch at time T0. In such examples, the base station may continue to monitor the source uplink BWP for an extended time duration for feedback information 420, before switching from the source BWP to the target BWP. For example, upon determining that a BWP switch is to occur, instead of immediately initiating the BWP switch, the base station may continue to monitor for a predetermined, configured, or rule-based amount of time, for feedback information 420. In some examples, the base station may continue to monitor the source BWP until the extended time expires. In some examples, the base station may monitor until a next PUCCH opportunity for feedback information. In such examples, the E 415 may transmit the feedback information 420 on the next available PUCCH opportunity on the source BWP after determining that a BWP switch is pending. Thus, UE 415 may transmit, and the base station may receive, feedback information 420 on the source BWP prior to the BWP switch.

In some examples, the base station may initiate the BWP switch by transmitting a command to UE 415. The command may be a beam switch command, or a handover command 410. The command may be included in a DCI message, a MAC message, higher layer signaling (e.g., RRC signaling) or the like. For instance, the base station may transmit a handover command 410 to UE 415. The handover command may include instructions for UE 415 to switch from a first cell having a first PCID to a second cell having a second PCID. Handover command 410 may trigger an RLC status report for the source BWP. In response to receiving the handover command 410, UE 415 may generate an RLC status report including feedback information 420, and may transmit the RLC status report to the base station on the source BWP.

In some examples, in response to receiving handover command 410, UE 415 may generate MAC CE based feedback information (e.g., MAC CE HARQ feedback). In such cases, the feedback information 420 may include feedback information for multiple HARQ processes (e.g., bulk HARQ feedback for multiple HARQ processes). That is, feedback information 420 may include feedback information (e.g., ACK or NACK messages) for all pending HARQ processes. If UE 415 has received downlink signaling associated with multiple HARQ processes (e.g., for multiple TBs, multiple downlink messages, or the like), then feedback information 420 may include feedback for all of the pending HARQ processes. The feedback information may be a single message (e.g., an ACK or a NACK) for all pending HARQ processes, or individual messages (e.g., ACK or NACK messages) for individual HARQ processes.

In some examples, the base station may indicate, to UE 415, scheduling information for feedback information 420. For example, handover command 410 may include an indication of resources (e.g., on a physical uplink shared channel (PUSCH)) on the source BWP for feedback information 420. In some examples, the indication of resources may be multiplexed with the handover command 410, or may be transmitted separately from the handover command 410.

After transmitting feedback information 420 on the source BWP, UE 415 may initiate the BWP switch at time T0. After completing the BWP switch at time T1, UE 415 may continue to communicate with the base station using the target BWP. In some examples, UE 415 may not monitor for or expect an ACK message from the base station indicating that the feedback information 420 has been successfully received. In some examples, the feedback information 420 may include an ACK message. In such cases, the base station may determine that UE 415 successfully received the downlink signals transmitted on PDSCH 405, and may refrain from transmitting an unnecessary retransmission, which may result in increased system efficiency, decreased delays and system latency, and increased user experience.

After switching from the source BWP to the target BWP, UE 415 may determine that a value for a time duration between receiving downlink signals on PDSCH 405 and transmitting feedback information 420 (e.g., K1, as described in greater detail with reference to FIG. 3) is not valid for the target BWP. That is, a value for K1 may only be valid on the source BWP on which DCI associated with the PDSCH is received. The base station may configure, or UE 415 may determine, a new value for K1 for the target BWP.

In some examples, UE 415 may transmit feedback information 420 on a target BWP after a BWP switch. In some examples, UE 415 may receive one or more downlink signals on PDSCH 405, and may prepare feedback information 420 associated with the one or more data signals for transmission to the base station. UE 415 may determine that a BWP switch is pending. UE 415 may perform the BWP switch, and then may transmit feedback information 420 on the target BWP.

In some examples, the target BWP may have different PUCCH configuration than the source BWP. For instance, the location, periodicity, timing, TTI duration, resource size, or the like, may be different on the target BWP. Thus, a timing or resource location for transmitting feedback information 420 may be different on the target BWP than a timing or resource location for transmitting feedback information 420 on the source BWP. In some examples, UE 415 may transmit feedback information 420 on a first PUCCH occasion after time T1 on the target BWP. The first PUCCH occasion may be pre-defined, or may be preconfigured. In some examples, UE 415 may extend a time period (e.g., a delay) between receiving PDSCH 405 and transmitting feedback information 420 to accommodate the BWP switching window 425 (e.g., the amount of time utilized by UE 415 to perform the BWP switch). In some examples, HARQ timers, discontinuous reception (DRX) timers, or the like, may be extended by an offset that is equal to or greater than BWP switching window 425. Such extensions of the timer duration may allow UE 415 to transmit, and the base station to monitor for and receive, feedback information 420 after time T1, even if an unadjusted timer would have expired due to the duration of BWP switching window 425.

In some examples, resource for transmitting feedback information 420 on the target BWP (e.g., a first PUCCH occasion after time T1 on the target BWP) may be configured for group feedback information. For instance, the first PUCCH occasion may be configured (e.g., by a network device via higher layer signaling) to receive group ACK or group NACK of all pending HARQ processes or TBs received before time T0. The group ACK or group NACK may include a single message (e.g., an ACK or a NACK) for all pending HARQ processes. Thus, if even one TB or signal of group of TBs or signals received prior to time T0 was not successfully received, UE 415 may transmit a NACK message in feedback information 420.

In some examples, UE 415 may refrain from transmitting any feedback information (e.g., an ACK message or NACK message) for the handover command 410. Instead, UE 415 may proceed to perform the BWP switch, and may communicate with the base station on the target BWP (e.g., may transmit feedback information 420 on the target BWP). This may increase the speed with which UE 415 is able to initiate the BWP switch, and may decrease delays. In such examples, the base station may interpret any uplink signal received from UE 415 on the target BWP (e.g., feedback information 420) as an acknowledgement of handover command 410.

In some examples, feedback information 420 on the target BWP after a BWP switch may include an RLC status report or MAC CE based HARQ feedback for all TBs received before the uplink BWP switch. A pre-allocated uplink grant may be configured for the target BWP.

In some examples, UE 415 may determine a default value for a time duration between receiving downlink signals on PDSCH 405 and transmitting feedback information 420 (e.g., K1, as described in greater detail with reference to FIG. 3). The base station may indicate, to UE 415, the default value for K1 (e.g., via a DCI message). The default K1 value may be associated with the source BWP, but not the target BWP. If UE 415 misses or does not successfully receive or decode a handover command 410 or BWP switch command, then UE 415 may continue to use the default K1 value. The default K1 value may have a lower value than a value corresponding to a beam switch command, BWP switch command, or handover command 410.

In some examples, the base station may indicate, to UE 415, resources on a target BWP on which to transmit feedback information 420 after a BWP switch. That is, the base station may perform cross BWP scheduling for the feedback information 420. The indication of resources may include resource indices, or an updated (e.g., extended) amount of time to wait before transmitting feedback information 420 (e.g., an extended K1 value). In such examples, UE 415 may prioritize the explicit indication from the base station of when to transmit feedback information 420 over the default value of K1. In some examples, the base station may provide the indication of resources or updated amount of time to UE 415 via a DCI message.

In some examples, UE 415 may determine whether to transmit feedback information 420 before BWP switching window 425 or after BWP switching window 425, based on one or more rules. For example, UE 415 may determine whether resources for transmitting feedback information 420 overlap in time with BWP switching window 425. In some examples, UE 415 may receive a command (e.g., a handover command, or a BWP switch command) via a DCI (e.g., DCI format 1_1). If resources for transmitting feedback information 420 are located prior to BWP switching window 425 and do not overlap in time with BWP switching window 425, then UE 415 may transmit feedback information 420 on the source BWP prior to time T0, as described herein with reference to FIG. 4. If resources for transmitting feedback information 420 are located after BWP switching window 425 and do not overlap in time with BWP switching window 425, then UE 415 may transmit feedback information 420 on the target BWP after time T1, as described herein with reference to FIG. 4. The base station may likewise determine whether resources for receiving feedback information 420 are scheduled prior to or subsequent to BWP switching window 525, and may monitor for and receive feedback information 420 on the source BWP or the target BWP based thereon.

In some examples, UE 415 may determine that scheduled resources for transmitting feedback information 420 overlap at least partially in time with BWP switching window 425, as described in greater detail with reference to FIG. 5.

Figure 5:
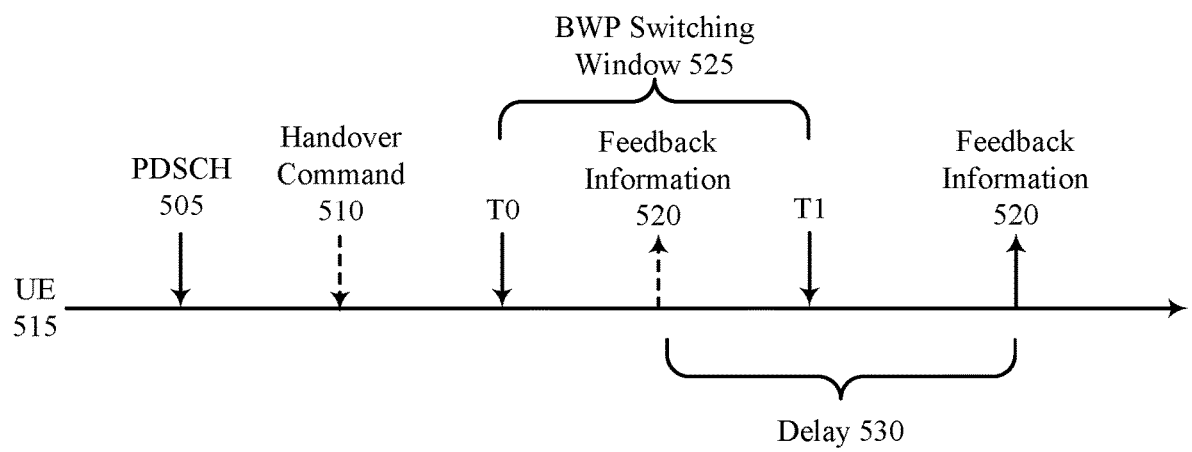
FIG. 5 illustrates an example of a timeline that supports managing retransmissions after BWP switching in accordance with one or more aspects of the present disclosure.

FIG. 5 illustrates an example of a timeline 500 that supports managing retransmissions after BWP switching in accordance with one or more aspects of the present disclosure. In some examples, timeline 500 may implement aspects of wireless communications system 100. Timeline 500 may be implemented by a base station 105 (e.g., a satellite 120 operating as a base station, or a gateway in communication with a satellite 120) and a UE 515, which may be examples of corresponding devices described with reference to FIGS. 1-4.

UE 515 may receive one or more downlink signals on PDSCH 505. UE 515 may determine to perform a BWP switch (e.g., may receive a BWP switch command, a beam switch command, a handover command 510, or the like). UE may generate feedback information 520 associated with the one or more downlink signals, and may prepare feedback information 520 for transmission to the base station.

UE 515 may determine, based on one or more rules, whether to transmit feedback information 520 before BWP switching window 525 or after BWP switching window 525. For example, UE 515 may receive a command (e.g., a downlink BWP switch command via a DCI format 1_1). UE 515 may determine that scheduled resources for transmitting feedback information 420 overlap at least partially in time with BWP switching window 525. IN such examples, UE 515 may transmit feedback information 520 after performing the BWP switch (e.g., after time T1) on the target BWP. UE 515 may apply delay 530 to the timing of feedback information 520. Delay 530 may be long enough to allow UE 515 to complete the BWP switch (e.g., during BWP switching window 525) and transmit feedback information 520 on the target BWP. Delay 530 may be preconfigured, or may be indicated to UE 515 by the network. UE 515 may adjust a HARQ process timer, an RLC timer (e.g., a t-reassembly) according to delay 530. The network (e.g., the base station) may follow the same rules. That is, if the base station determines that feedback information 520 is scheduled to overlap in time with BWP switching window 525, then the base station may apply the preconfigured or indicated delay 530 and monitor for and receive feedback information 520 on the target BWP after the BWP switch.

Figure 6:
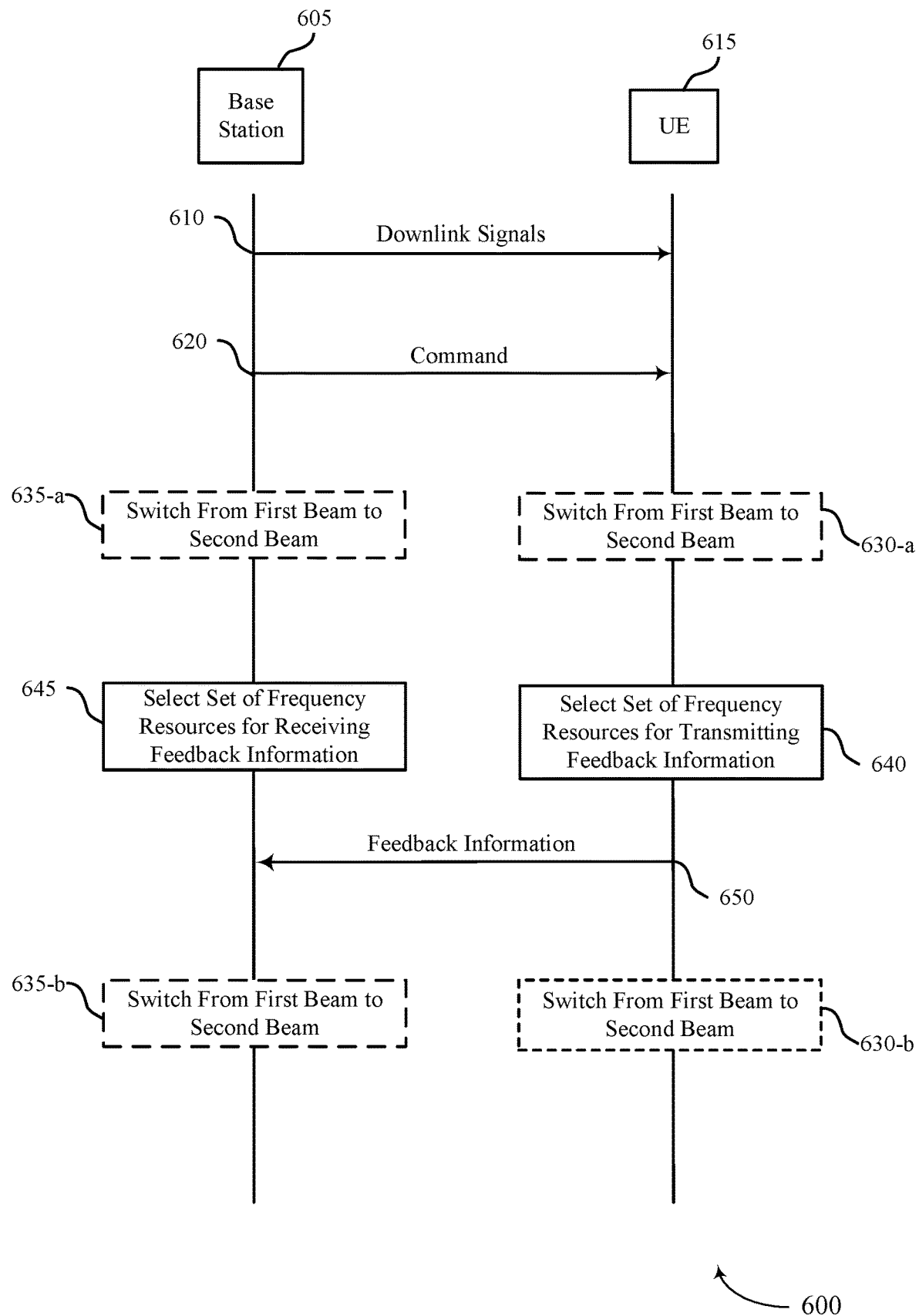
FIG. 6 illustrates an example of a process flow that supports managing retransmissions after BWP switching in accordance with one or more aspects of the present disclosure.

FIG. 6 illustrates an example of a process flow 600 that supports managing retransmissions after BWP switching in accordance with one or more aspects of the present disclosure. In some examples, process flow 600 may implement aspects of wireless communications system 100. Process flow 600 may be implemented by a base station 605 (e.g., a satellite 120 operating as a base station, a base station or network deice in an NTN system, a gateway in communication with a satellite 120, or the like) and a UE 615, which may be examples of corresponding devices described with reference to FIGS. 1-5.

At 610, base station 605 may transmit, and UE 615 may receive, one or more downlink signals. UE 615 may generate feedback information associated with the one or more downlink signals for transmission to base station 605 at 650.

UE 615 may determine to perform a beam switch and an associated BWP switch. The first beam may be associated with a first BWP and the second beam may be associated with a second BWP. UE 615 may make the determination autonomously. Or, at 620, base station 605 may transmit a command to UE 615. The command may be a beam switch command, a BWP switch command, a handover command, or the like.

At 630 (e.g., at 630-a or 630-b), UE 615 may switch from the first beam to the second beam. In some instances, UE 615 may perform an associated BWP simultaneously with or based at least in part on the beam switch.

At 640, UE 615 may select a set of frequency resources (e.g., a BWP) for transmitting the feedback information to base station 605. UE 615 may select the first BWP, and may transmit the feedback information to base station 605 on the first BWP prior to perform the BWP switch, as described in greater detail with reference to FIG. 4. Or, UE 615 may select the second BWP, and may perform the BWP switch prior to transmitting the feedback information, as described in greater detail with reference to FIGS. 4 and 5.

For example, UE 615 may select the first BWP for transmitting the feedback information. In such examples, UE 615 may first transmit the feedback information to base station 605 at 650 on the first BWP, and subsequently switch from the first beam and the first BWP to the second beam and the second BWP (e.g., at 630-b).

In some examples, UE 615 may receive, from base station 605, a handover command (e.g., at 620). The handover command may include instructions to perform a handover procedure form a first cell to a second cell. In such examples, the feedback information may include an RLC status report, or a MAC CE including group feedback information.

In some examples, UE 615 may select the second BWP for transmitting the feedback information. In such examples, UE 615 may first switch from the first beam and the first BWP to the second beam and the second BWP (e.g., at 630-a), and may then transmit the feedback information to base station 605 on the second BWP at 650. In such examples, UE 615 may identify a first PUCCH opportunity after switching from the first beam to the second beam at 630-a, and may transmit the feedback information on the PUCCH resources of the first PUCCH occasion. UE 615 may wait for a time duration after receiving the downlink signals 610 before transmitting the feedback information at 650. THE time duration may include sufficient time to perform the beam switch and the BWP switch. The time duration may be indicated, by base station 605 (e.g., via a DCI message). In some examples, the time duration may be a default value. IN some examples, an explicit indication of an updated time duration may be prioritized over the default value. In some instances, the default value may be associated with the first BWP, but may be defined to determine the time duration on the second BWP. In some examples, UE 615 may extend one or more HARQ timers associated with the feedback information, and may use the extended HARQ timers to determine when to transmit the feedback information on the second BWP.

In some examples, UE 615 may dynamically determine when to transmit the feedback information, and on which BWP, based on one or more rules, as described with reference to FIGS. 4 and 5. For instance UE 615 may determine whether one or more TTIs associated with the feedback information overlaps with a BWP switching window or a beam switching window or both. If there is no overlap, then UE 615 may transmit feedback information scheduled before the BWP switching window on the first BWP before switching BWPs or feedback information scheduled after the BWP switching window on the second BWP after switching BWPs. If there is overlap between the TTIs for transmitting feedback information and the BWP switching window, then UE 615 may delay the feedback information transmission until after switching from the first beam to the second beam (e.g., at 630-*a*), and may transmit the feedback information on the second BWP after performing the BWP switch and the beam switch.

Base station 605 may monitor for and receive the feedback information at 650 by following the same rules. For instance, base station 605 may select a set of frequency resources for receiving the feedback information (e.g., a BWP) at 645. Based on whether there is overlap between the TTIs scheduled for the feedback information and a BWP switching window, base station 605 may switch from the first beam to the second beam at 635-*b*, then receive the feedback information at 650 on the second BWP, or may receive the feedback information at 650 on the first BWP, and then switch form the first beam to the second beam at 635-*b*.

Figure 7:
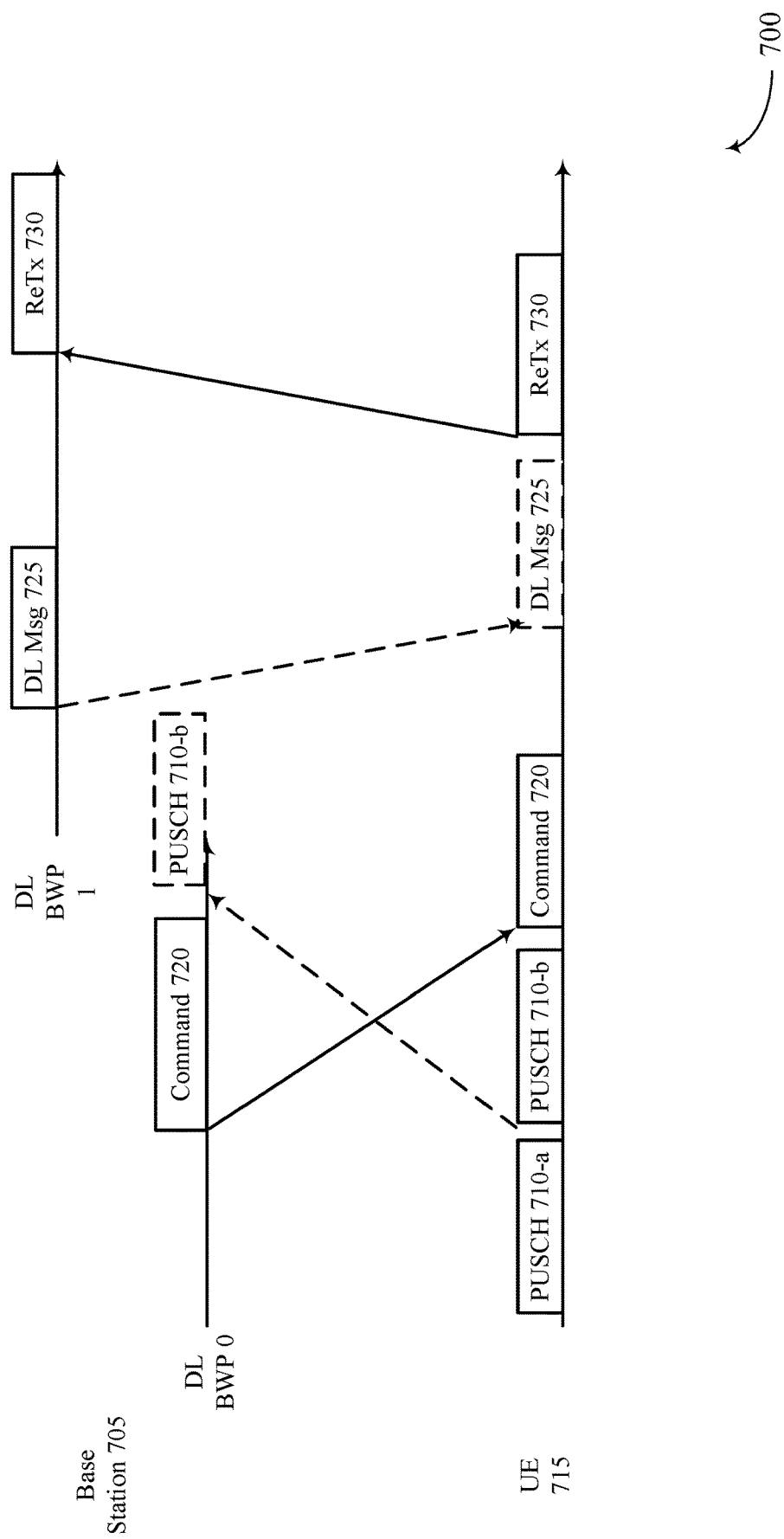
FIG. 7 illustrates an example of a timeline that supports managing retransmissions after BWP switching in accordance with one or more aspects of the present disclosure.

FIG. 7 illustrates an example of a timeline 700 that supports managing retransmissions after BWP switching in accordance with one or more aspects of the present disclosure. In some examples, timeline 700 may implement aspects of wireless communications system 100.

Base station 705 may communicate with UE 615 using a downlink BWP 0. UE 715 may transmit uplink communications on PUSCHs 710 (e.g., PUSCH 710-*a* and PUSCH 710-*b*). In some examples, base station 705 may initiate a BWP switch by transmitting a command 720 on downlink BWP 0. Command 720 may be a BWP switch command, a beam switch command, or a handover command, or the like. UE 715 may receive command 720, and perform a downlink BWP switch. Base station 705 may perform a downlink BWP switch from downlink BWP 0 to downlink BWP 1, and may transmit one or more downlink messages 725. Downlink message 725 may include downlink data, or an RLC status report. However, UE 715 may be unaware of whether base station 705 received uplink signals transmitted on PUSCH 710-*b*. In such examples, UE 715 may send a retransmission at 730, even though base station 705 successfully received the uplink singles transmitted on PUSCH 710-*b*.

As described with reference to FIG. 8, UE 615 may avoid unnecessary retransmissions. For example, UE 715 may monitor for an uplink grant for HARQ processes on BWP 1. If such an uplink grant is not received, then UE 715 may determine that any TBs transmitted prior to the BWP switch (e.g., the uplink signals transmitted on PUSCH 710-*b*) have been successfully received. A time period for the monitoring may be defined for UE 715 (e.g., standardized, configured, indicated via higher layer signaling, or the like). In some examples, UE 715 may monitor for an RLC status report (e.g., in downlink message 725 on BWP 1). The RLC status report may indicate which RLC PDUs are to be retransmitted in retransmission 730. Such an RLC reports may be transmitted in the case where no PDCP or RLC re-establishment procedures. In some examples, the BWP switch may trigger the transmission of the RLC status report in the downlink message 725.

In some examples, command 720 may be a handover command, including instructions to switch from a first cell to a second cell. In such examples, base station 705 may transmit an RLC status report or a PDCP status report together with the handover command 720 (e.g., via an RRC reconfiguration message with synchronization).

In some examples, base station 705 (e.g., a target base station 705 associated with downlink BWP 1) may transmit the feedback information (e.g., a PDCP status report) in a RAR message (e.g., a second random access message in a two-step random access procedure). The feedback information in the PDCP status report may avoid duplicate PUSCH transmissions by including a last SEQN received correctly, or a last SEQN received currently in order. The RAR message may be modified, or the report may be scheduled separately from the RAR message or multiplexed with the RAR message.

In some examples, the BWP switch may be an uplink BWP switch (e.g., without a downlink BWP switch). In such examples, UE 715 may apply an offset to uplink transmissions (e.g., a predefined, configured, or standardized offset) that are greater than or equal to an amount of time for performing the BWP switch and handle retransmissions after reception of a NACK message (e.g., using a retransmission uplink grant). In such examples, HARQ timers, DRX timers, or the like, may be extended by an offset to receive downlink signaling. That is, by extending such timers, a UE 715 may refrain from going to a DRX sleep mode after an uplink BWP switch and missing feedback information, which may result in unnecessary retransmissions.

Figure 8:
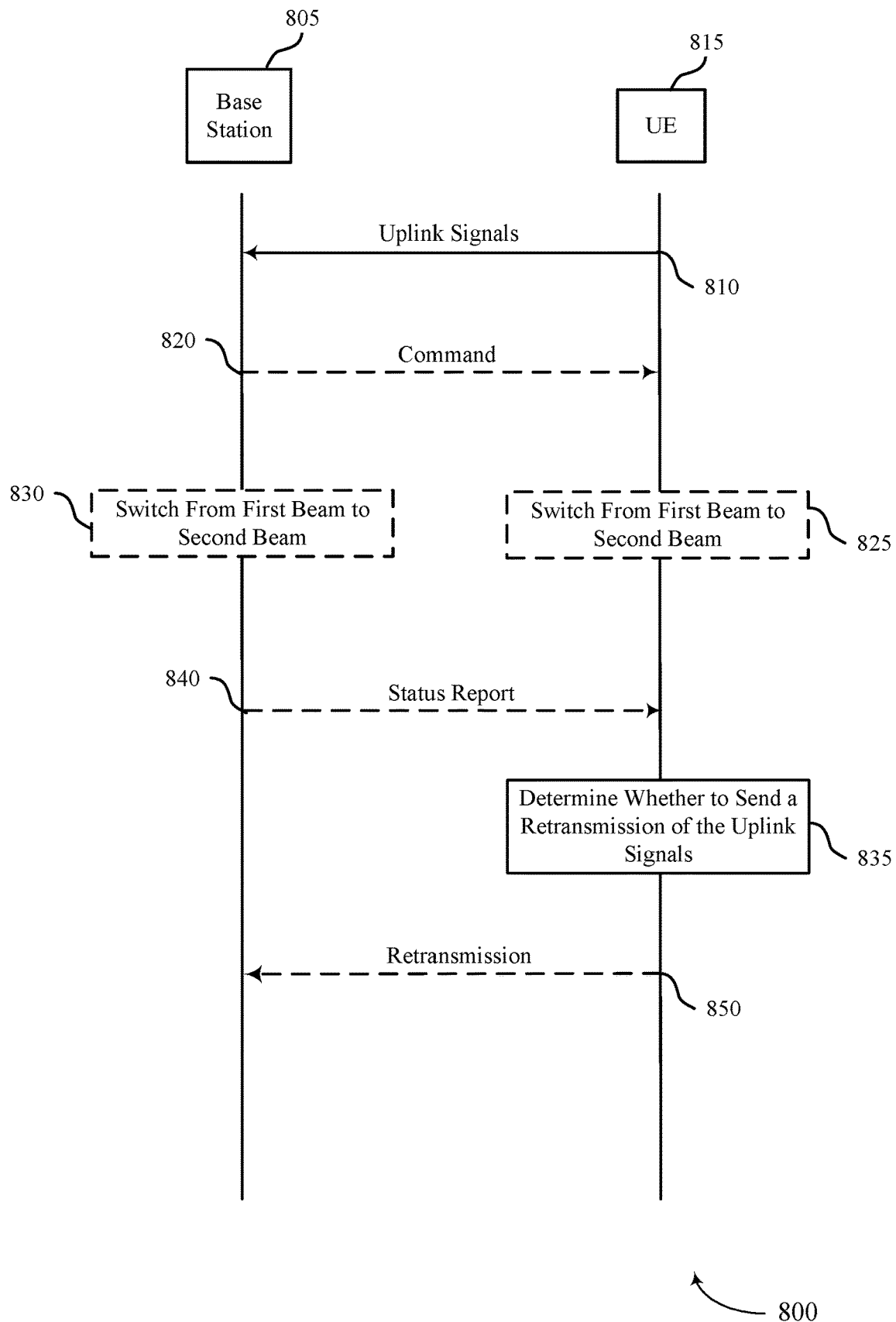
FIG. 8 illustrates an example of a process flow that supports managing retransmissions after BWP switching in accordance with one or more aspects of the present disclosure.

FIG. 8 illustrates an example of a process flow 800 that supports managing retransmissions after BWP switching in accordance with one or more aspects of the present disclosure. In some examples, process flow 800 may implement aspects of wireless communications system 100. Process flow 800 may be implemented by a base station 805 (e.g., a satellite 120 operating as a base station, a base station or network deice in an NTN system, a gateway in communication with a satellite 120, or the like) and a UE 815, which may be examples of corresponding devices described with reference to FIGS. 1-7.

At 810, UE 815 may transmit one or more uplink signals to base station 805.

At 820, base station 805 may transmit a command to UE 815. The command may be a beam switch command, a BWP switch command, a handover command, or the like.

At 825, UE 815 may switch from the first beam and a first BWP associated with the first beam to a second beam and a second BWP associated with the second beam. At 830, base station 805 may also switch from the first beam to the second beam. UE 815 and base station 805 may both perform a BWP switch from the first BWP to the second BWP. The BWP switch may be an uplink BWP switch or a downlink BWP switch.

At 835, UE 815 may determine whether to send a retransmission to base station of the one or more uplink signals transmitted at 805. In some examples, the BWP switch is a downlink BWP switch. In such examples, UE 815 may monitor the second BWP for a grant of resources for sending the retransmission on the second BWP. UE 815 may monitor for a defined period of time that is greater than or equal to the duration of a BWP switch. If UE 815 does not receive the uplink grant, the UE 815 may determine that the one or more uplink signals transmitted at 810 have been successfully received by base station 805, and may refrain from sending a retransmission. If UE 815 does receive the uplink rant, then UE 815 may send the retransmission at 850 on the indicated resources.

UE 815 may receive, from base station 805, a status report at 840. The status report may be an RLC status report triggered by the command received at 820. The RLC status report may indicate a number of HARQ processes or TBs for retransmission at 850. IN some examples, the status report may be a PDCP status report received in a RAR message. The RAR message may include one or more SEQNs correctly received by base station 805. UE 815 may determine whether to send the retransmission based at least in part on the status report.

In some examples, the command received at 820 may be a handover command. The handover command may include instructions to perform a handover procedure from a first cell associated with the first beam to a second cell associated with the second beam. In some examples, a status report (e.g., an RLC status report or a PDCP status report) may be multiplexed with, included in, or otherwise associated with the handover command received at 820. Such a handover command may optionally include an indication of one or more resources (e.g., PUSCH resources on the second BWP) for sending a retransmission on the second BWP.

In some examples, the BWP switch may be an uplink BWP switch. In such examples, UE 815 may identify a time duration for monitoring for feedback information or an uplink grant for a retransmission. The time duration may account for the duration of a BWP switch. In some examples, UE 815 extend the duration of a DRX timer, or a HARQ timer, or the like, based on the time duration.

AT 850, UE 815 may send a retransmission, as described herein with reference to FIG. 8, on the second BWP.

Figure 9:
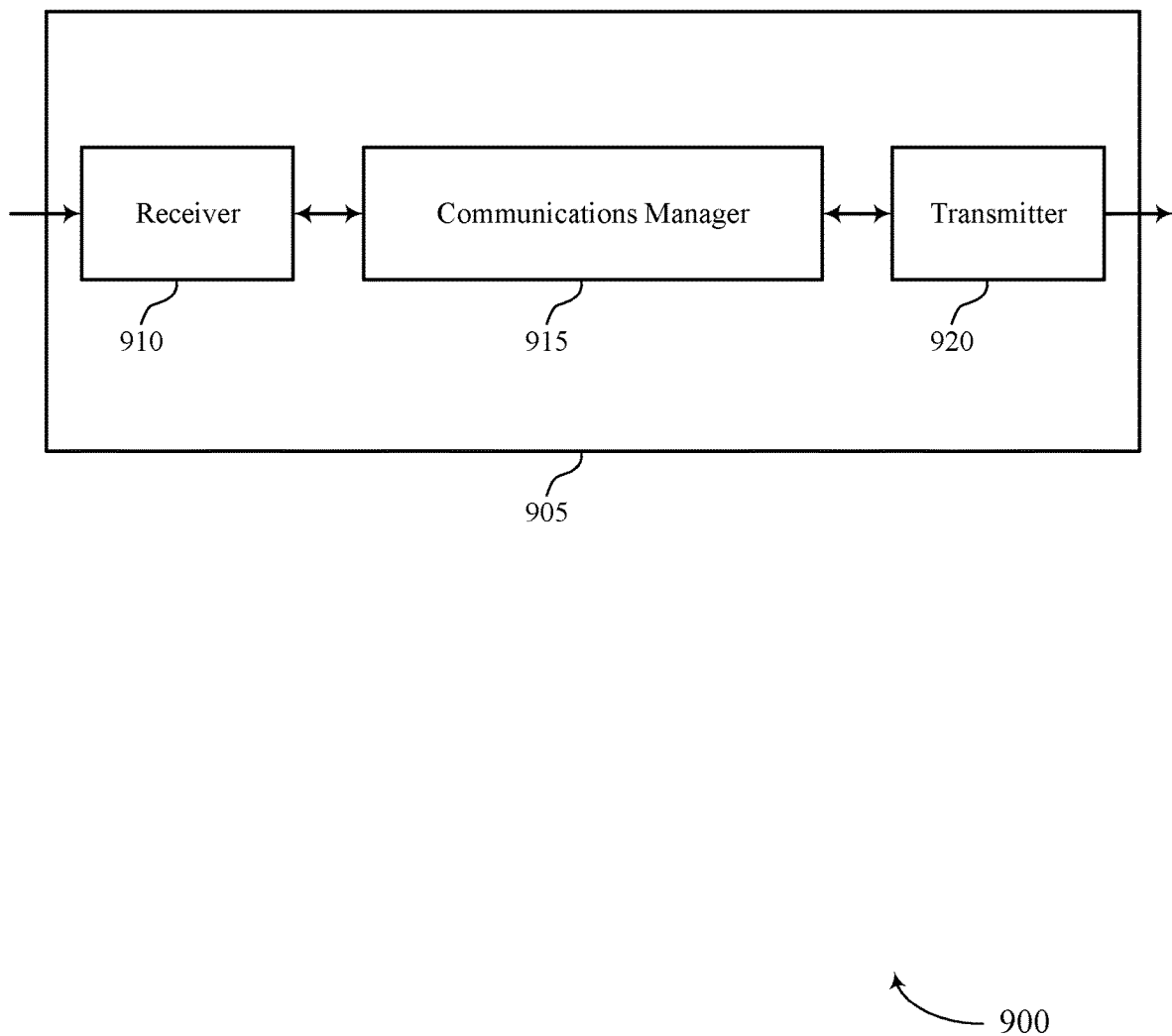
FIGS. 9 and 10 show block diagrams of devices that support managing retransmissions after BWP switching in accordance with one or more aspects of the present disclosure.

FIG. 9 shows a block diagram 900 of a device 905 that supports managing retransmissions after BWP switching in accordance with one or more aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses). The receiver 910 may receive information such as packets, user data, or control information associated with various information channels (e.g., control channels, data channels, and information related to retransmission after BWP switching). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a base station, one or more downlink signals using a first beam associated with a first set of frequency resources, switch from the first beam to a second beam associated with a second set of frequency resources, select a set of frequency resources for transmitting, to the base station, feedback information associated with the one or more downlink signals, and transmit the feedback information to the base station using the selected set of frequency resources. The communications manager 915 may also transmit, to a base station, one or more uplink signals using a first beam associated with a first set of frequency resources, switch from the first beam to a second beam associated with a second set of frequency resources, and determine, based on switching from the first beam to the second beam, whether to send a retransmission of the one or more uplink signals. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with one or more aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas) coupled with the mobile device modem to enable wireless transmission and reception over one or more bands.

The communications manager 915 may be an example of means for performing various aspects of managing retransmissions after BWP switching in accordance with one or more aspects of the present disclosure. The communications manager 915, or its sub-components, may be implemented in hardware (e.g., in communications management circuitry). The circuitry may comprise of processor, a DSP, an ASIC, an FPGA or other programmable logic device, discrete gate or transistor logic, discrete hardware components, or any combination thereof designed to perform the functions described in the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device.

In some examples, the communication manager 915 may be configured to perform various operations (e.g., receiving, switching, selecting, transmitting) using or otherwise in cooperation with the receiver 910, the transmitter 920, or both.

The communications manager 915 as described herein may be implemented to realize one or more potential results. One implementation may allow the device to improve system efficiency such that a device may avoid inefficiently receiving duplicate downlink transmissions, or sending duplicate retransmissions, resulting in saved computational resources, improved battery life, and the like. Implementations of the device may also allow a device to reduce delays, increase system efficiency, reduce system latency, increase throughput, and improve user experience, among other improvements.

Figure 12:
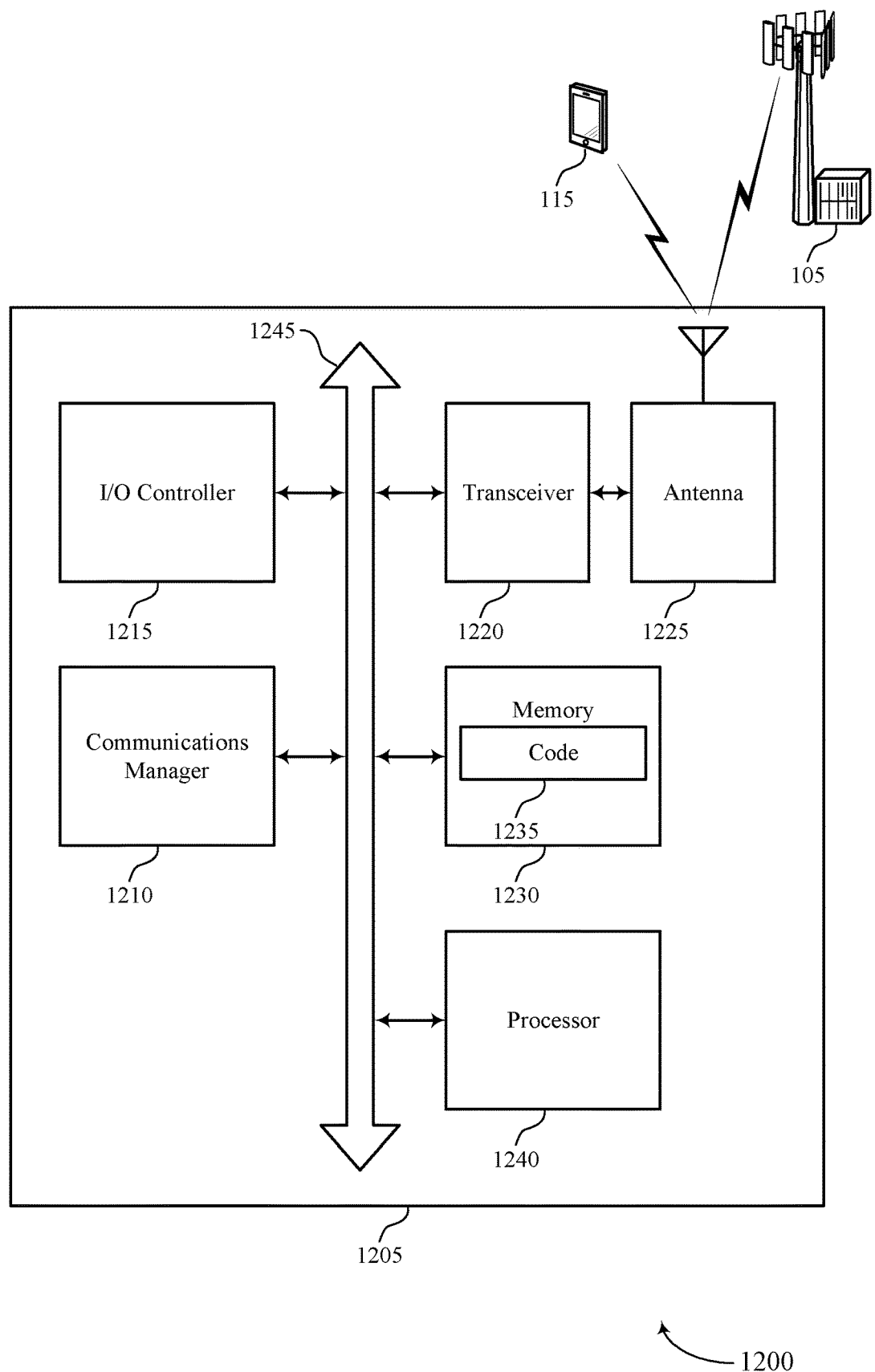
FIG. 12 shows a diagram of a system including a device that supports managing retransmissions after BWP switching in accordance with one or more aspects of the present disclosure.

Based on techniques for efficiently communicating maximum number of layers for a device as described herein, a processor of a UE 115 (e.g., controlling the receiver 910, the transmitter 920, or a transceiver 1220 as described with respect to FIG. 12) may increase system efficiency and decrease unnecessary processing at a device.

Figure 10:
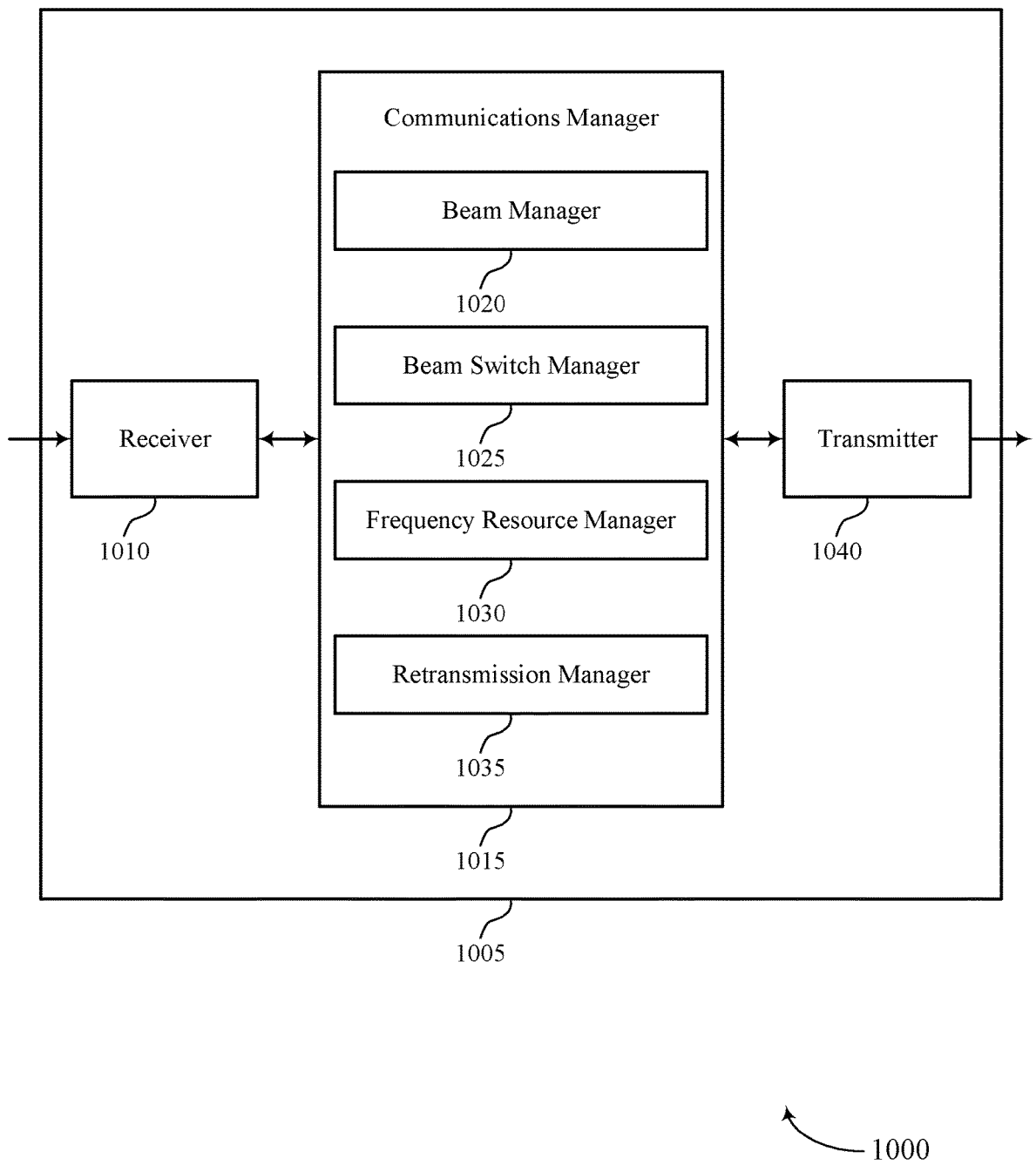

FIG. 10 shows a block diagram 1000 of a device 1005 that supports managing retransmissions after BWP switching in accordance with one or more aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to retransmission after BWP switching). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a beam manager 1020, a beam switch manager 1025, a frequency resource manager 1030, and a retransmission manager 1035. The communications manager 1015 may be an example of aspects of the communications manager 1210 described herein.

The beam manager 1020 may receive, from a base station, one or more downlink signals using a first beam associated with a first set of frequency resources.

The beam switch manager 1025 may switch from the first beam to a second beam associated with a second set of frequency resources.

The frequency resource manager 1030 may select a set of frequency resources for transmitting, to the base station, feedback information associated with the one or more downlink signals and transmit the feedback information to the base station using the selected set of frequency resources.

The beam manager 1020 may transmit, to a base station, one or more uplink signals using a first beam associated with a first set of frequency resources and switch from the first beam to a second beam associated with a second set of frequency resources.

The retransmission manager 1035 may determine, based on switching from the first beam to the second beam, whether to send a retransmission of the one or more uplink signals.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
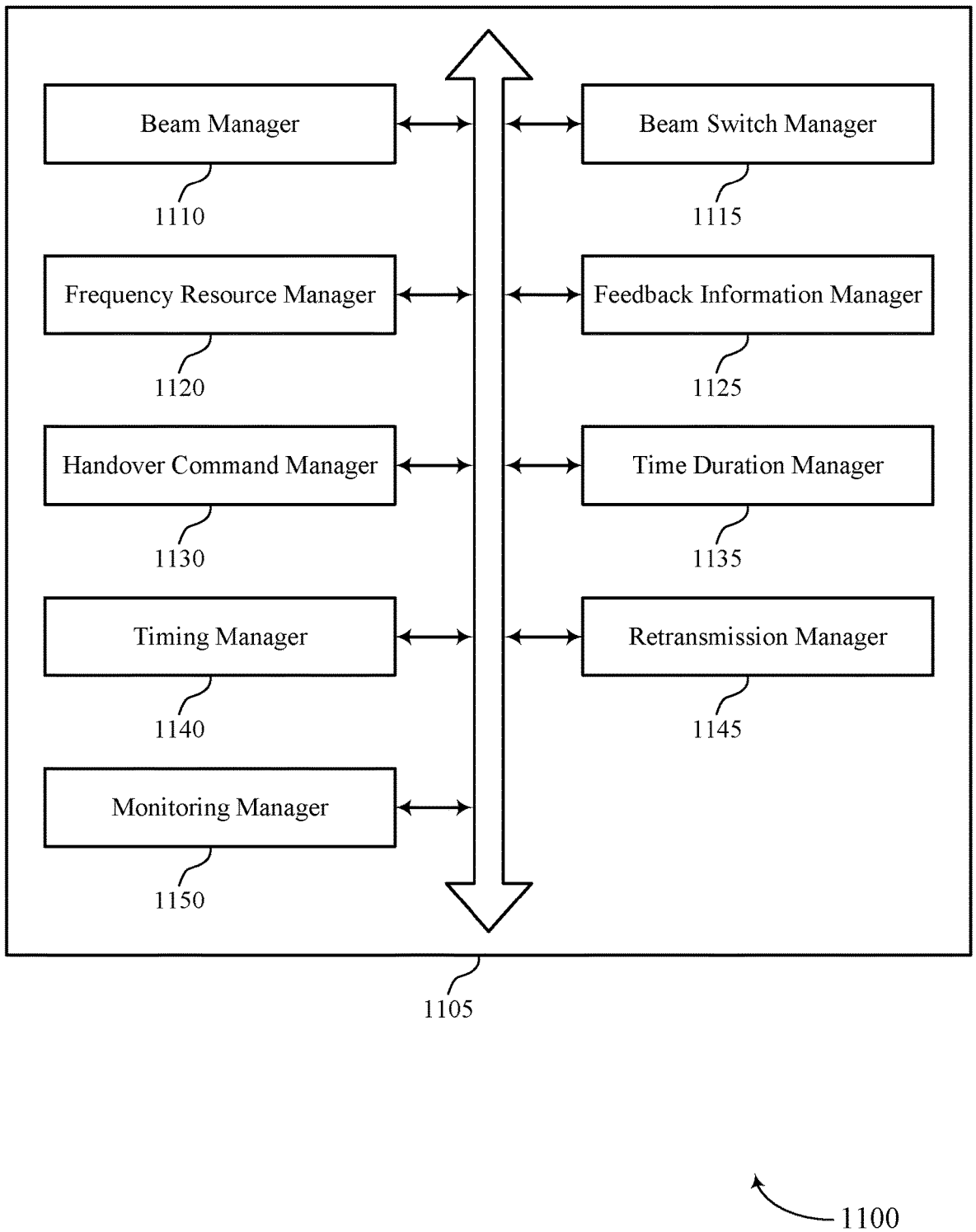
FIG. 11 shows a block diagram of a communications manager that supports managing retransmissions after BWP switching in accordance with one or more aspects of the present disclosure.

FIG. 11 shows a block diagram 1100 of a communications manager 1105 that supports managing retransmissions after BWP switching in accordance with one or more aspects of the present disclosure. The communications manager 1105 may be an example of aspects of a communications manager 915, a communications manager 1015, or a communications manager 1210 described herein. The communications manager 1105 may include a beam manager 1110, a beam switch manager 1115, a frequency resource manager 1120, a feedback information manager 1125, a handover command manager 1130, a time duration manager 1135, a timing manager 1140, a retransmission manager 1145, and a monitoring manager 1150. Each of these modules may communicate, directly or indirectly, with one another (e.g., via one or more buses).

The beam manager 1110 may receive, from a base station, one or more downlink signals using a first beam associated with a first set of frequency resources. In some examples, the beam manager 1110 may transmit, to a base station, one or more uplink signals using a first beam associated with a first set of frequency resources. In some examples, the beam manager 1110 may switch from the first beam to a second beam associated with a second set of frequency resources. In some cases, the base station is a network device in an NTN.

The beam switch manager 1115 may switch from the first beam to a second beam associated with a second set of frequency resources. In some examples, determining to switch from the first beam to the second beam, where transmitting the feedback information using the first set of frequency resources is based on determining to switch from the first beam to the second beam; and where switching from the first beam to the second beam includes switching from the first beam to the second beam after transmitting the feedback information to the base station.

In some examples, the beam switch manager 1115 may determine to switch from the first beam to the second beam, the switching from the first beam to the second beam including switching from the first beam to the second beam before transmitting the feedback information to the base station, where transmitting the feedback information using the second set of frequency resources is based on determining to switch from the first beam to the second beam. In some examples, the beam switch manager 1115 may determine a switching window for switching from the first beam to the second beam.

The frequency resource manager 1120 may select a set of frequency resources for transmitting, to the base station, feedback information associated with the one or more downlink signals. In some examples, the frequency resource manager 1120 may transmit the feedback information to the base station using the selected set of frequency resources. In some examples, the frequency resource manager 1120 may transmit the feedback information to the base station using the second set of frequency resources, the selected set of frequency resources including the second set of frequency resources. In some cases, the first set of frequency resources is allocated for downlink transmissions and the second set of frequency resources is allocated for downlink transmissions. In some cases, the first set of frequency resources is allocated for uplink transmissions and the second set of frequency resources is allocated for uplink transmissions.

The retransmission manager 1145 may determine, based on switching from the first beam to the second beam, whether to send a retransmission of the one or more uplink signals. In some examples, the retransmission manager 1145 may refrain from sending the retransmission of the one or more uplink signals based on failing to receive the grant of resources, the determining whether to send the retransmission of the one or more uplink signals including determining to refrain from sending the retransmission of the one or more uplink signals. In some examples, the retransmission manager 1145 may transmit the retransmission on the one or more uplink shared channel resources on the second set of frequency resources based on determining to send the retransmission.

The feedback information manager 1125 may transmit the feedback information to the base station using the first set of frequency resources, the selected set of frequency resources including the first set of frequency resources. In some examples, the feedback information manager 1125 may transmit a PDCP status report or an RLC status report or a MAC CE including the feedback information, the feedback information including a single feedback message associated with a set of hybrid automatic repeat processes, TBs, RLC status reports, or a combination thereof.

In some examples, the feedback information manager 1125 may identify, based on the handover command, an indication of one or more uplink shared channel resources on the first set of frequency resources, the transmitting the feedback information including transmitting the feedback information over the one or more uplink shared channel resources on the first set of frequency resources. In some examples, the feedback information manager 1125 may identify, subsequent to switching from the first beam to the second beam, a first uplink control channel opportunity on the second set of frequency resources, the transmitting the feedback information including transmitting the feedback information over the identified first uplink control channel opportunity.

In some examples, the feedback information manager 1125 may transmit a single feedback message associated with a set of hybrid automatic repeat processes, TBs, RLC status reports, or a combination thereof. In some examples, the feedback information manager 1125 may receive, from the base station, DCI including an indication of a TTI associated with the second set of frequency resources, the transmitting the feedback information including transmitting the feedback information during the TTI.

In some examples, the feedback information manager 1125 may receive, from the base station based on transmitting the one or more uplink signals, a RAR message including a status report, the status report including a last SEQN associated with the one or more uplink signals, where determining whether to send a retransmission of the one or more uplink signals is based on receiving the RAR message. In some examples, the feedback information manager 1125 may receive, from the base station, RLC status report associated with the handover command, the handover command including an indication of one or more uplink shared channel resources on the second set of frequency resources, the determining whether to send the retransmission including determining to send the retransmission, where determining to send the retransmission is based on receiving the RLC status report.

The handover command manager 1130 may receive, from the base station, a handover command instructing the UE to perform a handover procedure from a first cell associated with the first beam to a second cell associated with the second beam, where switching from the first beam to the second beam is based on receiving the handover command. In some examples, the handover command manager 1130 may transmit, to the base station based on receiving the handover command, a RLC status report or PDCP status report including the feedback information. In some examples, the handover command manager 1130 may receive, from the base station, a handover command instructing the UE to perform a handover procedure from a first cell associated with the first beam to a second cell associated with the second beam. In some examples, the handover command manager 1130 may receive, from the base station, a handover command instructing the UE to perform a handover procedure from a first cell associated with the first beam to a second cell associated with the second beam, where switching from the first beam to the second beam is based on receiving the handover command.

The time duration manager 1135 may identify a time duration between receiving the one or more downlink signals and transmitting the feedback information, where the time duration is greater than a minimum amount of time for switching from the first beam to the second beam, and where transmitting the feedback information is based on an expiration of the time duration after receiving the one or more downlink signals. In some examples, the time duration manager 1135 may receive, from the base station, DCI including an indication of the time duration.

In some examples, the time duration manager 1135 may determine, based on the indication of the time duration, a timing for transmitting the feedback information on the second set of frequency resources, where transmitting the feedback information is based on determining the timing for transmitting the feedback information on the second set of frequency resources. In some examples, the time duration manager 1135 may initiate, based on receiving the one or more downlink signals, one or more HARQ timers associated with the feedback information. In some examples, the time duration manager 1135 may apply, based on switching from the first beam to the second beam, an offset that is equal to or greater than a minimum amount of time for switching from the first beam to the second beam to the one or more HARQ timers, where transmitting the feedback information is based on expiration of the one or more HARQ timers and the applied offset.

In some examples, the time duration manager 1135 may identify a time duration between receiving the one or more downlink signals and transmitting the feedback information, where the time duration is greater than a minimum amount of time for switching from the first beam to the second beam, the selected set of frequency resources including the second set of frequency resources, and the transmitting the feedback information including transmitting the feedback information to the base station after switching from the first beam to the second beam and upon expiration of the time duration. In some examples, the time duration manager 1135 may identify a time duration for the monitoring, where the time duration is greater than a minimum amount of time for switching from the first beam to the second beam, the monitoring the second set of frequency resources for the grant of resources including monitoring over the time duration. In some examples, the time duration manager 1135 may identify a time duration for the monitoring for feedback information associated with the one or more uplink signals, where the time duration is greater than a minimum amount of time for switching from the first beam to the second beam.

The timing manager 1140 may determine that one or more TTIs allocated for transmitting the feedback information do not overlap in time with the switching window. In some examples, the timing manager 1140 may determine that the one or more TTIs are located prior to the switching window, the selected set of frequency resources including the first set of frequency resources, and the transmitting the feedback information including transmitting the feedback information to the base station prior to switching from the first beam to the second beam based on determining that the one or more TTIs are located prior to the switching window.

In some examples, the timing manager 1140 may determine that the one or more TTIs are located after the switching window, the selected set of frequency resources including the second set of frequency resources, and the transmitting the feedback information including transmitting the feedback information to the base station after switching from the first beam to the second beam based on determining that the one or more TTIs are located after the switching window. In some examples, the timing manager 1140 may determine a switching window for switching from the first beam to the second beam. In some examples, the timing manager 1140 may determine that one or more TTIs allocated for transmitting the feedback information at least partially overlap in time with the switching window.

The monitoring manager 1150 may monitor, based on switching from the first beam to the second beam, the second set of frequency resources for a grant of resources for the retransmission of the one or more uplink signals. In some examples, the monitoring manager 1150 may fail to receive the grant of resources based on the monitoring. In some examples, the monitoring manager 1150 may monitor, based on switching from the first beam to the second beam, the second set of frequency resources for a RLC status report, where determining whether to send the retransmission is based on monitoring for the RLC status report. In some examples, the monitoring manager 1150 may monitor for feedback information over the time duration, where determining whether to send the retransmission is based on the monitoring.

FIG. 12 shows a diagram of a system 1200 including a device 1205 that supports managing retransmissions after BWP switching in accordance with one or more aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, from a base station, one or more downlink signals using a first beam associated with a first set of frequency resources, switch from the first beam to a second beam associated with a second set of frequency resources, select a set of frequency resources for transmitting, to the base station, feedback information associated with the one or more downlink signals, and transmit the feedback information to the base station using the selected set of frequency resources. The communications manager 1210 may also transmit, to a base station, one or more uplink signals using a first beam associated with a first set of frequency resources, switch from the first beam to a second beam associated with a second set of frequency resources, and determine, based on switching from the first beam to the second beam, whether to send a retransmission of the one or more uplink signals.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting retransmission after BWP switching).

The code 1235 may include instructions to implement one or more aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
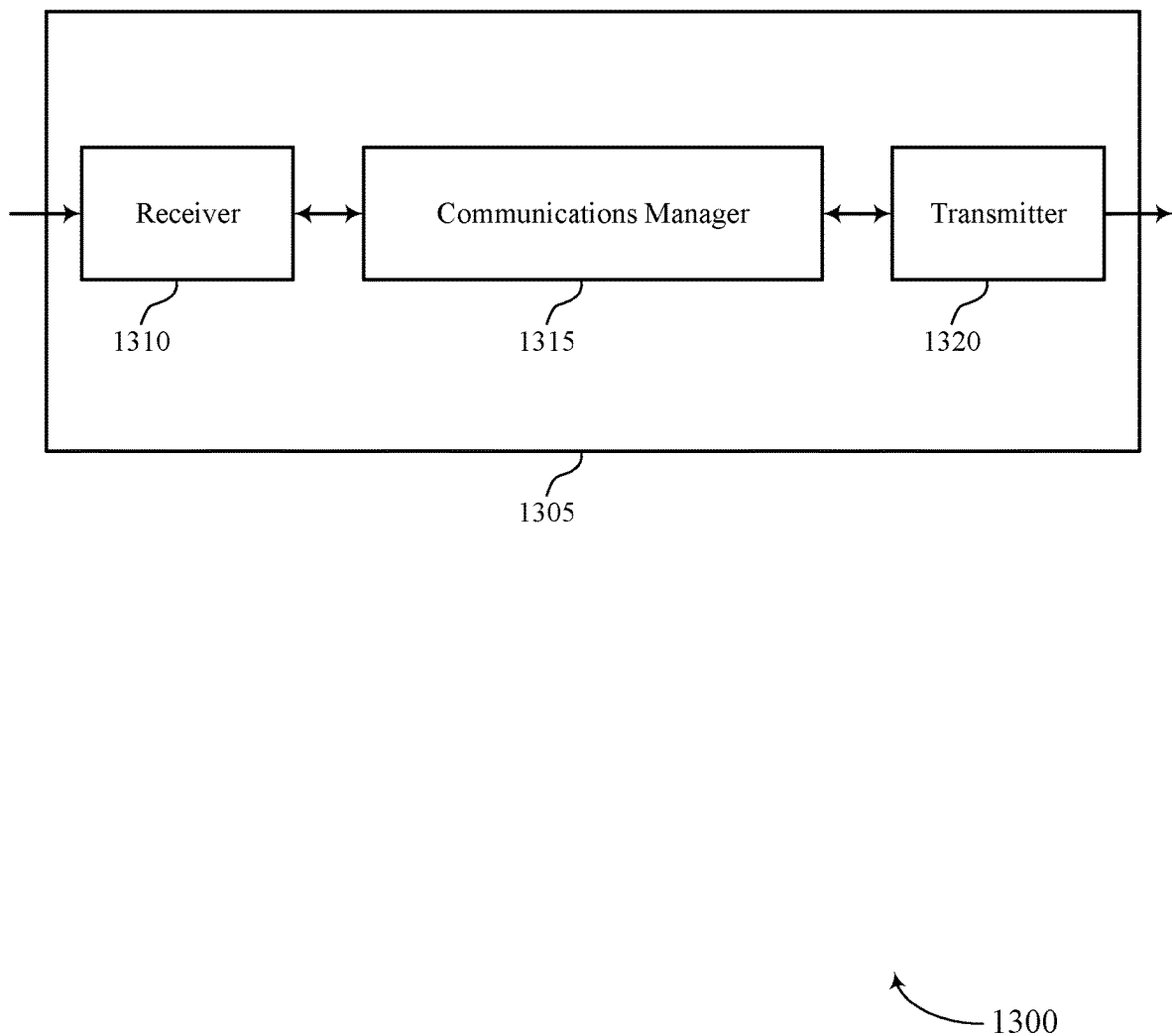
FIGS. 13 and 14 show block diagrams of devices that support managing retransmissions after BWP switching in accordance with one or more aspects of the present disclosure.

FIG. 13 shows a block diagram 1300 of a device 1305 that supports managing retransmissions after BWP switching in accordance with one or more aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to retransmission after BWP switching). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, to a UE, one or more downlink signals using a first beam associated with a first set of frequency resources, switch from the first beam to a second beam associated with a second set of frequency resources, and receive, from the UE, feedback information associated with the one or more downlink signals using a set of frequency resources. The communications manager 1315 may also receive one or more uplink signals from a UE using a first beam associated with a first set of frequency resources, switching from the first beam to a second beam associated with a second set of frequency resources, and determine whether to request a retransmission of the one or more uplink signals from the UE. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with one or more aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The communications manager 1315 may be an example of means for performing various aspects of managing retransmissions after BWP switching in accordance with one or more aspects of the present disclosure. The communications manager 1315, or its sub-components, may be implemented in hardware (e.g., in communications management circuitry). The circuitry may comprise of processor, a DSP, an ASIC, an FPGA, or other programmable logic device, discrete gate or transistor logic, discrete hardware components, or any combination thereof designed to perform the functions described in the present disclosure.

In another implementation, the communications manager 1315, or its sub-components, may be implemented in code (e.g., as communications management software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device.

In some examples, the communication manager 1315 may be configured to perform various operations (e.g., receiving, switching, selecting, transmitting) using or otherwise in cooperation with the receiver 1310, the transmitter 1320, or both.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
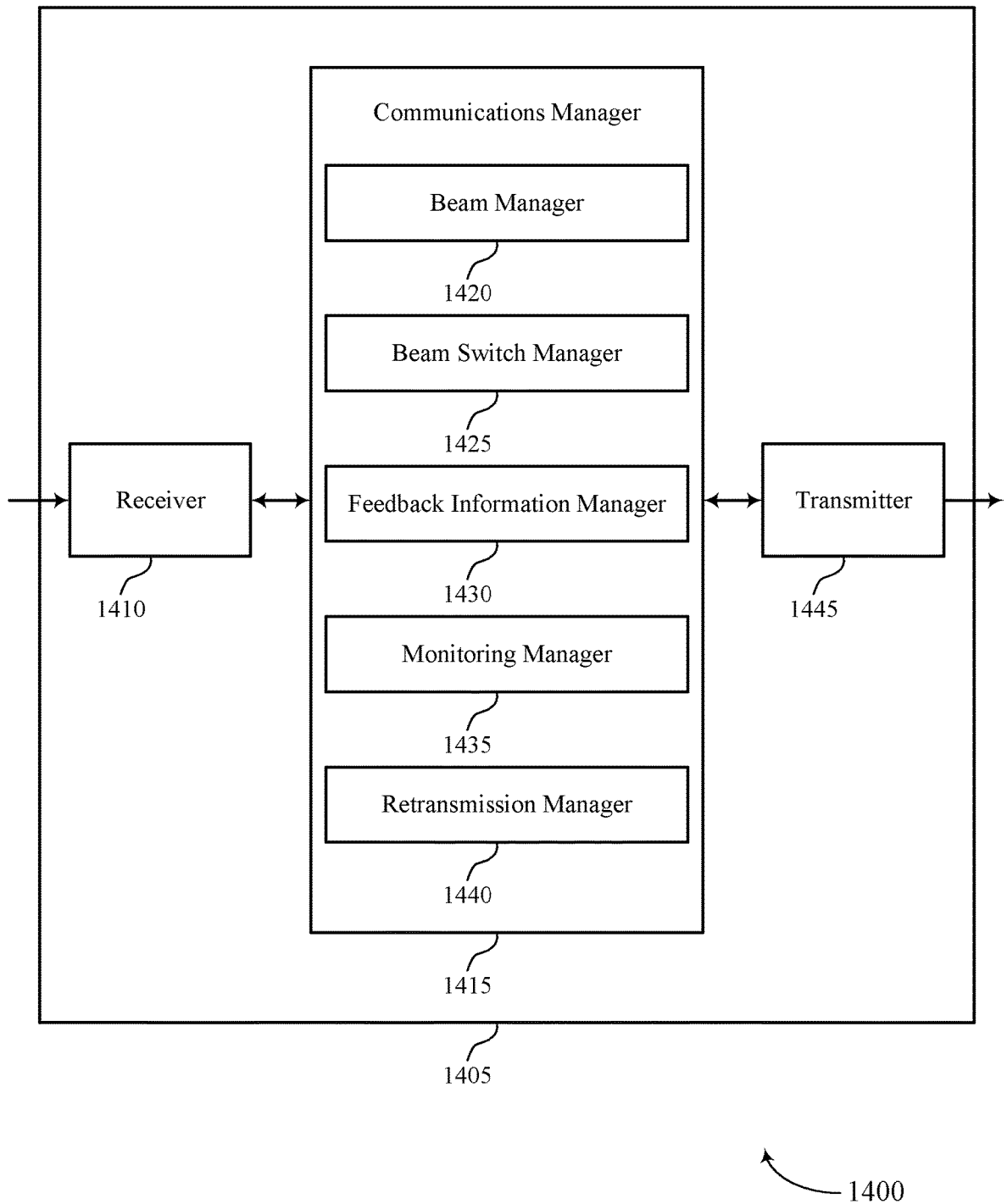

FIG. 14 shows a block diagram 1400 of a device 1405 that supports managing retransmissions after BWP switching in accordance with one or more aspects of the present disclosure. The device 1405 may be an example of aspects of a device 1305, or a base station 105 as described herein. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to retransmission after BWP switching). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a beam manager 1420, a beam switch manager 1425, a feedback information manager 1430, a monitoring manager 1435, and a retransmission manager 1440. The communications manager 1415 may be an example of aspects of the communications manager 1610 described herein.

The beam manager 1420 may transmit, to a UE, one or more downlink signals using a first beam associated with a first set of frequency resources. The beam switch manager 1425 may switch from the first beam to a second beam associated with a second set of frequency resources. The feedback information manager 1430 may receive, from the UE, feedback information associated with the one or more downlink signals using a set of frequency resources.

The monitoring manager 1435 may monitor for one or more uplink signals from a UE using a first beam associated with a first set of frequency resources. The beam switch manager 1425 may perform a switch from the first beam to a second beam associated with a second set of frequency resources.

The retransmission manager 1440 may determine whether to request a retransmission of the one or more uplink signals from the UE.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
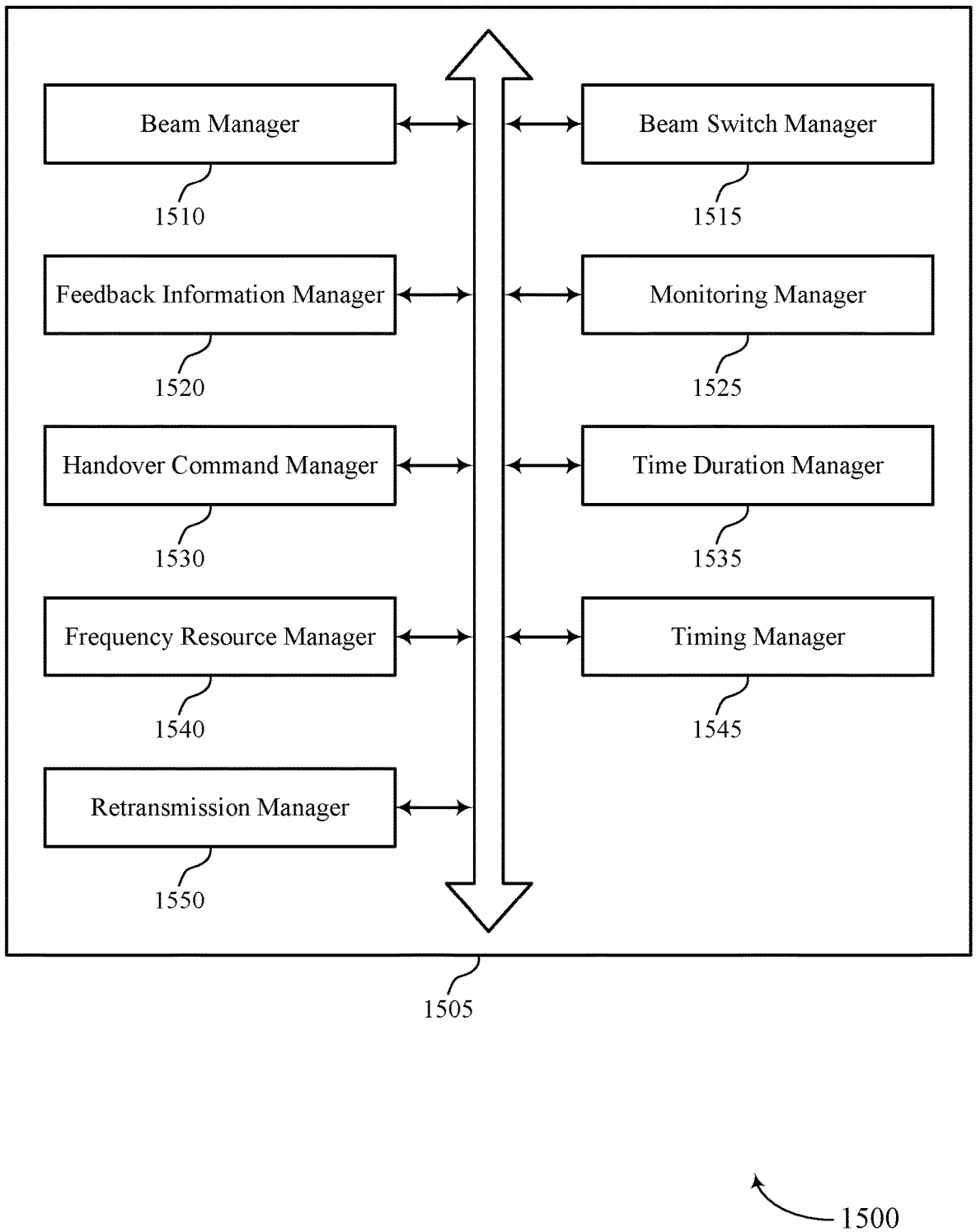
FIG. 15 shows a block diagram of a communications manager that supports managing retransmissions after BWP switching in accordance with one or more aspects of the present disclosure.

FIG. 15 shows a block diagram 1500 of a communications manager 1505 that supports managing retransmissions after BWP switching in accordance with one or more aspects of the present disclosure. The communications manager 1505 may be an example of aspects of a communications manager 1315, a communications manager 1415, or a communications manager 1610 described herein. The communications manager 1505 may include a beam manager 1510, a beam switch manager 1515, a feedback information manager 1520, a monitoring manager 1525, a handover command manager 1530, a time duration manager 1535, a frequency resource manager 1540, a timing manager 1545, and a retransmission manager 1550. Each of these modules may communicate, directly or indirectly, with one another (e.g., via one or more buses).

The beam manager 1510 may transmit, to a UE, one or more downlink signals using a first beam associated with a first set of frequency resources.

The beam switch manager 1515 may switch from the first beam to a second beam associated with a second set of frequency resources. In some examples, the beam switch manager 1515 may switch from the first beam to a second beam associated with a second set of frequency resources. In some examples, the beam switch manager 1515 may determine to switch from the first beam to the second beam, where switching from the first beam to the second beam is based on the determining. In some examples, the beam switch manager 1515 may determine a switching window for switching from the first beam to the second beam.

The feedback information manager 1520 may receive, from the UE, feedback information associated with the one or more downlink signals using a set of frequency resources. In some examples, the feedback information manager 1520 may receive the feedback information from the UE over the uplink control channel resources in the first set of frequency resources based on the monitoring, the switching from the first beam to the second beam including switching from the first beam to the second beam after receiving the feedback information.

In some examples, the feedback information manager 1520 may receive, from the UE based on transmitting the handover command, a PDCP status report or RLC status report including the feedback information. In some examples, the feedback information manager 1520 may receive, from the UE, a MAC CE including the feedback information, the feedback information including a single feedback message associated with a set of hybrid automatic repeat processes, TBs, RLC status reports, or a combination thereof. In some examples, the feedback information manager 1520 may transmit, to the UE, an indication of one or more uplink shared channel resources on the first set of frequency resources, the receiving the feedback information including receiving the feedback information over the one or more uplink shared channel resources on the first set of frequency resources.

In some examples, the feedback information manager 1520 may receive the feedback information from the UE using the second set of frequency resources based on switching from the first beam to the second beam, the set of frequency resources including the second set of frequency resources. In some examples, the feedback information manager 1520 may identify, subsequent to switching from the first beam to the second beam, a first uplink control channel opportunity on the second set of frequency resources, the receiving the feedback information including receiving the feedback information over the identified first uplink control channel opportunity.

In some examples, the feedback information manager 1520 may receive a single feedback message associated with a set of hybrid automatic repeat processes, TBs, RLC status reports, or a combination thereof. In some examples, the feedback information manager 1520 may interpret the uplink signaling on the second set of frequency resources as an ACK message associated with the handover command.

The monitoring manager 1525 may monitor for one or more uplink signals from a UE using a first beam associated with a first set of frequency resources. In some examples, the monitoring manager 1525 may monitor, based on the determining, one or more uplink control channel resources in the first set of frequency resources for the feedback information, the set of frequency resources including the first set of frequency resources.

The retransmission manager 1550 may determine whether to request a retransmission of the one or more uplink signals from the UE. In some examples, the retransmission manager 1550 may receive, based on the monitoring, the one or more uplink signals prior to performing the switch from the first beam to the second beam, the determining whether to request the retransmission including determining to refrain from requesting the retransmission. In some examples, the retransmission manager 1550 may fail, based on switching from the first beam to the second beam from the first beam to the second beam, to receive the one or more uplink signals, the determining whether to request the retransmission including determining to request the retransmission. In some examples, the retransmission manager 1550 may receive the retransmission over the one or more uplink shared channel resources on the second set of frequency resources.

In some examples, the retransmission manager 1550 may transmit, to the UE based on determining whether to request the retransmission of the one or more uplink signals, a RLC status report associated with the handover command, the handover command including an indication of one or more uplink shared channel resources on the second set of frequency resources. In some examples, the retransmission manager 1550 may receive the retransmission on the one or more uplink shared channel resources on the second set of frequency resources.

The handover command manager 1530 may transmit, to the UE, a handover command instructing the UE to perform a handover procedure from a first cell associated with the first beam to a second cell associated with the second beam, where switching from the first beam to the second beam is based on transmitting the handover command. In some examples, the handover command manager 1530 may transmit, to the UE, a handover command instructing the UE to perform a handover procedure from a first cell associated with the first beam to a second cell associated with the second beam, where switching from the first beam to the second beam is based on transmitting the handover command.

In some examples, the handover command manager 1530 may transmit, to the UE, a handover command instructing the UE to perform a handover procedure from a first cell associated with the first beam to a second cell associated with the second beam. In some examples, the handover command manager 1530 may transmit, to the UE, a handover command instructing the UE to perform a handover procedure from a first cell associated with the first beam to a second cell associated with the second beam, where switching from the first beam to the second beam is based on receiving the handover command.

The time duration manager 1535 may identify a time duration between transmitting the one or more downlink signals and monitoring for the feedback information, where the time duration is greater than a minimum amount of time for switching from the first beam to the second beam, and where receiving the feedback information is based on an expiration of the time duration after transmitting the one or more downlink signals. In some examples, the time duration manager 1535 may transmit, to the UE, DCI including an indication of the time duration.

The frequency resource manager 1540 may receive, from the UE based on the handover command, uplink signaling using the second set of frequency resources. In some cases, the first set of frequency resources is allocated for uplink transmissions and the second set of frequency resources is allocated for uplink transmissions.

The timing manager 1545 may transmit, to the UE, DCI including an indication of a TTI associated with the second set of frequency resources, the receiving the feedback information including receiving the feedback information during the TTI. In some examples, the timing manager 1545 may determine that one or more TTIs allocated for receiving the feedback information do not overlap in time with the switching window. In some examples, the timing manager 1545 may determine that the one or more TTIs are located prior to the switching window, the set of frequency resources including the first set of frequency resources, the receiving the feedback information including receiving the feedback information from the UE prior to switching from the first beam to the second beam based on determining that the one or more TTIs are located prior to the switching window.

In some examples, the timing manager 1545 may determine that the one or more TTIs are located after the switching window, the set of frequency resources including the second set of frequency resources, and the receiving the feedback information including receiving the feedback information from the UE after switching from the first beam to the second beam based on determining that the one or more TTIs are located after the switching window. In some examples, the timing manager 1545 may determine that one or more TTIs allocated for receiving the feedback information at least partially overlap in time with the switching window. In some examples, the timing manager 1545 may identify a time duration between transmitting the one or more downlink signals and receiving the feedback information, where the time duration is greater than a minimum amount of time for switching from the first beam to the second beam, the set of frequency resources including the second set of frequency resources, and the receiving the feedback information including receiving the feedback information from the UE after switching from the first beam to the second beam and upon expatriation of the time duration.

In some examples, the timing manager 1545 may transmit, to the UE based on determining to request the retransmission, a RLC status report using the second set of frequency resources, the handover command optionally including an indication of one or more uplink shared channel resources on the second set of frequency resources. In some examples, the timing manager 1545 may identify a time duration between receiving the one or more uplink signals and transmitting the request for the retransmission, where the time duration is greater than a minimum amount of time for switching from the first beam to the second beam. In some examples, the timing manager 1545 may transmit, within the time duration, the request for the retransmission based on determining whether to request the retransmission.

Figure 16:
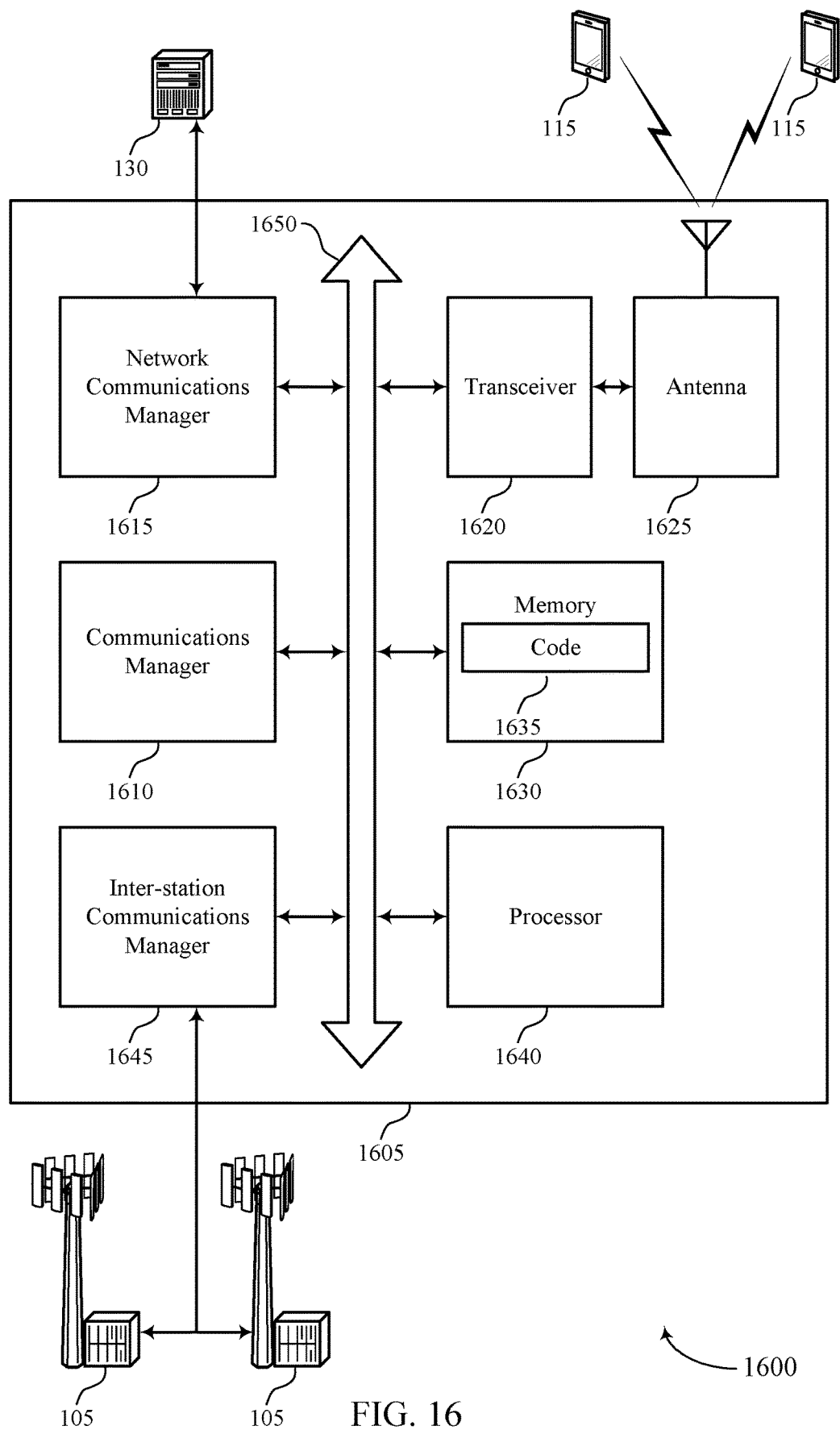
FIG. 16 shows a diagram of a system including a device that supports managing retransmissions after BWP switching in accordance with one or more aspects of the present disclosure.

FIG. 16 shows a diagram of a system 1600 including a device 1605 that supports managing retransmissions after BWP switching in accordance with one or more aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, to a UE, one or more downlink signals using a first beam associated with a first set of frequency resources, switch from the first beam to a second beam associated with a second set of frequency resources, and receive, from the UE, feedback information associated with the one or more downlink signals using a set of frequency resources. The communications manager 1610 may also monitor for one or more uplink signals from a UE using a first beam associated with a first set of frequency resources, perform a switch from the first beam to a second beam associated with a second set of frequency resources, and determine whether to request a retransmission of the one or more uplink signals from the UE.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting retransmission after BWP switching).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement one or more aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
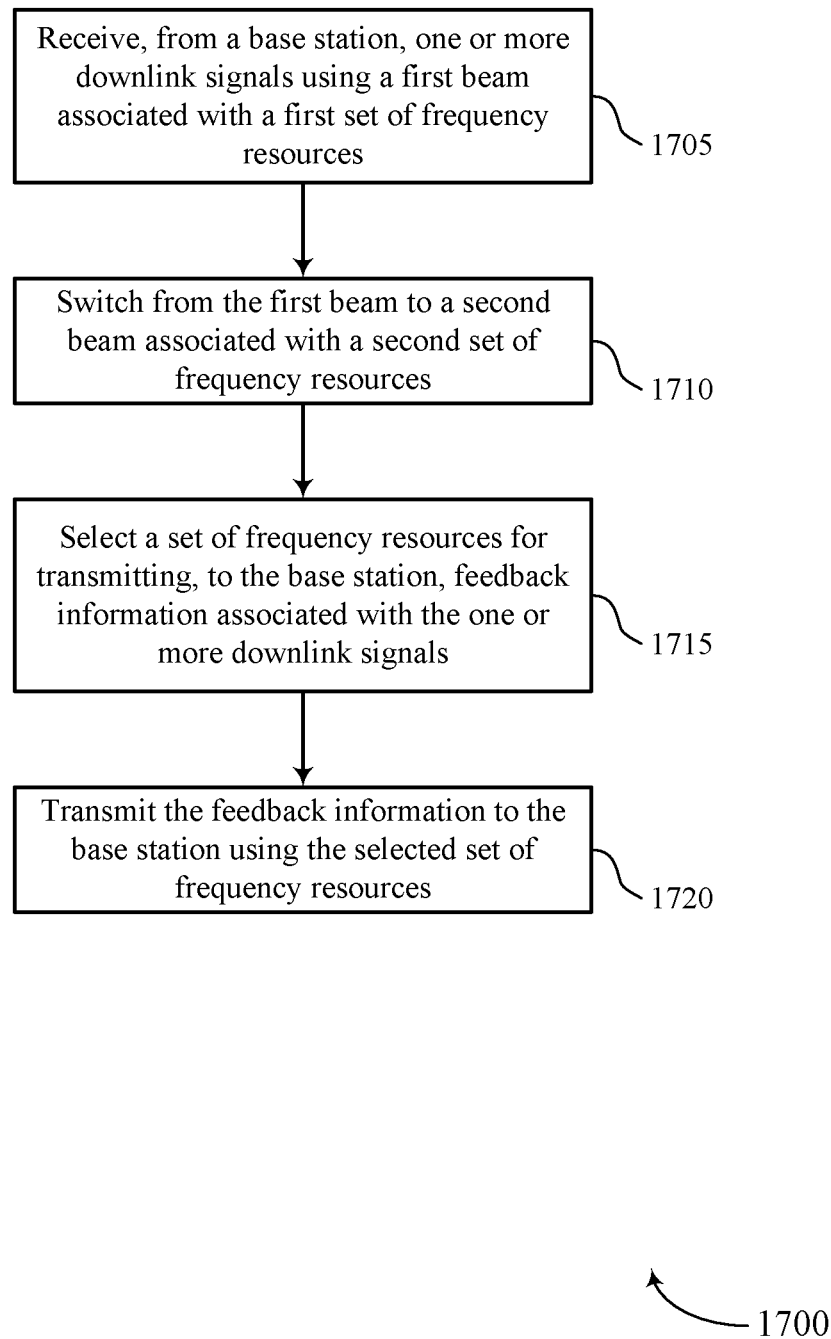
FIGS. 17 through 24 show flowcharts illustrating methods that support managing retransmissions after BWP switching in accordance with one or more aspects of the present disclosure.

FIG. 17 shows a flowchart illustrating a method 1700 that supports managing retransmissions after BWP switching in accordance with one or more aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may receive, from a base station, one or more downlink signals using a first beam associated with a first set of frequency resources. The operations of 1705 may be performed according to the methods described herein. In some examples, aspects of the operations of 1705 may be performed by a beam manager as described with reference to FIGS. 9 through 12.

At 1710, the UE may switch from the first beam to a second beam associated with a second set of frequency resources. The operations of 1710 may be performed according to the methods described herein. In some examples, aspects of the operations of 1710 may be performed by a beam switch manager as described with reference to FIGS. 9 through 12.

At 1715, the UE may select a set of frequency resources for transmitting, to the base station, feedback information associated with the one or more downlink signals. The operations of 1715 may be performed according to the methods described herein. In some examples, aspects of the operations of 1715 may be performed by a frequency resource manager as described with reference to FIGS. 9 through 12.

At 1720, the UE may transmit the feedback information to the base station using the selected set of frequency resources. The operations of 1720 may be performed according to the methods described herein. In some examples, aspects of the operations of 1720 may be performed by a frequency resource manager as described with reference to FIGS. 9 through 12.

Figure 18:
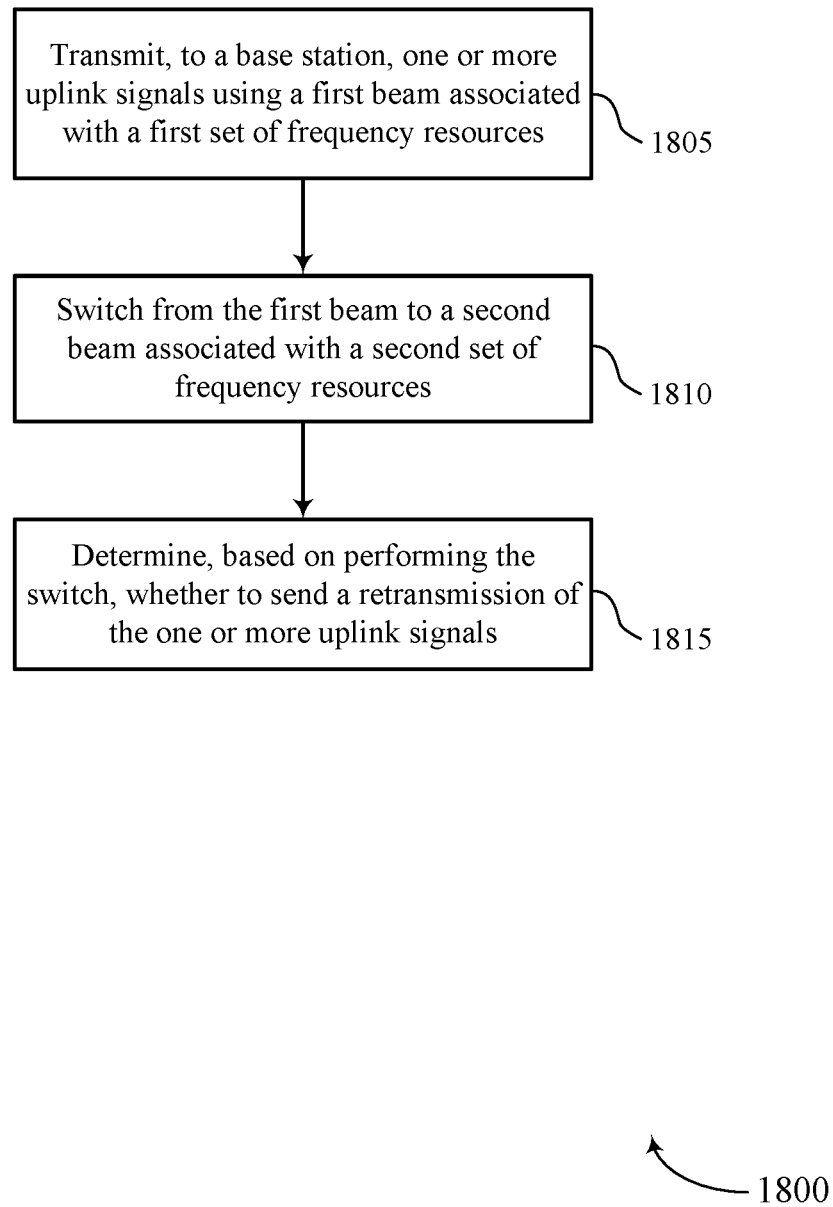

FIG. 18 shows a flowchart illustrating a method 1800 that supports managing retransmissions after BWP switching in accordance with one or more aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1805, the UE may transmit, to a base station, one or more uplink signals using a first beam associated with a first set of frequency resources. The operations of 1805 may be performed according to the methods described herein. In some examples, aspects of the operations of 1805 may be performed by a beam manager as described with reference to FIGS. 9 through 12.

At 1810, the UE may switch from the first beam to a second beam associated with a second set of frequency resources. The operations of 1810 may be performed according to the methods described herein. In some examples, aspects of the operations of 1810 may be performed by a beam manager as described with reference to FIGS. 9 through 12.

At 1815, the UE may determine, based on switching from the first beam to the second beam, whether to send a retransmission of the one or more uplink signals. The operations of 1815 may be performed according to the methods described herein. In some examples, aspects of the operations of 1815 may be performed by a retransmission manager as described with reference to FIGS. 9 through 12.

Figure 19:
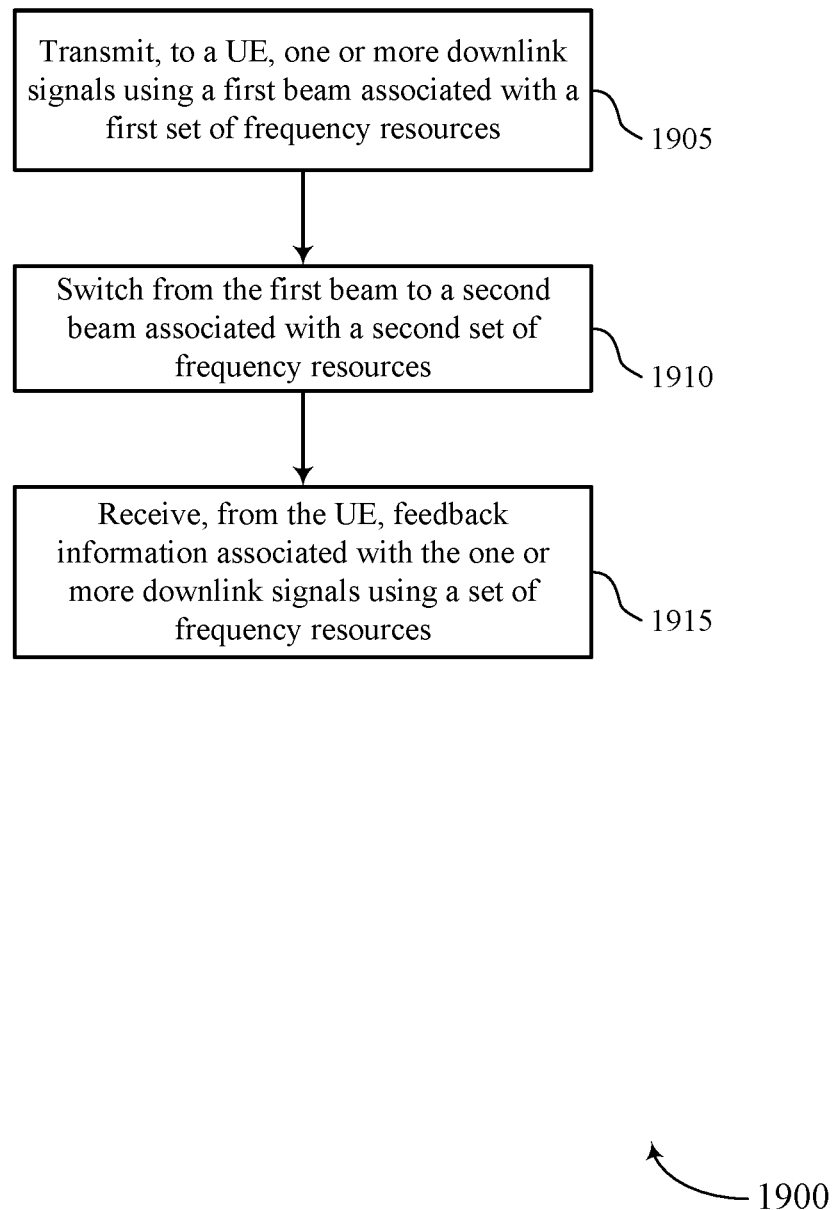

FIG. 19 shows a flowchart illustrating a method 1900 that supports managing retransmissions after BWP switching in accordance with one or more aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1905, the base station may transmit, to a UE, one or more downlink signals using a first beam associated with a first set of frequency resources. The operations of 1905 may be performed according to the methods described herein. In some examples, aspects of the operations of 1905 may be performed by a beam manager as described with reference to FIGS. 13 through 16.

At 1910, the base station may switch from the first beam to a second beam associated with a second set of frequency resources. The operations of 1910 may be performed according to the methods described herein. In some examples, aspects of the operations of 1910 may be performed by a beam switch manager as described with reference to FIGS. 13 through 16.

At 1915, the base station may receive, from the UE, feedback information associated with the one or more downlink signals using a set of frequency resources. The operations of 1915 may be performed according to the methods described herein. In some examples, aspects of the operations of 1915 may be performed by a feedback information manager as described with reference to FIGS. 13 through 16.

Figure 20:
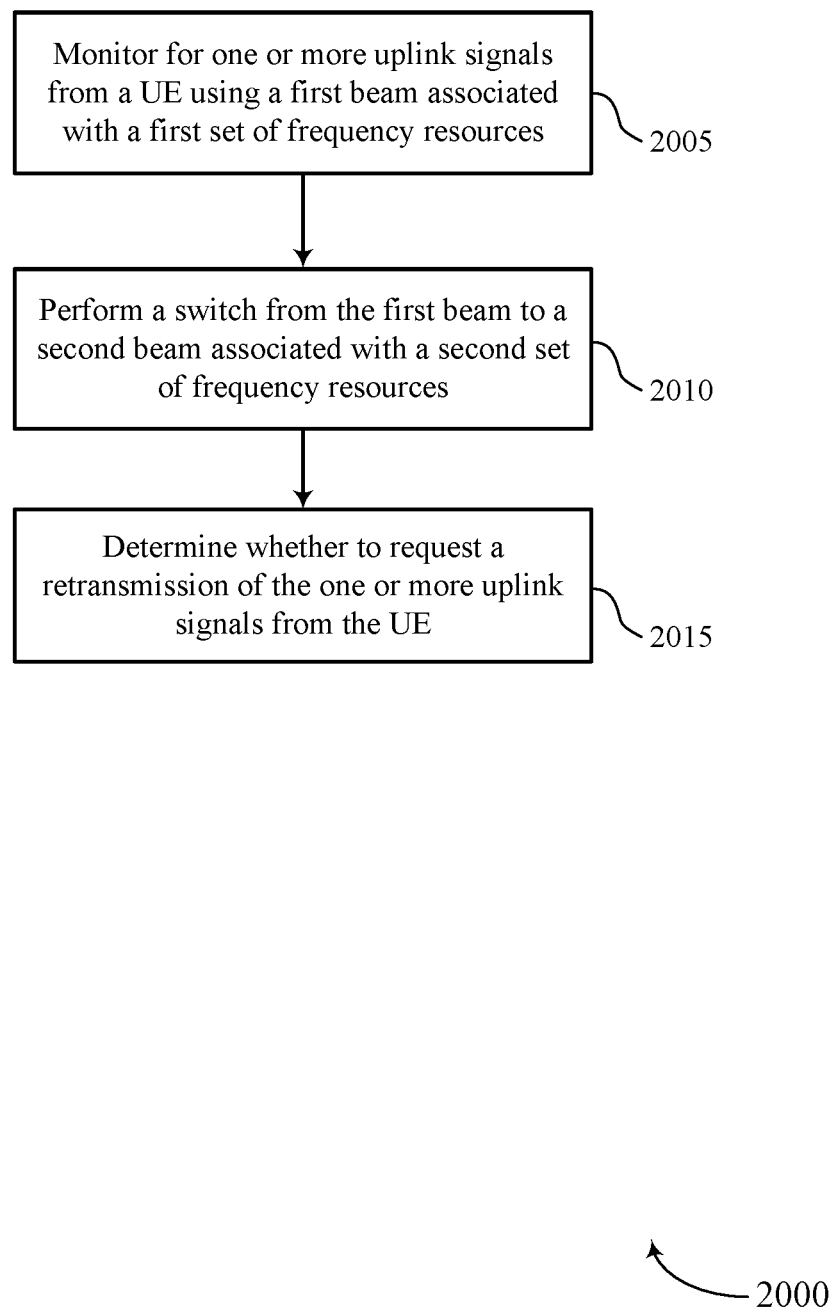

FIG. 20 shows a flowchart illustrating a method 2000 that supports managing retransmissions after BWP switching in accordance with one or more aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 2005, the base station may monitor for one or more uplink signals from a UE using a first beam associated with a first set of frequency resources. The operations of 2005 may be performed according to the methods described herein. In some examples, aspects of the operations of 2005 may be performed by a monitoring manager as described with reference to FIGS. 13 through 16.

At 2010, the base station may perform a switch from the first beam to a second beam associated with a second set of frequency resources. The operations of 2010 may be performed according to the methods described herein. In some examples, aspects of the operations of 2010 may be performed by a beam switch manager as described with reference to FIGS. 13 through 16.

At 2015, the base station may determine whether to request a retransmission of the one or more uplink signals from the UE. The operations of 2015 may be performed according to the methods described herein. In some examples, aspects of the operations of 2015 may be performed by a retransmission manager as described with reference to FIGS. 13 through 16.

Figure 21:
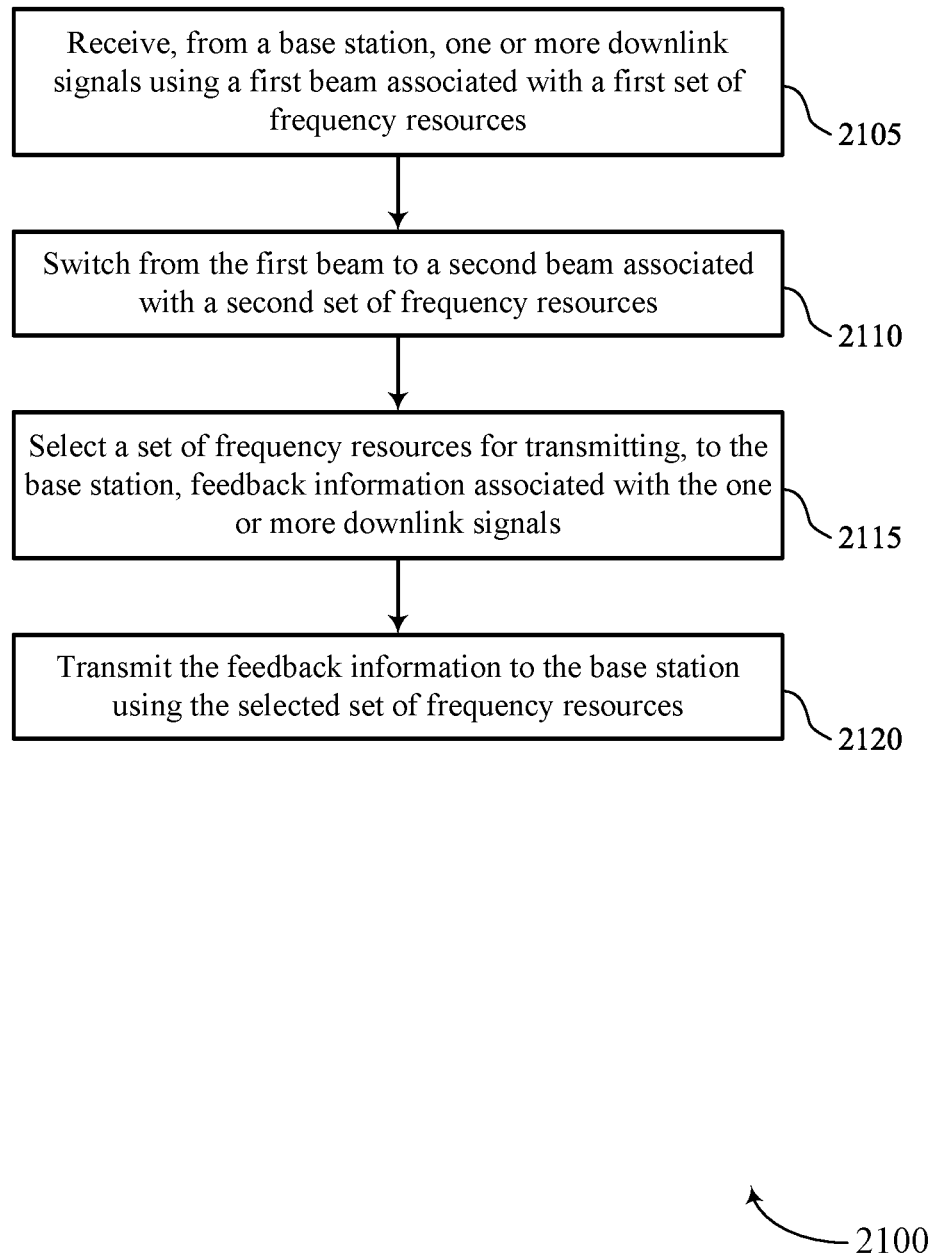

FIG. 21 shows a flowchart illustrating a method 2100 that supports managing retransmissions after BWP switching in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, one or more downlink signals using a first beam associated with a first set of frequency resources. The operations of 2105 may be performed in accordance with examples as disclosed herein. In some examples, aspects of the operations of 2105 may be performed by a beam manager as described with reference to FIGS. 9 through 12.

At 2110, the method may include switching from the first beam to a second beam associated with a second set of frequency resources. The operations of 2110 may be performed in accordance with examples as disclosed herein. In some examples, aspects of the operations of 2110 may be performed by a beam switch manager as described with reference to FIGS. 9 through 12.

At 2115, the method may include selecting a set of frequency resources for transmitting, to the base station, feedback information associated with the one or more downlink signals. The operations of 2115 may be performed in accordance with examples as disclosed herein. In some examples, aspects of the operations of 2115 may be performed by a frequency resource manager as described with reference to FIGS. 9 through 12.

At 2120, the method may include transmitting the feedback information to the base station using the selected set of frequency resources. The operations of 2120 may be performed in accordance with examples as disclosed herein. In some examples, aspects of the operations of 2120 may be performed by a frequency resource manager as described with reference to FIGS. 9 through 12.

Figure 22:
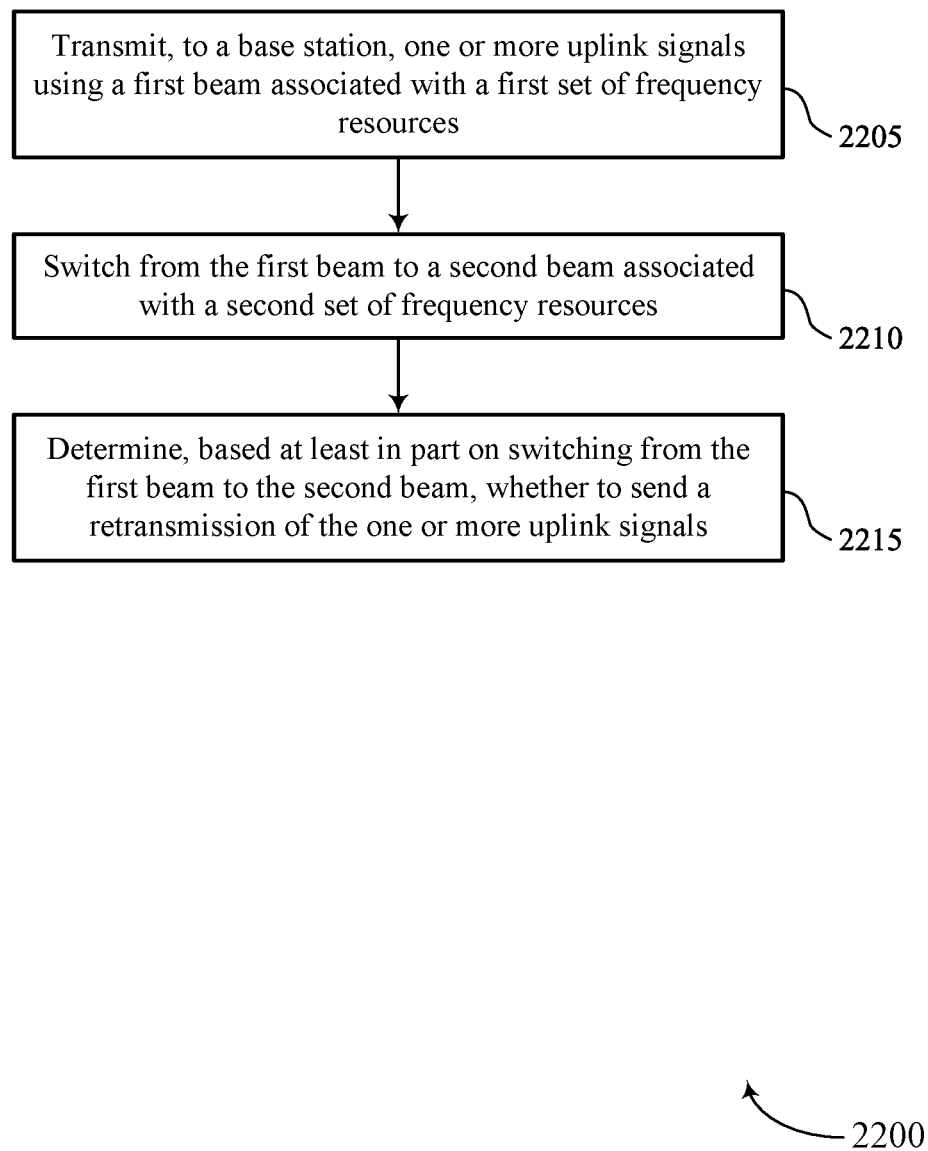

FIG. 22 shows a flowchart illustrating a method 2200 that supports managing retransmissions after BWP switching in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the described functions. Additionally or alternatively, the UE may perform aspects of the described functions using special-purpose hardware.

At 2205, the method may include transmitting, to a base station, one or more uplink signals using a first beam associated with a first set of frequency resources. The operations of 2205 may be performed in accordance with examples as disclosed herein. In some examples, aspects of the operations of 2205 may be performed by a beam manager as described with reference to FIGS. 9 through 12.

At 2210, the method may include switching from the first beam to a second beam associated with a second set of frequency resources. The operations of 2210 may be performed in accordance with examples as disclosed herein. In some examples, aspects of the operations of 2210 may be performed by a beam manager as described with reference to FIGS. 9 through 12.

At 2215, the method may include determining, based on switching from the first beam to the second beam, whether to send a retransmission of the one or more uplink signals. The operations of 2215 may be performed in accordance with examples as disclosed herein. In some examples, aspects of the operations of 2215 may be performed by a retransmission manager as described with reference to FIGS. 9 through 12.

Figure 23:
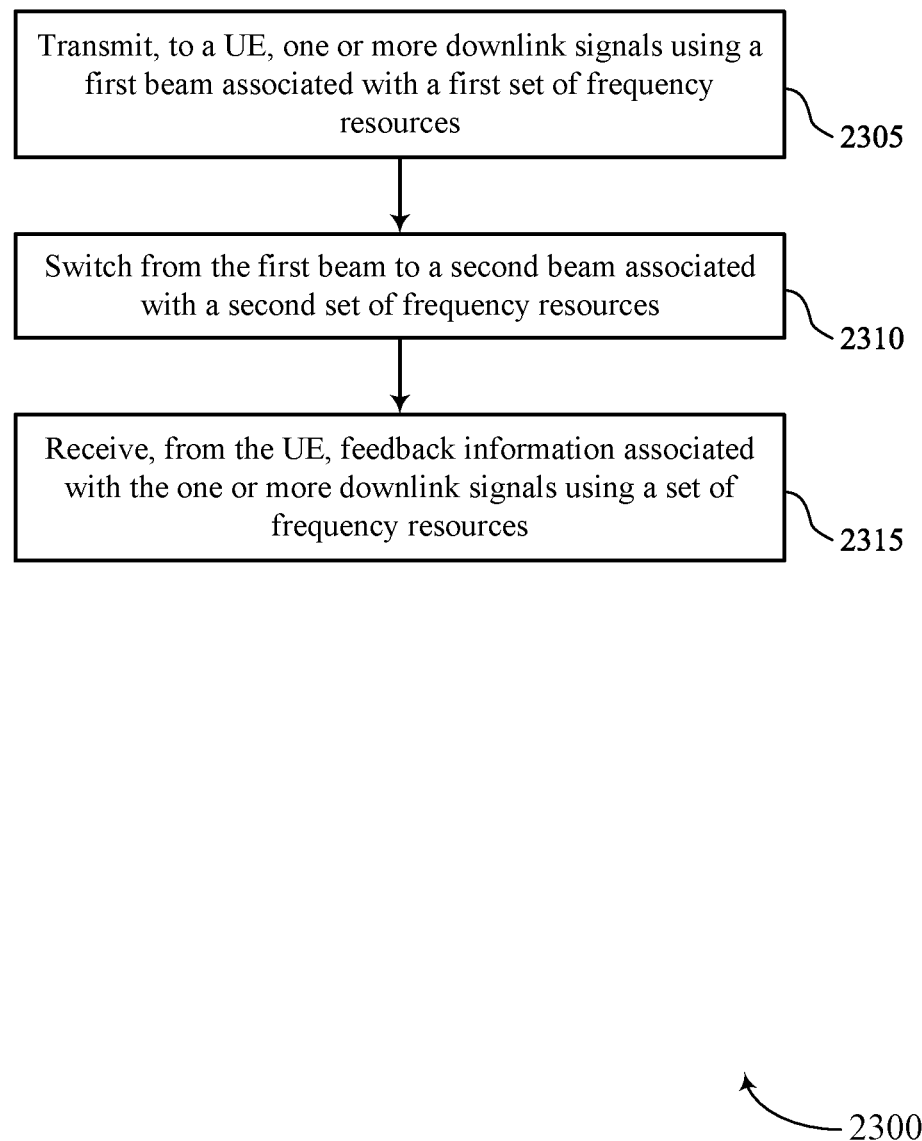

FIG. 23 shows a flowchart illustrating a method 2300 that supports managing retransmissions after BWP switching in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, one or more downlink signals using a first beam associated with a first set of frequency resources. The operations of 2305 may be performed in accordance with examples as disclosed herein. In some examples, aspects of the operations of 2305 may be performed by a beam manager as described with reference to FIGS. 13 through 16.

At 2310, the method may include switching from the first beam to a second beam associated with a second set of frequency resources. The operations of 2310 may be performed in accordance with examples as disclosed herein. In some examples, aspects of the operations of 2310 may be performed by a beam switch manager as described with reference to FIGS. 13 through 16.

At 2315, the method may include receiving, from the UE, feedback information associated with the one or more downlink signals using a set of frequency resources. The operations of 2315 may be performed in accordance with examples as disclosed herein. In some examples, aspects of the operations of 2315 may be performed by a feedback information manager as described with reference to FIGS. 13 through 16.

Figure 24:
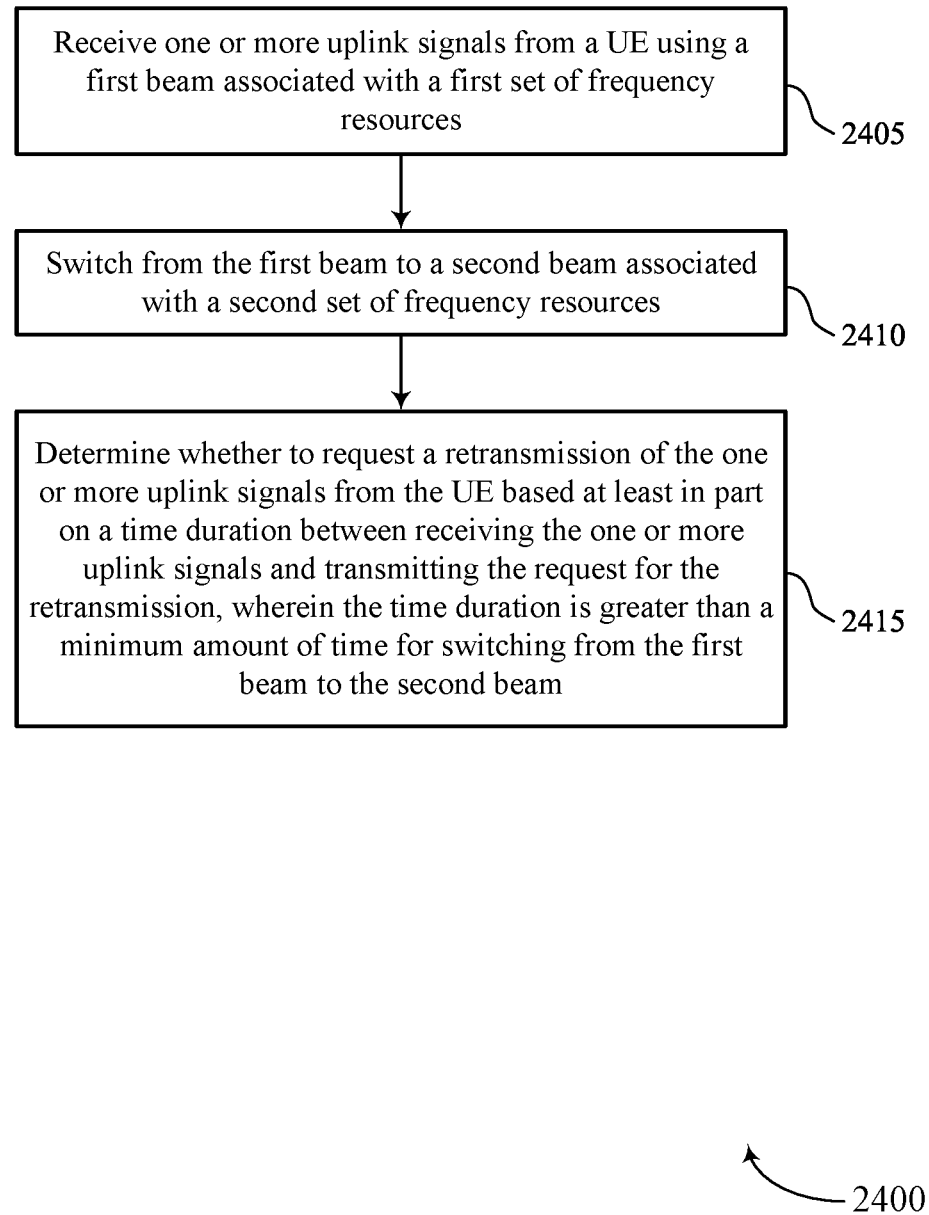

FIG. 24 shows a flowchart illustrating a method 2400 that supports managing retransmissions after BWP switching in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the described functions. Additionally or alternatively, the base station may perform aspects of the described functions using special-purpose hardware.

At 2405, the method may include receiving one or more uplink signals from a UE using a first beam associated with a first set of frequency resources. The operations of 2405 may be performed in accordance with examples as disclosed herein. In some examples, aspects of the operations of 2405 may be performed by a monitoring manager as described with reference to FIGS. 13 through 16.

At 2410, the method may include switching from the first beam to a second beam associated with a second set of frequency resources. The operations of 2410 may be performed in accordance with examples as disclosed herein. In some examples, aspects of the operations of 2410 may be performed by a beam switch manager as described with reference to FIGS. 13 through 16.

At 2415, the method may include determining whether to request a retransmission of the one or more uplink signals from the UE based on a time duration between receiving the one or more uplink signals and transmitting the request for the retransmission, where the time duration is greater than a minimum amount of time for switching from the first beam to the second beam. The operations of 2415 may be performed in accordance with examples as disclosed herein. In some examples, aspects of the operations of 2415 may be performed by a retransmission manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, one or more downlink signals using a first beam associated with a first set of frequency resources; switching from the first beam to a second beam associated with a second set of frequency resources; selecting a set of frequency resources for transmitting, to the base station, feedback information associated with the one or more downlink signals; and transmitting the feedback information to the base station using the selected set of frequency resources.

Aspect 2: The method of aspect 1, the transmitting the feedback information comprising: transmitting the feedback information to the base station using the first set of frequency resources, the selected set of frequency resources comprising the first set of frequency resources.

Aspect 3: The method of aspect 2, further comprising: determining to switch from the first beam to the second beam, wherein transmitting the feedback information using the first set of frequency resources is based at least in part on determining to switch from the first beam to the second beam; and wherein switching from the first beam to the second beam comprises switching from the first beam to the second beam after transmitting the feedback information to the base station.

Aspect 4: The method of any of aspects 2 through 3, further comprising: receiving, from the base station, a handover command instructing the UE to perform a handover procedure from a first cell associated with the first beam to a second cell associated with the second beam, wherein switching from the first beam to the second beam is based at least in part on receiving the handover command.

Aspect 5: The method of aspect 4, the transmitting the feedback information comprising: transmitting, to the base station based at least in part on receiving the handover command, a PDCP status report or RLC status report comprising the feedback information.

Aspect 6: The method of any of aspects 4 through 5, the transmitting the feedback information comprising: transmitting a MAC CE comprising the feedback information, the feedback information comprising a single feedback message associated with a plurality of hybrid automatic repeat processes, TBs, RLC status reports, or a combination thereof.

Aspect 7: The method of any of aspects 4 through 6, further comprising: identifying, based at least in part on the handover command, an indication of one or more uplink shared channel resources on the first set of frequency resources, the transmitting the feedback information comprising transmitting the feedback information over the one or more uplink shared channel resources on the first set of frequency resources.

Aspect 8: The method of any of aspects 1 through 7, the transmitting the feedback information comprising: transmitting the feedback information to the base station using the second set of frequency resources, the selected set of frequency resources comprising the second set of frequency resources.

Aspect 9: The method of aspect 8, further comprising: determining to switch from the first beam to the second beam, the switching from the first beam to the second beam comprising switching from the first beam to the second beam before transmitting the feedback information to the base station, wherein transmitting the feedback information using the second set of frequency resources is based at least in part on determining to switch from the first beam to the second beam.

Aspect 10: The method of any of aspects 8 through 9, further comprising: identifying, subsequent to switching from the first beam to the second beam, a first uplink control channel opportunity on the second set of frequency resources, the transmitting the feedback information comprising transmitting the feedback information over the identified first uplink control channel opportunity.

Aspect 11: The method of any of aspects 8 through 10, further comprising: identifying a time duration between receiving the one or more downlink signals and transmitting the feedback information, wherein the time duration is greater than a minimum amount of time for switching from the first beam to the second beam, and wherein transmitting the feedback information is based at least in part on an expiration of the time duration after receiving the one or more downlink signals; receiving, from the base station, DCI comprising an indication of the time duration, wherein the indication of the time duration is associated with the first set of frequency resources; and determining, based at least in part on the indication of the time duration, a timing for transmitting the feedback information on the second set of frequency resources, wherein transmitting the feedback information is based at least in part on determining the timing for transmitting the feedback information on the second set of frequency resources.

Aspect 12: The method of any of aspects 8 through 11, further comprising: initiating, based at least in part on receiving the one or more downlink signals, one or more HARQ timers associated with the feedback information; and applying, based at least in part on switching from the first beam to the second beam, an offset that is equal to or greater than a minimum amount of time for switching from the first beam to the second beam to the one or more HARQ timers, wherein transmitting the feedback information is based at least in part on expiration of the one or more HARQ timers and the applied offset.

Aspect 13: The method of any of aspects 8 through 12, the transmitting the feedback information comprising: transmitting a single feedback message associated with a plurality of hybrid automatic repeat processes, TBs, RLC status reports, or a combination thereof.

Aspect 14: The method of any of aspects 8 through 13, further comprising: receiving, from the base station, DCI comprising an indication of a TTI associated with the second set of frequency resources, the transmitting the feedback information comprising transmitting the feedback information during the TTI.

Aspect 15: The method of any of aspects 1 through 14, further comprising: receiving, from the base station, a handover command instructing the UE to perform a handover procedure from a first cell associated with the first beam to a second cell associated with the second beam; determining a switching window for switching from the first beam to the second beam; and determining that one or more TTIs allocated for transmitting the feedback information do not overlap in time with the switching window.

Aspect 16: The method of aspect 15, further comprising: determining that the one or more TTIs are located prior to the switching window, the selected set of frequency resources comprising the first set of frequency resources, and the transmitting the feedback information comprising transmitting the feedback information to the base station prior to switching from the first beam to the second beam based at least in part on determining that the one or more TTIs are located prior to the switching window.

Aspect 17: The method of any of aspects 15 through 16, further comprising: determining that the one or more TTIs are located after the switching window, the selected set of frequency resources comprising the second set of frequency resources, and the transmitting the feedback information comprising transmitting the feedback information to the base station after switching from the first beam to the second beam based at least in part on determining that the one or more TTIs are located after the switching window.

Aspect 18: The method of any of aspects 1 through 17, further comprising: receiving, from the base station, a handover command instructing the UE to perform a handover procedure from a first cell associated with the first beam to a second cell associated with the second beam; determining a switching window for switching from the first beam to the second beam; determining that one or more TTIs allocated for transmitting the feedback information at least partially overlap in time with the switching window; identifying a time duration between receiving the one or more downlink signals and transmitting the feedback information, wherein the time duration is greater than a minimum amount of time for switching from the first beam to the second beam, the selected set of frequency resources comprising the second set of frequency resources, and the transmitting the feedback information comprising transmitting the feedback information to the base station after switching from the first beam to the second beam and upon expiration of the time duration; and receiving, from the base station, DCI comprising an indication of the time duration.

Aspect 19: A method for wireless communications at a UE, comprising: transmitting, to a base station, one or more uplink signals using a first beam associated with a first set of frequency resources; switching from the first beam to a second beam associated with a second set of frequency resources; and determining, based at least in part on switching from the first beam to the second beam, whether to send a retransmission of the one or more uplink signals.

Aspect 20: The method of aspect 19, wherein the first set of frequency resources is allocated for downlink transmissions and the second set of frequency resources is allocated for downlink transmissions.

Aspect 21: The method of aspect 20, further comprising: monitoring, based at least in part on switching from the first beam to the second beam, the second set of frequency resources for a grant of resources for the retransmission of the one or more uplink signals; failing to receive the grant of resources based at least in part on the monitoring; and refraining from sending the retransmission of the one or more uplink signals based at least in part on failing to receive the grant of resources, the determining whether to send the retransmission of the one or more uplink signals comprising determining to refrain from sending the retransmission of the one or more uplink signals.

Aspect 22: The method of any of aspects 20 through 21, further comprising: monitoring, based at least in part on switching from the first beam to the second beam, the second set of frequency resources for a PDCP status report or RLC status report, wherein determining whether to send the retransmission is based at least in part on monitoring for the RLC status report.

Aspect 23: The method of any of aspects 20 through 22, further comprising: receiving, from the base station based at least in part on transmitting the one or more uplink signals, a RAR message comprising a status report, the status report comprising a last SEQN associated with the one or more uplink signals, wherein determining whether to send the retransmission of the one or more uplink signals is based at least in part on receiving the RAR message.

Aspect 24: The method of any of aspects 20 through 23, further comprising: receiving, from the base station, a handover command instructing the UE to perform a handover procedure from a first cell associated with the first beam to a second cell associated with the second beam, wherein switching from the first beam to the second beam is based at least in part on receiving the handover command; receiving, from the base station, a RLC status report or PDCP status report associated with the handover command, the handover command optionally comprising an indication of one or more uplink shared channel resources on the second set of frequency resources, the determining whether to send the retransmission comprising determining to send the retransmission, wherein determining to send the retransmission is based at least in part on receiving the RLC status report; and transmitting the retransmission on the one or more uplink shared channel resources on the second set of frequency resources based at least in part on determining to send the retransmission.

Aspect 25: The method of any of aspects 19 through 24, wherein the first set of frequency resources is allocated for uplink transmissions and the second set of frequency resources is allocated for uplink transmissions.

Aspect 26: A method for wireless communications at a base station, comprising: transmitting, to a UE, one or more downlink signals using a first beam associated with a first set of frequency resources; switching from the first beam to a second beam associated with a second set of frequency resources; and receiving, from the UE, feedback information associated with the one or more downlink signals using a set of frequency resources.

Aspect 27: The method of aspect 26, further comprising: determining to switch from the first beam to the second beam, wherein switching from the first beam to the second beam is based at least in part on the determining; transmitting, to the UE, a handover command instructing the UE to perform a handover procedure from a first cell associated with the first beam to a second cell associated with the second beam, wherein switching from the first beam to the second beam is based at least in part on transmitting the handover command; monitoring, based at least in part on the determining, one or more uplink control channel resources in the first set of frequency resources for the feedback information, the set of frequency resources comprising the first set of frequency resources; and receiving the feedback information from the UE over the uplink control channel resources in the first set of frequency resources based at least in part on the monitoring, the switching from the first beam to the second beam comprising switching from the first beam to the second beam after receiving the feedback information.

Aspect 28: The method of any of aspects 26 through 27, the receiving the feedback information comprising: receiving the feedback information from the UE using the second set of frequency resources based at least in part on switching from the first beam to the second beam, the set of frequency resources comprising the second set of frequency resources.

Aspect 29: The method of any of aspects 26 through 28, further comprising: transmitting, to the UE, a handover command instructing the UE to perform a handover procedure from a first cell associated with the first beam to a second cell associated with the second beam; determining a switching window for switching from the first beam to the second beam; and determining that one or more TTIs allocated for receiving the feedback information do not overlap in time with the switching window.

Aspect 30: A method for wireless communications at a base station, comprising: receiving one or more uplink signals from a UE using a first beam associated with a first set of frequency resources; switching from the first beam to a second beam associated with a second set of frequency resources; and determining whether to request a retransmission of the one or more uplink signals from the UE based at least in part on a time duration between receiving the one or more uplink signals and transmitting the request for the retransmission, wherein the time duration is greater than a minimum amount of time for switching from the first beam to the second beam.

Aspect 31: An apparatus for wireless communications at a UE, comprising a processor and memory coupled to the processor, the processor and memory configured to cause the apparatus to perform a method of any of aspects 1 through 18.

Aspect 32: An apparatus for wireless communications at a UE, comprising at least one means for performing a method of any of aspects 1 through 18.

Aspect 33: A non-transitory computer-readable medium storing code for wireless communications at a UE, the code comprising instructions executable by a processor to perform a method of any of aspects 1 through 18.

Aspect 34: An apparatus for wireless communications at a UE, comprising a processor and memory coupled to the processor, the processor and memory configured to cause the apparatus to perform a method of any of aspects 19 through 25.

Aspect 35: An apparatus for wireless communications at a UE, comprising at least one means for performing a method of any of aspects 19 through 25.

Aspect 36: A non-transitory computer-readable medium storing code for wireless communications at a UE, the code comprising instructions executable by a processor to perform a method of any of aspects 19 through 25.

Aspect 37: An apparatus for wireless communications at a base station, comprising a processor and memory coupled to the processor, the processor and memory configured to cause the apparatus to perform a method of any of aspects 26 through 29.

Aspect 38: An apparatus for wireless communications at a base station, comprising at least one means for performing a method of any of aspects 26 through 29.

Aspect 39: A non-transitory computer-readable medium storing code for wireless communications at a base station, the code comprising instructions executable by a processor to perform a method of any of aspects 26 through 29.

Aspect 40: An apparatus for wireless communications at a base station, comprising a processor and memory coupled to the processor, the processor and memory configured to cause the apparatus to perform a method of any of aspect 30.

Aspect 41: An apparatus for wireless communications at a base station, comprising at least one means for performing a method of aspect 30.

Aspect 42: A non-transitory computer-readable medium storing code for wireless communications at a base station, the code comprising instructions executable by a processor to perform a method of aspect 30.

Aspect 43: A method for wireless communications at a user equipment (UE), comprising: receiving, from a base station, one or more downlink signals using a first beam associated with a first set of frequency resources; switching from the first beam to a second beam associated with a second set of frequency resources; selecting a set of frequency resources for transmitting, to the base station, feedback information associated with the one or more downlink signals; and transmitting the feedback information to the base station using the selected set of frequency resources.

Aspect 44: The method of aspect 43, the transmitting the feedback information comprising: transmitting the feedback information to the base station using the first set of frequency resources, the selected set of frequency resources comprising the first set of frequency resources.

Aspect 45: The method of any of aspects 43 through 44, further comprising: determining to switch from the first beam to the second beam, wherein transmitting the feedback information using the first set of frequency resources is based at least in part on determining to switch from the first beam to the second beam; and wherein switching from the first beam to the second beam comprises switching from the first beam to the second beam after transmitting the feedback information to the base station.

Aspect 46: The method of any of aspects 43 through 45, further comprising: receiving, from the base station, a handover command instructing the UE to perform a handover procedure from a first cell associated with the first beam to a second cell associated with the second beam, wherein switching from the first beam to the second beam is based at least in part on receiving the handover command.

Aspect 47: The method of aspect 46, the transmitting the feedback information comprising: transmitting, to the base station based at least in part on receiving the handover command, a PDCP status report or an RLC status report comprising the feedback information.

Aspect 48: The method of aspect 46, the transmitting the feedback information comprising: transmitting a MAC CE comprising the feedback information, the feedback information comprising a single feedback message associated with a plurality of hybrid automatic repeat processes, TBs, or a combination thereof.

Aspect 49: The method of any of aspects 43 through 48, further comprising: identifying, based at least in part on the handover command, an indication of one or more uplink shared channel resources on the first set of frequency resources, the transmitting the feedback information comprising transmitting the feedback information over the one or more uplink shared channel resources on the first set of frequency resources.

Aspect 50: The method of any of aspects 43 through 49, the transmitting the feedback information comprising: transmitting the feedback information to the base station using the second set of frequency resources, the selected set of frequency resources comprising the second set of frequency resources.

Aspect 51: The method of aspect 50, further comprising: determining to switch from the first beam to the second beam, the switching from the first beam to the second beam comprising switching from the first beam to the second beam before transmitting the feedback information to the base station, wherein transmitting the feedback information using the second set of frequency resources is based at least in part on determining to switch from the first beam to the second beam.

Aspect 52: The method of any of aspects 50 through 51, further comprising: identifying, subsequent to switching from the first beam to the second beam, a first uplink control channel opportunity on the second set of frequency resources, the transmitting the feedback information comprising transmitting the feedback information over the identified first uplink control channel opportunity.

Aspect 53: The method of any of aspects 50 through 52, further comprising: identifying a time duration between receiving the one or more downlink signals and transmitting the feedback information, wherein the time duration is greater than a minimum amount of time for switching from the first beam to the second beam, and wherein transmitting the feedback information is based at least in part on an expiration of the time duration after receiving the one or more downlink signals.

Aspect 54: The method of aspect 53, further comprising: receiving, from the base station, DCI comprising an indication of the time duration.

Aspect 55: The method of aspect 54, wherein the indication of the time duration is associated with the first set of frequency resources, further comprising: determining, based at least in part on the indication of the time duration, a timing for transmitting the feedback information on the second set of frequency resources, wherein transmitting the feedback information is based at least in part on determining the timing for transmitting the feedback information on the second set of frequency resources.

Aspect 56: The method of any of aspects 50 through 55, further comprising: initiating, based at least in part on receiving the one or more downlink signals, one or more HARQ timers associated with the feedback information; and applying, based at least in part on switching from the first beam to the second beam, an offset that is equal to or greater than a minimum amount of time for switching from the first beam to the second beam to the one or more HARQ timers, wherein transmitting the feedback information is based at least in part on expiration of the one or more HARQ timers and the applied offset.

Aspect 57: The method of any of aspects 50 through 56, the transmitting the feedback information comprising: transmitting a single feedback message associated with a plurality of hybrid automatic repeat processes, TBs, or a combination thereof.

Aspect 58: The method of any of aspects 50 through 57, further comprising: receiving, from the base station, DCI comprising an indication of a TTI associated with the second set of frequency resources, the transmitting the feedback information comprising transmitting the feedback information during the TTI.

Aspect 59: The method of any of aspects 43 through 58, further comprising: receiving, from the base station, a handover command instructing the UE to perform a handover procedure from a first cell associated with the first beam to a second cell associated with the second beam; determining a switching window for switching from the first beam to the second beam; and determining that one or more TTIs allocated for transmitting the feedback information do not overlap in time with the switching window.

Aspect 60: The method of aspect 59, further comprising: determining that the one or more TTIs are located prior to the switching window, the selected set of frequency resources comprising the first set of frequency resources, and the transmitting the feedback information comprising transmitting the feedback information to the base station prior to switching from the first beam to the second beam based at least in part on determining that the one or more TTIs are located prior to the switching window.

Aspect 61: The method of any of aspects 59 through 60, further comprising: determining that the one or more TTIs are located after the switching window, the selected set of frequency resources comprising the second set of frequency resources, and the transmitting the feedback information comprising transmitting the feedback information to the base station after switching from the first beam to the second beam based at least in part on determining that the one or more TTIs are located after the switching window.

Aspect 62: The method of any of aspects 43 through 61, further comprising: receiving, from the base station, a handover command instructing the UE to perform a handover procedure from a first cell associated with the first beam to a second cell associated with the second beam; determining a switching window for switching from the first beam to the second beam; and determining that one or more TTIs allocated for transmitting the feedback information at least partially overlap in time with the switching window.

Aspect 63: The method of aspect 62, further comprising: identifying a time duration between receiving the one or more downlink signals and transmitting the feedback information, wherein the time duration is greater than a minimum amount of time for switching from the first beam to the second beam, the selected set of frequency resources comprising the second set of frequency resources, and the transmitting the feedback information comprising transmitting the feedback information to the base station after switching from the first beam to the second beam and upon expiration of the time duration.

Aspect 64: The method of aspect 63, further comprising: receiving, from the base station, DCI comprising an indication of the time duration.

Aspect 65: The method of any of aspects 43 through 64, wherein the base station is a network device in an NTN.

Aspect 66: An apparatus for wireless communication comprising at least one means for performing a method of any one of aspects 43 through 65.

Aspect 67: An apparatus for wireless communication comprising a processor and memory coupled to the processor, the processor and memory configured to perform a method of any one of aspects 43 through 65.

Aspect 68: A non-transitory computer-readable medium storing code for wireless communication, the code comprising instructions executable by a processor to perform a method of any one of aspects 43 through 65.

Aspect 69: A method for wireless communications at a UE, comprising: transmitting, to a base station, one or more uplink signals using a first beam associated with a first set of frequency resources; switching from the first beam to a second beam associated with a second set of frequency resources; and determining, based at least in part on switching from the first beam to the second beam, whether to send a retransmission of the one or more uplink signals.

Aspect 70: The method of aspect 69, wherein the first set of frequency resources is allocated for downlink transmissions and the second set of frequency resources is allocated for downlink transmissions.

Aspect 71: The method of any of aspects 69 through 70, further comprising: monitoring, based at least in part on switching from the first beam to the second beam, the second set of frequency resources for a grant of resources for the retransmission of the one or more uplink signals failing to receive the grant of resources based at least in part on the monitoring; and refraining from sending the retransmission of the one or more uplink signals based at least in part on failing to receive the grant of resources, the determining whether to send the retransmission of the one or more uplink signals comprising determining to refrain from sending the retransmission of the one or more uplink signals.

Aspect 72: The method of aspect 71, further comprising: identifying a time duration for the monitoring, wherein the time duration is greater than a minimum amount of time for switching from the first beam to the second beam, the monitoring the second set of frequency resources for the grant of resources comprising monitoring over the time duration.

Aspect 73: The method of any of aspects 69 through 72, further comprising: monitoring, based at least in part on switching from the first beam to the second beam, the second set of frequency resources for a PDCP status report or an RLC status report, wherein determining whether to send the retransmission is based at least in part on monitoring for the RLC status report.

Aspect 74: The method of any of aspects 69 through 73, further comprising: receiving, from the base station based at least in part on transmitting the one or more uplink signals, a RAR message comprising a status report, the status report comprising a last SEQN associated with the one or more uplink signals, wherein determining whether to send a retransmission of the one or more uplink signals is based at least in part on receiving the RAR message.

Aspect 75: The method of any of aspects 69 through 74, further comprising: receiving, from the base station, a handover command instructing the UE to perform a handover procedure from a first cell associated with the first beam to a second cell associated with the second beam, wherein switching from the first beam to the second beam is based at least in part on receiving the handover command; receiving, from the base station, an RLC status report or a PDCP status report associated with the handover command, the handover command comprising an indication of one or more uplink shared channel resources on the second set of frequency resources, the determining whether to send the retransmission comprising determining to send the retransmission, wherein determining to send the retransmission is based at least in part on receiving the RLC status report; and transmitting the retransmission on the one or more uplink shared channel resources on the second set of frequency resources based at least in part on determining to send the retransmission.

Aspect 76: The method of any of aspects 49 through 75, wherein the first set of frequency resources is allocated for uplink transmissions and the second set of frequency resources is allocated for uplink transmissions.

Aspect 77: The method of aspect 76, further comprising: identifying a time duration for the monitoring for feedback information associated with the one or more uplink signals, wherein the time duration is greater than a minimum amount of time for switching from the first beam to the second beam; and monitoring for feedback information over the time duration, wherein determining whether to send the retransmission is based at least in part on the monitoring.

Aspect 78: An apparatus for wireless communication comprising at least one means for performing a method of any one of aspects 69 through 77.

Aspect 79: An apparatus for wireless communication comprising a processor and memory coupled to the processor, the processor and memory configured to perform a method of any one of aspects 69 through 77.

Aspect 80: A non-transitory computer-readable medium storing code for wireless communication, the code comprising instructions executable by a processor to perform a method of any one of aspects 69 through 77.

Aspect 81: A method for wireless communications at a base station, comprising: transmitting, to a user equipment (UE), one or more downlink signals using a first beam associated with a first set of frequency resources; switching from the first beam to a second beam associated with a second set of frequency resources; and receiving, from the UE, feedback information associated with the one or more downlink signals using a set of frequency resources.

Aspect 82: The method of aspect 81, further comprising: determining to switch from the first beam to the second beam, wherein switching from the first beam to the second beam is based at least in part on the determining; monitoring, based at least in part on the determining, one or more uplink control channel resources in the first set of frequency resources for the feedback information, the set of frequency resources comprising the first set of frequency resources; and receiving the feedback information from the UE over the uplink control channel resources in the first set of frequency resources based at least in part on the monitoring, the switching from the first beam to the second beam comprising switching from the first beam to the second beam after receiving the feedback information.

Aspect 83: The method of any of aspects 81 through 82, further comprising: transmitting, to the UE, a handover command instructing the UE to perform a handover procedure from a first cell associated with the first beam to a second cell associated with the second beam, wherein switching from the first beam to the second beam is based at least in part on transmitting the handover command.

Aspect 84: The method of any of aspects 81 through 83, the receiving the feedback information comprising: receiving, from the UE based at least in part on transmitting the handover command, a PDCP status report or an RLC status report comprising the feedback information.

Aspect 85: The method of any of aspects 81 through 84, further comprising: receiving, from the UE, a MAC CE comprising the feedback information, the feedback information comprising a single feedback message associated with a plurality of hybrid automatic repeat processes, TBs, RLC status reports, or a combination thereof.

Aspect 86: The method of any of aspects 81 through 85, further comprising: transmitting, to the UE, an indication of one or more uplink shared channel resources on the first set of frequency resources, the receiving the feedback information comprising receiving the feedback information over the one or more uplink shared channel resources on the first set of frequency resources.

Aspect 87: The method of aspect 81, the receiving the feedback information comprising: receiving the feedback information from the UE using the second set of frequency resources based at least in part on switching from the first beam to the second beam, the set of frequency resources comprising the second set of frequency resources.

Aspect 88: The method of aspect 87, further comprising: identifying, subsequent to switching from the first beam to the second beam, a first uplink control channel opportunity on the second set of frequency resources, the receiving the feedback information comprising receiving the feedback information over the identified first uplink control channel opportunity.

Aspect 89: The method of any of aspects 87 through 88, further comprising: identifying a time duration between transmitting the one or more downlink signals and monitoring for the feedback information, wherein the time duration is greater than a minimum amount of time for switching from the first beam to the second beam, and wherein receiving the feedback information is based at least in part on an expiration of the time duration after transmitting the one or more downlink signals.

Aspect 90: The method of aspect 89, further comprising: transmitting, to the UE, DCI comprising an indication of the time duration.

Aspect 91: The method of any of aspects 87 through 90, the receiving the feedback information comprising: receiving a single feedback message associated with a plurality of hybrid automatic repeat processes, TBs, or a combination thereof.

Aspect 92: The method of any of aspects 87 through 91, further comprising: transmitting, to the UE, a handover command instructing the UE to perform a handover procedure from a first cell associated with the first beam to a second cell associated with the second beam, wherein switching from the first beam to the second beam is based at least in part on transmitting the handover command; receiving, from the UE based at least in part on the handover command, uplink signaling using the second set of frequency resources; and interpreting the uplink signaling on the second set of frequency resources as an ACK message associated with the handover command.

Aspect 93: The method of any of aspects 87 through 92, further comprising: transmitting, to the UE, DCI comprising an indication of a TTI associated with the second set of frequency resources, the receiving the feedback information comprising receiving the feedback information during the TTI.

Aspect 94: The method of any of aspects 81 through 93, further comprising: transmitting, to the UE, a handover command instructing the UE to perform a handover procedure from a first cell associated with the first beam to a second cell associated with the second beam; determining a switching window for switching from the first beam to the second beam; and determining that one or more TTIs allocated for receiving the feedback information do not overlap in time with the switching window.

Aspect 95: The method of aspects 94, further comprising: determining that the one or more TTIs are located prior to the switching window, the set of frequency resources comprising the first set of frequency resources, the receiving the feedback information comprising receiving the feedback information from the UE prior to switching from the first beam to the second beam based at least in part on determining that the one or more TTIs are located prior to the switching window.

Aspect 96: The method of any of aspects 95 through 95, further comprising: determining that the one or more TTIs are located after the switching window, the set of frequency resources comprising the second set of frequency resources, and the receiving the feedback information comprising receiving the feedback information from the UE after switching from the first beam to the second beam based at least in part on determining that the one or more TTIs are located after the switching window.

Aspect 97: The method of any of aspects 81 through 96, further comprising: transmitting, to the UE, a handover command instructing the UE to perform a handover procedure from a first cell associated with the first beam to a second cell associated with the second beam; determining a switching window for switching from the first beam to the second beam; and determining that one or more TTIs allocated for receiving the feedback information at least partially overlap in time with the switching window.

Aspect 98: The method of aspect 97, further comprising: identifying a time duration between transmitting the one or more downlink signals and receiving the feedback information, wherein the time duration is greater than a minimum amount of time for switching from the first beam to the second beam, the set of frequency resources comprising the second set of frequency resources, and the receiving the feedback information comprising receiving the feedback information from the UE after switching from the first beam to the second beam and upon expatriation of the time duration.

Aspect 99: An apparatus for wireless communication comprising at least one means for performing a method of any one of aspects 81 through 98.

Aspect 100: An apparatus for wireless communication comprising a processor and memory coupled to the processor, the processor and memory configured to perform a method of any one of aspects 81 through 98.

Aspect 101: A non-transitory computer-readable medium storing code for wireless communication, the code comprising instructions executable by a processor to perform a method of any one of aspects 81 through 98.

Aspect 102: A method for wireless communications at a base station, comprising: monitoring for one or more uplink signals from a user equipment (UE) using a first beam associated with a first set of frequency resources; performing a switch from the first beam to a second beam associated with a second set of frequency resources; and determining whether to request a retransmission of the one or more uplink signals from the UE.

Aspect 103: The method of aspect 102, further comprising: receiving, based at least in part on the monitoring, the one or more uplink signals prior to performing the switch from the first beam to the second beam, the determining whether to request the retransmission comprising determining to refrain from requesting the retransmission.

Aspect 104: The method of any of aspects 102 through 103, further comprising: failing, based at least in part on switching from the first beam to the second beam from the first beam to the second beam, to receive the one or more uplink signals, the determining whether to request the retransmission comprising determining to request the retransmission; transmitting, to the UE based at least in part on determining to request the retransmission, an RLC status report using the second set of frequency resources, the handover command optionally comprising an indication of one or more uplink shared channel resources on the second set of frequency resources; and receiving the retransmission over the one or more uplink shared channel resources on the second set of frequency resources.

Aspect 105: The method of any of aspects 102 through 104, further comprising: transmitting, to the UE, a handover command instructing the UE to perform a handover procedure from a first cell associated with the first beam to a second cell associated with the second beam, wherein switching from the first beam to the second beam is based at least in part on receiving the handover command; transmitting, to the UE based at least in part on determining whether to request the retransmission of the one or more uplink signals, an RLC status report associated with the handover command, the handover command optionally comprising an indication of one or more uplink shared channel resources on the second set of frequency resources; and receiving the retransmission on the one or more uplink shared channel resources on the second set of frequency resources.

Aspect 106: The method of any of aspects 102 through 105, wherein the first set of frequency resources is allocated for uplink transmissions and the second set of frequency resources is allocated for uplink transmissions.

Aspect 107: The method of aspects 106, further comprising: identifying a time duration between receiving the one or more uplink signals and transmitting the request for the retransmission, wherein the time duration is greater than a minimum amount of time for switching from the first beam to the second beam; and transmitting, within the time duration, the request for the retransmission based at least in part on determining whether to request the retransmission.

Aspect 108: An apparatus for wireless communication comprising at least one means for performing a method of any one of aspects 102 through 107.

Aspect 109: An apparatus for wireless communication comprising a processor and memory coupled to the processor, the processor and memory configured to perform a method of any one of aspects 102 through 107.

Aspect 110: A non-transitory computer-readable medium storing code for wireless communication, the code comprising instructions executable by a processor to perform a method of any one of aspects 102 through 107.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   a processor; and
   memory coupled to the processor; the processor and memory configured to:
      receive, from a base station, one or more downlink signals using a first beam associated with a first set of frequency resources;
      switch from the first beam to a second beam associated with a second set of frequency resources;
      select a set of frequency resources for transmitting, to the base station, feedback information associated with the one or more downlink signals; and
      transmit the feedback information to the base station using the second set of frequency resources, the selected set of frequency resource comprising the second set of frequency resources.

2. The apparatus of claim 1, wherein to transmit the feedback information, the processor and memory are configured to:
   transmit the feedback information to the base station using the first set of frequency resources, the selected set of frequency resources comprising the first set of frequency resources.

3. The apparatus of claim 2, the processor and memory further configured to:
   determine to switch from the first beam to the second beam, wherein transmitting the feedback information using the first set of frequency resources is based at least in part on determining to switch from the first beam to the second beam; and wherein switching from the first beam to the second beam comprises switching from the first beam to the second beam after transmitting the feedback information to the base station.

4. The apparatus of claim 2, the processor and memory further configured to:
   receive, from the base station, a handover command instructing the UE to perform a handover procedure from a first cell associated with the first beam to a second cell associated with the second beam, wherein switching from the first beam to the second beam is based at least in part on receiving the handover command.

5. The apparatus of claim 4, wherein to transmit the feedback information, the processor and memory are configured to:
   transmit, to the base station based at least in part on receiving the handover command, a packet data convergence protocol status report or radio link control status report comprising the feedback information.

6. The apparatus of claim 4, wherein to transmit the feedback information, the processor and memory are configured to:
   transmit a media access control control element comprising the feedback information, the feedback information comprising a single feedback message associated with a plurality of hybrid automatic repeat processes, transport blocks, radio link control status reports, or a combination thereof.

7. The apparatus of claim 4, the processor and memory further configured to:
   identify, based at least in part on the handover command, an indication of one or more uplink shared channel resources on the first set of frequency resources, the transmitting the feedback information comprising transmitting the feedback information over the one or more uplink shared channel resources on the first set of frequency resources.

8. The apparatus of claim 1, the processor and memory further configured to:
   determine to switch from the first beam to the second beam, the switching from the first beam to the second beam comprising switching from the first beam to the second beam before transmitting the feedback information to the base station, wherein transmitting the feedback information using the second set of frequency resources is based at least in part on determining to switch from the first beam to the second beam.

9. The apparatus of claim 1, the processor and memory further configured to:
   identify, subsequent to switching from the first beam to the second beam, a first uplink control channel opportunity on the second set of frequency resources, the transmitting the feedback information comprising transmitting the feedback information over the identified first uplink control channel opportunity.

10. The apparatus of claim 1, the processor and memory further configured to:
    identify a time duration between receiving the one or more downlink signals and transmitting the feedback information, wherein the time duration is greater than a minimum amount of time for switching from the first beam to the second beam, and wherein transmitting the feedback information is based at least in part on an expiration of the time duration after receiving the one or more downlink signals;
    receive, from the base station, downlink control information comprising an indication of the time duration, wherein the indication of the time duration is associated with the first set of frequency resources; and
    determine, based at least in part on the indication of the time duration, a timing for transmitting the feedback information on the second set of frequency resources, wherein transmitting the feedback information is based at least in part on determining the timing for transmitting the feedback information on the second set of frequency resources.

11. The apparatus of claim 1, the processor and memory further configured to:
    initiate, based at least in part on receiving the one or more downlink signals, one or more hybrid automatic repeat request timers associated with the feedback information; and
    apply, based at least in part on switching from the first beam to the second beam, an offset that is equal to or greater than a minimum amount of time for switching from the first beam to the second beam to the one or more hybrid automatic repeat request timers, wherein transmitting the feedback information is based at least in part on expiration of the one or more hybrid automatic repeat request timers and the applied offset.

12. The apparatus of claim 1, wherein to transmit the feedback information, the processor and memory are configured to:
    transmit a single feedback message associated with a plurality of hybrid automatic repeat processes, transport blocks, radio link control status reports, or a combination thereof.

13. The apparatus of claim 1, the processor and memory further configured to:
    receive, from the base station, downlink control information comprising an indication of a transmission time interval associated with the second set of frequency resources, the transmitting the feedback information comprising transmitting the feedback information during the transmission time interval.

14. The apparatus of claim 1, the processor and memory further configured to:
    receive, from the base station, a handover command instructing the UE to perform a handover procedure from a first cell associated with the first beam to a second cell associated with the second beam;
    determine a switching window for switching from the first beam to the second beam; and
    determine that one or more transmission time intervals allocated for transmitting the feedback information do not overlap in time with the switching window.

15. The apparatus of claim 14, the processor and memory further configured to:
    determine that the one or more transmission time intervals are located prior to the switching window, the selected set of frequency resources comprising the first set of frequency resources, and the transmitting the feedback information comprising transmitting the feedback information to the base station prior to switching from the first beam to the second beam based at least in part on determining that the one or more transmission time intervals are located prior to the switching window.

16. The apparatus of claim 14, the processor and memory further configured to:
    determine that the one or more transmission time intervals are located after the switching window, the selected set of frequency resources comprising the second set of frequency resources, and the transmitting the feedback information comprising transmitting the feedback information to the base station after switching from the first beam to the second beam based at least in part on determining that the one or more transmission time intervals are located after the switching window.

17. The apparatus of claim 1, the processor and memory further configured to:
    receive, from the base station, a handover command instructing the UE to perform a handover procedure from a first cell associated with the first beam to a second cell associated with the second beam;
    determine a switching window for switching from the first beam to the second beam;
    determine that one or more transmission time intervals allocated for transmitting the feedback information at least partially overlap in time with the switching window;
    identify a time duration between receiving the one or more downlink signals and transmitting the feedback information, wherein the time duration is greater than a minimum amount of time for switching from the first beam to the second beam, the selected set of frequency resources comprising the second set of frequency resources, and the transmitting the feedback information comprising transmitting the feedback information to the base station after switching from the first beam to the second beam and upon expiration of the time duration; and
    receive, from the base station, downlink control information comprising an indication of the time duration.

18. An apparatus for wireless communications at a base station, comprising:
    a processor; and
    memory coupled to the processor, the processor and memory configured to:
        transmit, to a user equipment (UE), one or more downlink signals using a first beam associated with a first set of frequency resources;
        switch from the first beam to a second beam associated with a second set of frequency resources; and
        receive, from the UE, feedback information associated with the one or more downlink signals using a set of frequency resources comprising the second set of frequency resources based at least in part on switching from the first beam to the second beam.

19. The apparatus of claim 18, the processor and memory further configured to:
    determine to switch from the first beam to the second beam, wherein switching from the first beam to the second beam is based at least in part on the determining;
    transmitting, to the UE, a handover command instructing the UE to perform a handover procedure from a first cell associated with the first beam to a second cell associated with the second beam, wherein switching from the first beam to the second beam is based at least in part on transmitting the handover command;

monitor, based at least in part on the determining, one or more uplink control channel resources in the first set of frequency resources for the feedback information, the set of frequency resources comprising the first set of frequency resources; and receive the feedback information from the UE over the uplink control channel resources in the first set of frequency resources based at least in part on the monitoring, the switching from the first beam to the second beam comprising switching from the first beam to the second beam after receiving the feedback information.

20. The apparatus of claim 18, the processor and memory further configured to:

transmit, to the UE, a handover command instructing the UE to perform a handover procedure from a first cell associated with the first beam to a second cell associated with the second beam;

determine a switching window for switching from the first beam to the second beam; and determine that one or more transmission time intervals allocated for receiving the feedback information do not overlap in time with the switching window.

* * * * *